United States Patent [19]
Kroenke et al.

[11] Patent Number: 5,809,297
[45] Date of Patent: *Sep. 15, 1998

[54] SEMANTIC OBJECT MODELING SYSTEM FOR CREATING RELATIONAL DATABASE SCHEMAS

[75] Inventors: David M. Kroenke; Christopher C. Olds; Kenji Kawai, all of Seattle; Lee I. Eggebroten, Vashon, all of Wash.

[73] Assignee: Wall Data Incorporated, Kirkland, Wash.

[*] Notice: The term of this patent shall not extend beyond the expiration date of Pat. No. 5,548,749.

[21] Appl. No.: 695,000

[22] Filed: Aug. 9, 1996

Related U.S. Application Data

[63] Continuation of Ser. No. 145,997, Oct. 29, 1993, Pat. No. 5,548,749.

[51] Int. Cl.⁶ .................................................. G06F 17/30
[52] U.S. Cl. ...................... 395/613; 395/335; 395/348; 395/352
[58] Field of Search .................... 395/613, 335, 395/348, 352

[56] References Cited

U.S. PATENT DOCUMENTS

| | | | |
|---|---|---|---|
| 4,930,071 | 5/1990 | Tou et al. | 395/604 |
| 5,195,178 | 3/1993 | Krieger et al. | 395/347 |
| 5,212,787 | 5/1993 | Baker et al. | 395/612 |
| 5,263,167 | 11/1993 | Conner, Jr. et al. | 395/604 |
| 5,278,946 | 1/1994 | Shimada et al. | 395/62 |
| 5,295,256 | 3/1994 | Bapat | 395/500 |
| 5,307,499 | 4/1994 | Yin | 395/705 |
| 5,418,950 | 5/1995 | Li et al. | 395/604 |
| 5,499,371 | 3/1996 | Henninger et al. | 395/702 |

FOREIGN PATENT DOCUMENTS

| | | |
|---|---|---|
| 0 560 543 A2 | 9/1993 | European Pat. Off. . |
| 2 253 500 | 9/1992 | United Kingdom . |
| WO 95/03586 | 2/1995 | WIPO . |
| WO 95/12172 | 5/1995 | WIPO . |

OTHER PUBLICATIONS

Codd, E.F., "Extending the Database Relational Model to Capture More Meaning," *ACM Transactions on Database Systems*, 4(4):397–434, Dec. 1979.

Decorte, G. et al. "An Object–Oriented Model for Capturing Data Semantics," *IEEE Computer Society Press*, pp. 126–135, Feb. 1992.

Kroenke, D.M., "Developing Object–Oriented Database Applications on Microcomputres," *The Second International Conference on Computers and Applications*, The Computer Society of the IEEE, pp. 70–77, Jun. 1987.

(List continued on next page.)

*Primary Examiner*—Thomas G. Black
*Assistant Examiner*—Hosain T. Alam
*Attorney, Agent, or Firm*—Christensen O'Connor; Johnson & Kindness PLLC

[57] ABSTRACT

A computer-based system for allowing a user to create a relational database schema. The system allows a user to create a semantic object data model of the database schema. The semantic object data model is defined by one or more semantic objects, each of which includes one or more attributes that describe a characteristic of the semantic objects. The attributes are defined as being either simple value attributes that describe a single characteristic of the semantic object; group attributes that include one or more member attributes that collectively describe a characteristic of the semantic object; formula attributes that set forth a computation that describes a characteristic of a semantic object; or object link attributes that define a relationship between two or more semantic objects. Once the semantic object data model is created, the system validates the semantic objects to ensure no modeling errors have been made and transforms the semantic objects and their included attributes into a plurality of relational database tables that will store data as defined by the semantic object data model.

29 Claims, 43 Drawing Sheets

OTHER PUBLICATIONS

Kroenke D.M., *Database Processing: Fundamentals, Design, Implementation,* 4th Ed., Macmillian Publishing Company, Ch. 5, pp. 123–167, and Ch. 7, pp. 205–252, 1992.

Keim, D. et al., "Object–Oriented Querying and Existing Relational Databases," *Database and Expert Systems Application,* 4th International Conference, pp. 326–336, Sep. 6–8, 1993.

F. Leymann, "UDH: A Universal Relation System," *Data & Knowledge Engineering,* 5:21–38, 1990.

"Visual Representation of Database Query Definition," *IBM Technical Disclosure Bulletin,* 33(9):238–242, Feb. 1991.

Blaha M.R. et al., "Relational Database Design Using an Object–Oriented Methodology," *Communications of the ACM,* 31(4):414–427, Apr. 1988.

Lejter et al., "Support for Maintaining Object–Oriented Programs," *IEEE Transactions on Software Engineering,* 18(12):1045–1052, Dec. 1992.

D. McClanahan, "Database Design: Relational Rules," DBMS, 4(12):54 (5 pp.), Nov. 1991.

D. McClanahan, "Conceptual Design," DBMS, 5(1):66 (5 pp.), Jan. 1992.

Hammer, M. et al., "Database Object–Oriented Database Applications on Microcomputers," *ACM Transactions on Database Systems,* 6(3):351–386, Sep. 1981.

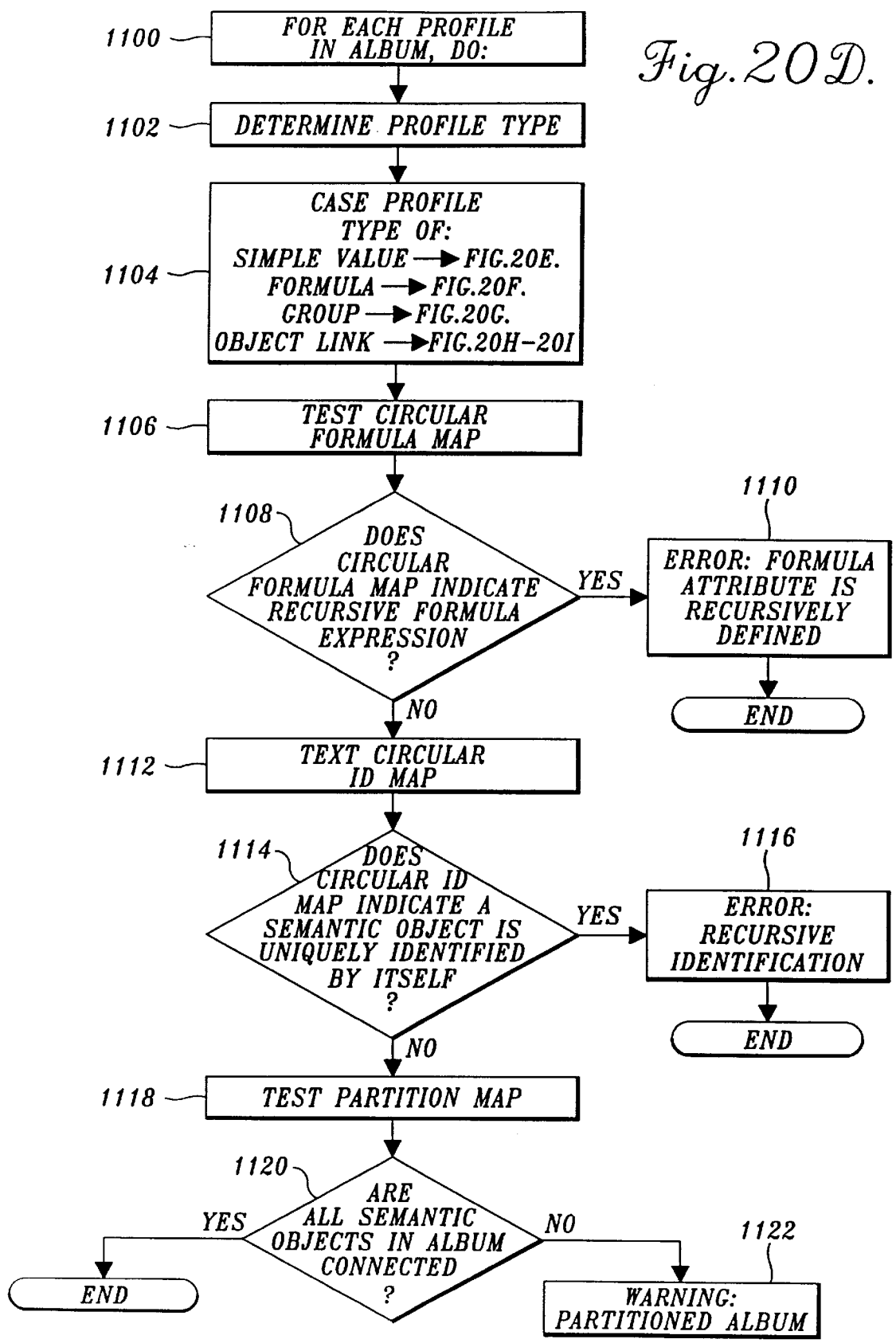

SEMANTIC OBJECT MODELING SYSTEM FOR CREATING RELATIONAL DATABASE SCHEMAS

This application is a continuation of application Ser. No. 08/145,997, filed Oct. 29, 1993 now U.S. Pat. No. 5,548,749.

FIELD OF THE INVENTION

The present invention relates to computer systems in general and, in particular, to systems for creating database schemas.

BACKGROUND OF THE INVENTION

As the cost of computers decrease, more people are purchasing computer systems that have sophisticated computing and data storage capabilities. In addition to the word processing and spread sheet programs used with such computer systems, another common use for such systems is to store and retrieve data using commercially available database management system (DBMS) products. For example, a home computer system user may wish to store and access information regarding an investment portfolio on the computer. Similarly, the owner of a small business may desire to use a computer system to keep track of its customers, inventory, and sales orders. While commercially available database programs allow a user to store and retrieve these types of information, currently available database programs have a steep learning curve that discourages the average computer user from developing any but the most simple of databases.

Most conventional database programs use what is commonly known as a relational database architecture. These relational databases consist of one or more two-dimensional tables that contain numerous rows and columns. Each row of the relational table defines a record of the data. For example, in a customer table, each row refers to a particular customer in the database. The columns of the tables store particular attributes of each record. For example, one column may hold a customer's last name, another the customer's first name, and another the customer's street or post office box number, etc. The structure of the relational tables that store the data comprising the database is commonly referred to as the database schema.

The difficulty with using a commercially available database program is knowing how to define the database schema. Typically, in order to create anything but the most simple database, the user must either become an expert database designer or hire a consultant to create the database. Both options are generally undesirable because most computer users do not have the time or the desire to become expert database designers, and the cost of hiring a consultant can be prohibitive.

Another problem with current database programs is that they force the user to define the data that they wish to store in the database in a way that is determined by the database program. For example, to create a new database, most database programs present the user with a blank table and ask the user to identify the type of data to be placed in each column. If more than one table is required for defining the database schema, the user must create each additional table and define a key field or attribute that is common to two or more tables in order to relate one table to another. The problem with this method is that the user most likely does not think of the data to be stored in terms of tables, columns, and keys. For example, the user who wishes to create a database for the investment portfolio data most likely thinks of the data in terms of the names of companies in which stock is held, the number of shares of each company owned, a purchase price, a purchase date, a price-to-earnings ratio, etc. By requiring the user to define relational tables in conformance with rigid rules, the commercial database program forces the user to think of and characterize the data to be stored in a way that is unnatural.

Therefore, there is a need for a system that allows a user to create a relational database schema in a way that does not require the user to be familiar with the underlying database technology or rules for defining a database. The system should be easy to use and be able to run on commonly available computer systems. In addition, the user should be able to define the data to be stored in a way that mirrors the user's view of the data.

SUMMARY OF THE INVENTION

To address these problems associated with prior art database systems, the present invention is a system for allowing a user to easily produce a database schema. The system allows a user to create an album that defines a semantic object data model of a plurality of relational database tables that define the database schema.

The semantic object data model defined by the album includes one or more semantic objects, each of which includes one or more attributes that define a characteristic of the semantic objects. The attributes are defined as being: (a) simple value attributes that describe a single characteristic of the semantic object; (b) group attributes that include one or more member attributes, which collectively describe a characteristic of the semantic object; (c) formula attributes that set forth a formula, which describes a characteristic of a semantic object; or (d) object link attributes that define a relationship between one or more semantic objects. Once the album has been created, the system validates the album to determine if the user has created any modeling errors. After the album has been validated, the system transforms the semantic objects and their included attributes contained in the album into a plurality of relational database tables that will store data as defined by the semantic object data model.

The present invention also comprises a method for validating an album to determine if any semantic objects in the album are unconnected to the remaining semantic objects of the album. The validation method also determines if a semantic object in the album is uniquely identified by another semantic object, which in turn is uniquely identified by the first semantic object. The validation method also determines if a formula attribute is recursively defined.

The present invention further comprises a method for interpreting formula attributes. The method includes the steps of searching the semantic objects for the names of the terms used in an expression property of a formula attribute. The system performs an expanding ring search from the formula attribute to the semantic object that contains the formula attribute and to the remaining semantic objects in the semantic object data model. The search produces one or more lists of attributes that are located at the same logical distance from the formula attribute. The lists are searched to find all instances of attributes having the name of the attribute used in the formula expression property, as well as all paths to a single attribute used in the formula. If there exist two or more attributes within the semantic object data model having the same name or two distinct paths to the same attribute used in a formula, the system prompts the user to decide which attribute or path to the attribute is to be used in the formula. The expanding ring search allows a user to define a formula in terms of attributes that are defined in other semantic objects.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As described above, the present invention is a system for allowing a user to easily create a database schema that will correctly store and retrieve data. As will be described in further detail below, the user creates a graphic visual representation of the data to be stored in the database and the relationships that exist between various parts of the data. The visual representation, called a semantic object data model, is then transformed by the present invention into a series of computer commands or function calls that cause a commercially available database program to create a corresponding relational database schema.

Figure 1:
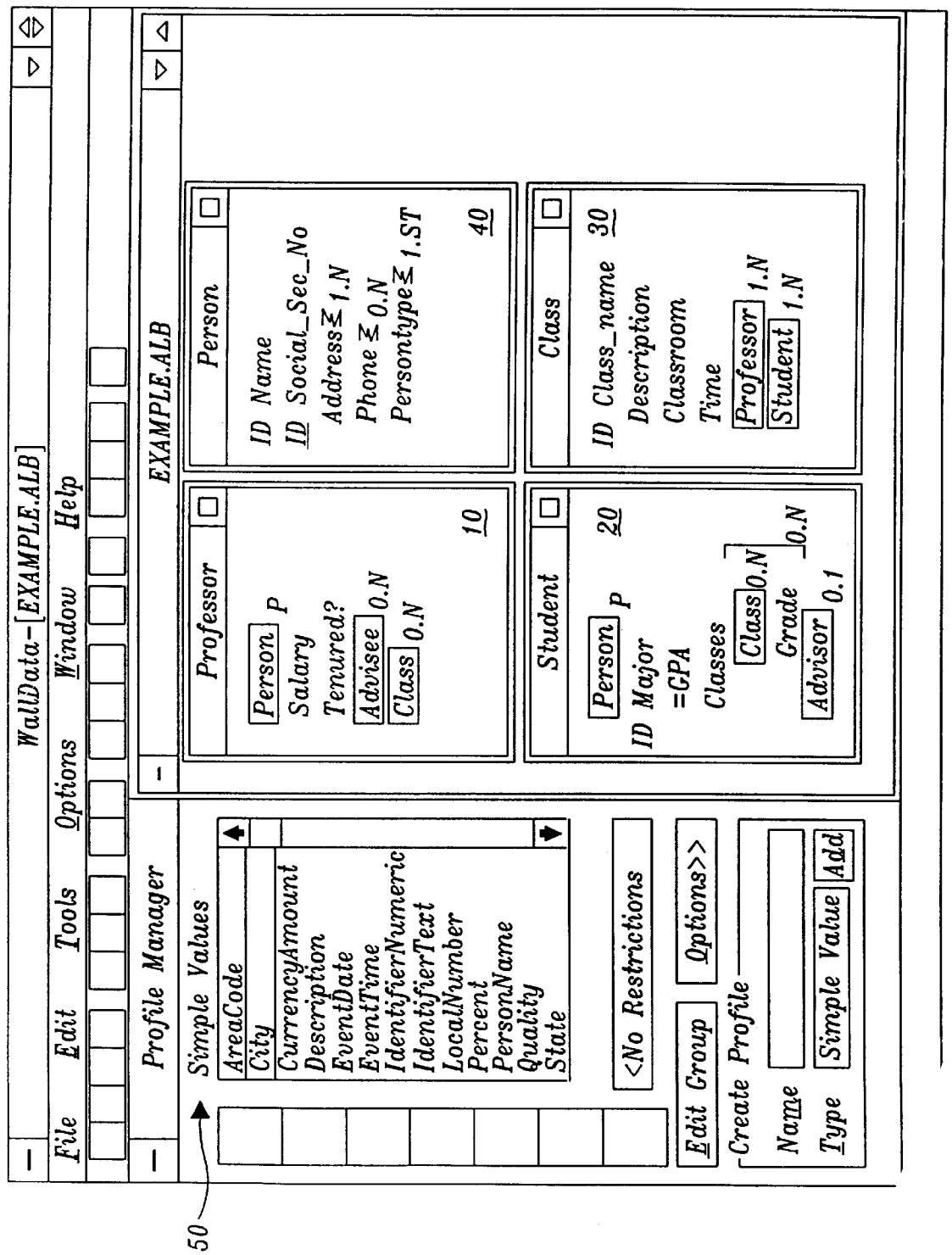
FIG. 1 represents a computer display of a graphical user interface screen that enables a user to create a database schema according to the present invention.

FIG. 1 shows a graphical user interface display screen exemplary of that produced by the present invention, which allows a user to create and manipulate data that will be stored in the database. In order to more clearly explain the present invention, a sample album is provided as follows. This album represents a database that could be used by a small college. The database might include data identifying professors and the classes they teach, as well as students and the classes they take. Also included in the database would be more specific information about the professors and students. Additionally, the database might include a description of the classes taught at the college, the location of each class, and the time each class is held. Finally, it would probably be desirable to identify each student's advisor and each professor's advisees in the database.

In order to create such a database, a user would interact with the graphical user interface to create appropriate semantic objects. As will be apparent from the following example, a semantic object simply represents a conceptual unit of data that the user desires to store in the database. The objects are called "semantic" objects because their definition and structure have meaning for the user developing the database.

In FIG. 1, four semantic objects are shown. A first semantic object 10 represents a professor at the college. Within the semantic object 10 are a number of attributes that are associated with each professor. Each professor has a salary, an indication of whether the professor is tenured, one or more advisees whom the professor counsels, and information regarding one or more classes that the professor teaches. A semantic object 20 represents a student at the college. Each student has attributes such as the student's major, the student's grade point average, classes that the student is taking and the grade received in each class, and the name of the professor, if any, who is the student's advisor.

A semantic object 30 describes the classes taught at the college. The attributes that define the class include the class name, the class description, the classroom where the class is taught, and the time at which the class is taught. Additionally, for each class, the professor teaching the class and the students taking the class are identified.

A semantic object 40 is a "parent" type of the semantic objects 10 and 20. The semantic object type 40 defines attributes that are common to every person in the college. Each person has a name, a social security number, an address, and a phone number. Because these attributes are common to all people at the college, they are properly placed in their own semantic object. The professor and student semantic objects are subtypes of the person semantic object 40 and, because a professor is a person and a student is a person, each professor and each student has every attribute of the person semantic object. Those attributes that are unique to a professor (e.g., tenured) are defined within the professor semantic object.

As will be described in detail below, the present invention allows a user to create semantic object data models that represent any kind of information that the user desires to store in a database. The user can easily create the semantic objects, provide the attributes for each semantic object, and define the relationships between the semantic objects in a way that reflects how the user views the data. The collection of semantic objects that define the semantic object data model are stored in a data structure referred to as the album. The album thus represents a collection of data and the relationships that exist between the data to be stored on a database. For the purposes of the present specification, the terms semantic object data model and album are considered to be synonymous. Once the user has completed the album, the user selects a "validate album" option, which verifies the user has not made any modeling errors. Once the album has been validated, the user selects a "Generate Schema" option, which causes the album to be transformed into a series of commands or function calls that are interpreted by a commercially available database program to create a plurality of relational tables that reflect the semantic object data model created by the user.

In order to further aid the understanding of the present invention, it is helpful to understand the meaning of the following terms:

album a collection of semantic objects that represent data to be stored in the database semantic object a logical grouping of information that defines an entity to be stored in the database attribute a specific piece of information that describes a characteristic of a semantic object in which the attribute is placed simple value attribute a single piece of data such as a name, salary, social security number, etc., contained within a semantic object group attribute a logical grouping of attributes that are commonly found together (for example, an address is defined as a group which includes the street name, city, state, and ZIP code)

formula attribute a mathematical operation that describes a characteristic of a semantic object object link attribute an attribute that defines a relationship between two or more semantic objects profile a template that is used to create a corresponding attribute Each attribute described above has a profile from which it is created. However, an attribute is associated with a particular semantic object and its properties can be overridden from those defined in the corresponding profile. Profiles are used to allow a user to easily change all the attributes in the semantic object data model by changing the profile from which the attributes are derived, where many attributes of the same type might be placed in different semantic objects.

As can be seen in FIG. 1, the present invention includes a profile manager window 50 from which a user may select a predefined profile; alternatively, the user can create his/her own profiles. The profile manager is used when defining attributes for a semantic object. For example, a user can drag and drop a predefined or newly created profile into a semantic object in order to create a corresponding attribute within that semantic object. To create the name attribute within the person semantic object 40, a user selects the "identifier-text" profile within the profile manager and drops it into the person semantic object. The user can then associate a title such as "name" with this attribute that makes sense within the given semantic object.

Figure 2:
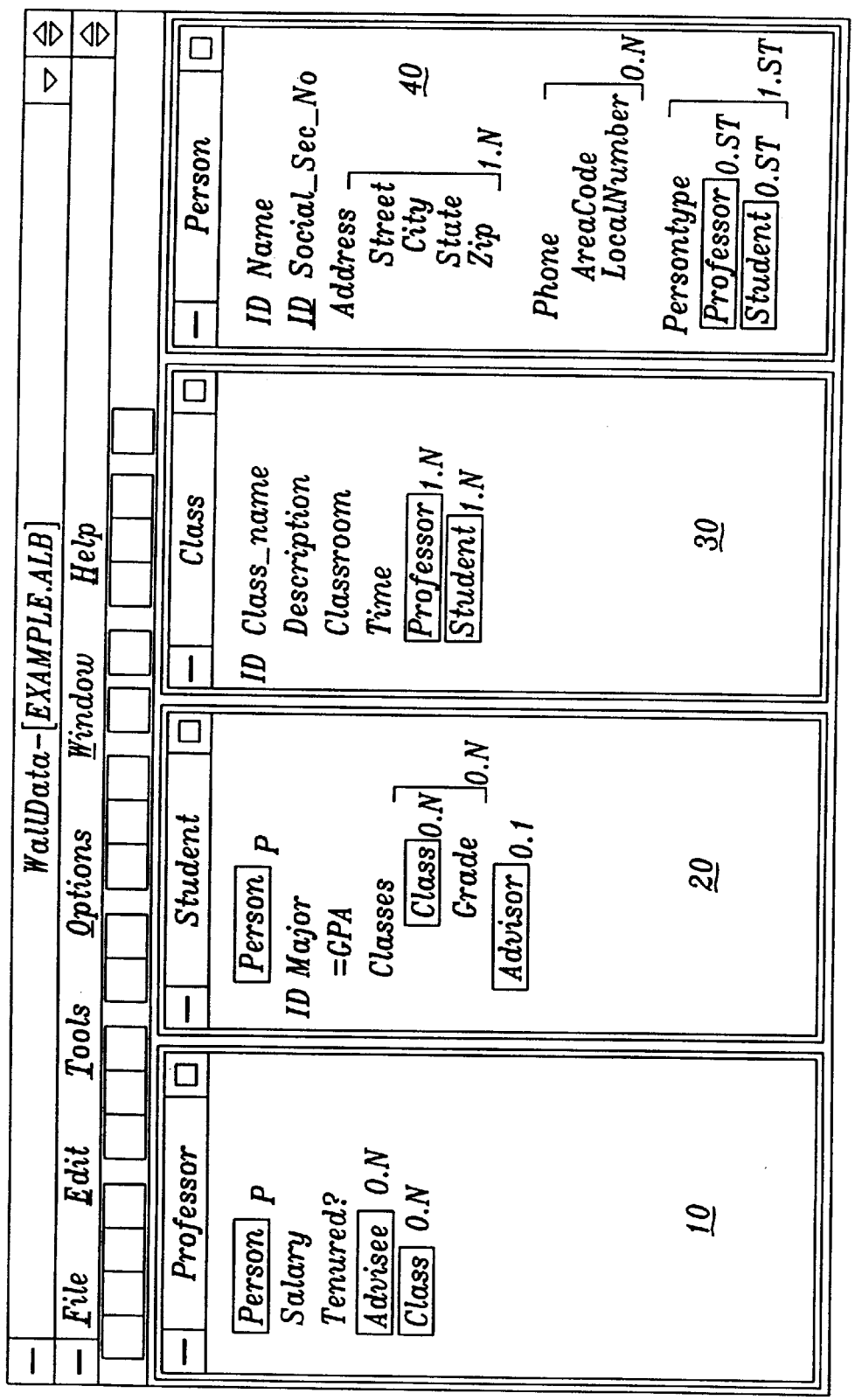
FIG. 2 represents a computer display of a graphical user interface screen showing an example of a plurality of semantic objects that can be manipulated by a user and transformed into a database schema.

FIG. 2 shows in greater detail the four semantic objects shown in FIG. 1. The graphical user interface indicates to the user of the system the type of attributes that are found within a semantic object. Simple value attributes are listed by their name. Group attributes are shown in brackets. Object link attributes are shown outlined. An equal sign before an attribute indicates the attribute is a formula type.

Every attribute within the semantic objects indicates whether a user uses the attribute to refer to a particular instance of the semantic object. This characteristic is shown as the ID indication to the left of the attribute name. If the indication as shown as "<u>ID</u>," that indicates the attribute defines a unique instance of the semantic object. For example, in FIG. 2, the attribute social security number in the person semantic object shows that a person's social security number uniquely identifies a particular person. If the indication is shown as "ID," without the underline, that indicates that the user may use the attribute to refer to an instance of the semantic object but the attribute may not be unique. For example, the name of a person in the college semantic object data model shown in FIG. 2 may be used to refer to a person in the college. However, two people may have the same name. Thus, the name attribute is not a unique identifier. Finally, if no ID indication is shown to the left of the attribute, that indicates the attribute is not used to specify particular instances of a semantic object.

In the lower right-hand corner of each attribute is an indication of the attribute's cardinality. This is shown as a subscript consisting of a pair of integers having the form "n.m." The "n" refers to a minimum cardinality of an attribute. This is the minimum number of instances of the attribute the semantic object must have to be valid. For example, the person semantic object 40 shown in FIGS. 1 and 2 shows a group attribute "address" having a cardinality 1.N. The "1" refers to the fact that a person must have at least one address. The second numeral refers to the maximum cardinality, i.e., the maximum number of instances of the attribute that a semantic object can have. The maximum cardinality of the group attribute address is "N," thereby indicating that a person may have many addresses.

A subscript "P" next to an object link attribute indicates that one semantic object in which the attribute is shown has a parent semantic object. The student semantic object 20 contains an object link attribute called "person" with a subscript "P" next to it to indicate that the person semantic object is a parent-type of the student semantic object. Similarly, the person semantic object contains an object link attribute called student having a subscript 0.ST indicating that the Student semantic object is a subtype of the Person semantic object. Additionally, subtype attributes may be placed in a group as shown by the group "Persontype" followed by the subscript "1.ST" which indicates that a person must be either a professor or a student in this semantic object data model.

As will be appreciated, the visual display of the semantic object data model allows the user to see a representation of the data model as they have defined it. The semantic object data model allows a user to manipulate the relationships between the semantic objects and the attributes contained therein. By manipulating the semantic objects, adding or deleting attributes as well as creating groups, parent types and subtypes, the user can model the data in a way in which the user views the data. Upon transformation of the semantic objects, the user will be provided with a database schema that will store the information in a set of relational tables that reflect the user's view of how he or she envisions the data.

In order to allow a user to create a semantic object model, the present invention provides for the creation and manipulation of the following elementary building blocks: semantic objects; has-a type attributes (i.e., simple value, formula, object link, and group); and is-a type attributes (parent, subtype, and subtype group). The user creates the semantic objects by selecting a "create semantic object" option from a tools menu in the graphical user interface. The user enters "professor," "student," "class," and "person" in order to create the four semantic objects 10, 20, 30, and 40. Once the semantic objects have been created, a user then enters attributes into those semantic objects by choosing a profile of the desired attribute and dragging the profile into the boundary of the semantic object. For example, to create the salary attribute, the user selects the currency profile from the profile manager 50 and drops it into the professor semantic object 10. The user can then use the property sheet 60 shown in FIG. 3 to change the name of the currency attribute to something that makes sense for the user. The user can then also change any of the attribute properties using the property sheet 60. In order to create the relationships between the semantic objects, a person selects one semantic object by clicking a mouse pointer in the square shown in the upper right-hand corner of the semantic object and physically places the mouse pointer in the bounds of another semantic object. For example, to create the relationship between student and class, a user would select the class semantic object and place it within the physical boundaries of the student semantic object. This action causes the system to create an object link attribute called "class" and place it in the student semantic object, as well as to create an object link attribute called "student" and place it in the corresponding class semantic object. In order to create a parent relationship between a semantic object and its parent type, a user selects the semantic object by clicking a mouse pointer in the square in the upper right-hand corner of the semantic object while simultaneously holding down a shift key on the computer. The system then produces a small subtype icon that is placed in the physical boundaries of its parent semantic object. For example, in order to create the attributes that signify the parent relationship between student and person, a user selects the student semantic object while holding the shift key and places the subtype icon within the person semantic object. Placing a subtype attribute in the person semantic object automatically causes a parent-type attribute called "person" to be placed in the student semantic object.

Once the user has created and validated the semantic object data model, the user then selects the "generate schema" option and the system produces the set of commands or function calls which in turn cause the database program to generate a database schema corresponding to the semantic object data model created.

Figure 3:
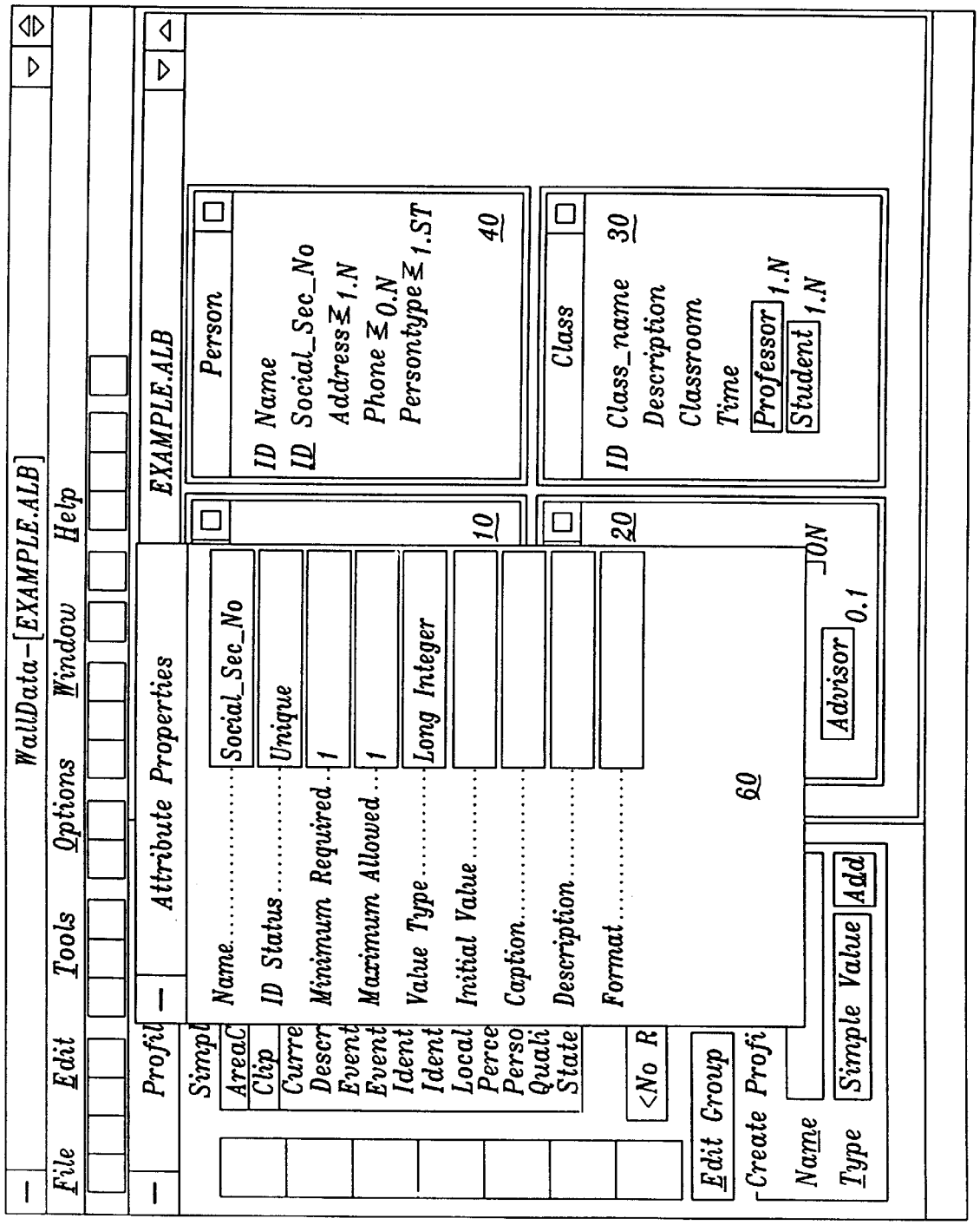
FIG. 3 represents a computer display screen showing an exemplary property window where a user can alter one or more property values of a semantic object, profile, or attribute.
Figure 3A:
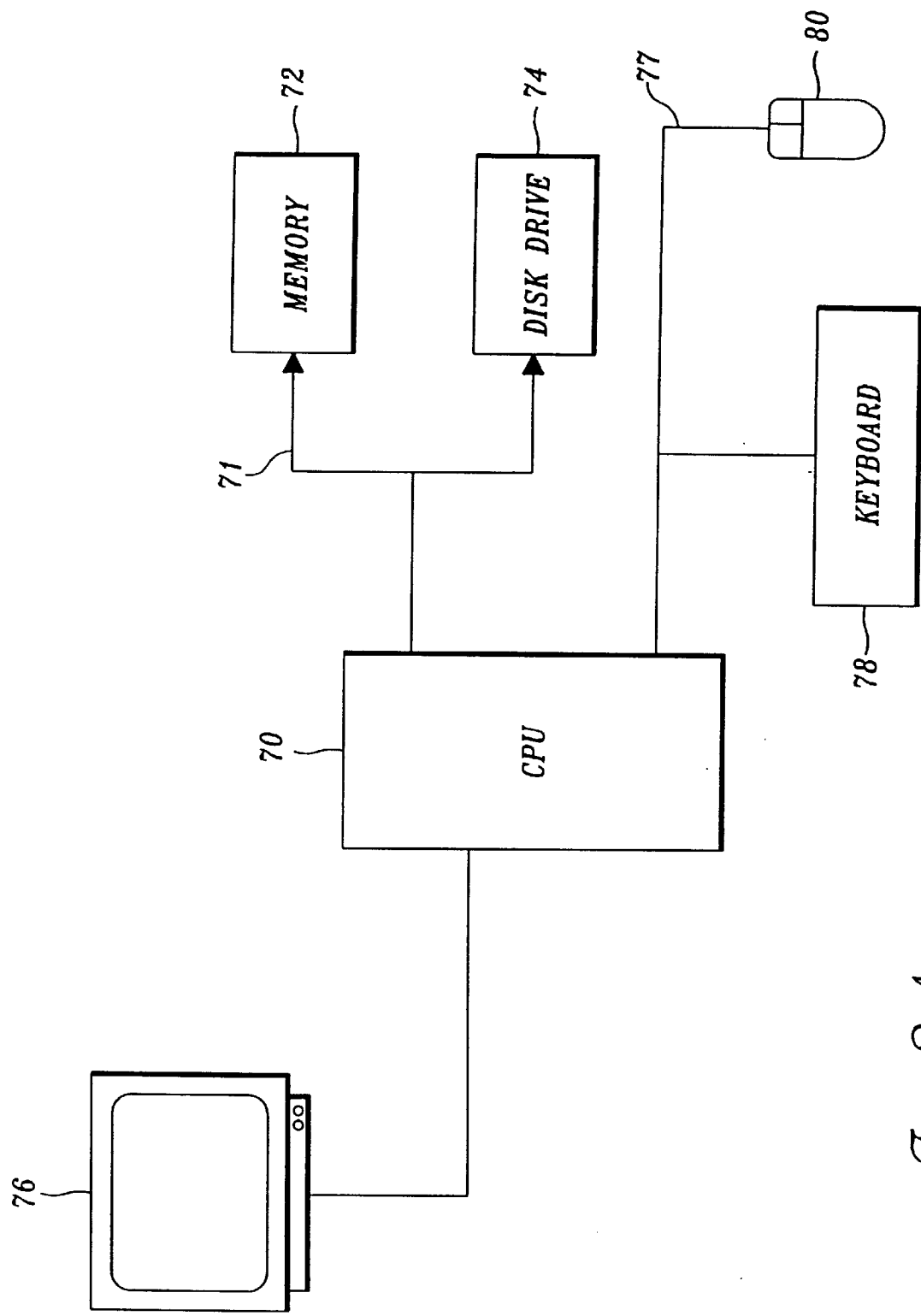
FIG. 3A is a block diagram of a computer system that implements the present invention.

The present invention is implemented using a general purpose, desktop, or personal computer similar to that shown in FIG. 3A. The computer includes a central processing unit (CPU) 70, memory 72, a disk drive 74, a display screen 76, a keyboard 78, and an input pointing device, such as a mouse 80. A suitable computer program, having the functions described below, causes the computer to provide for the creation of a semantic object data model and for the validation and transformation of the semantic object data model into a set of commands that cause a database program to create a database schema that mirrors the semantic object data model.

In the present preferred embodiment of the invention, an object-oriented programming language such as C++ is used to produce the program that operates under a graphical user interface, such as Microsoft™ Windows 3.1, and the semantic object modeling building blocks defined above. The following description does not discuss in detail the computer code and low level routines that operate under the graphical user interface, nor details of the graphical user interface. However, these routines are considered to be either well known to those of ordinary skill in the art of computer programming, or easily determined based upon the flow charts provided in the drawings. As will be fully described, the semantic objects, attributes, and their corresponding profiles are each created with a C++ class. The following tables set forth the data members that are maintained by each of the C++ classes and used to create the semantic objects, attributes, and profiles.

| Class Album | |
|---|---|
| Data Member | Data Type |
| Name | Text |
| Creation date | Date |
| Created by | Text |
| Contents | Unordered list of pointers |

| Class Semantic Object | |
|---|---|
| Data Member | Data Type |
| ID | Integer |
| Name | TEXT |
| Caption | TEXT |
| Description | TEXT |
| Contents | Ordered list of pointers |

| Class Simple Value Profile | |
|---|---|
| Data Member | Data Type |
| ID | Integer |
| Name | TEXT |

Class Simple Value Profile

| Data Member | Data Type |
| --- | --- |
| Caption | TEXT |
| Description | TEXT |
| ID Status | (Unique, non-unique, none) |
| Value Type | Any DBMS Data Type |
| Length | Integer |
| Format | TEXT |
| Initial Value | TEXT |
| MinCardinality | Integer |
| MaxCardinality | Integer |
| Derived Attributes | List of pointers |
| Referencing Profiles | List of pointers |

Class Object Link Profile

| Data Member | Data Type |
| --- | --- |
| ID | Integer |
| Name | TEXT |
| Caption | TEXT |
| Description | TEXT |
| ID Status | (Unique, non-unique, none) |
| MinCardinality | Integer |
| MaxCardinality | Integer |
| Base Semantic Object | Pointer |
| Derived Attributes | List of pointers |
| Referencing Profiles | List of pointers |

Class Simple Value Attribute

| Data Member | Data Type |
| --- | --- |
| ID | Integer |
| Name | TEXT |
| Description | TEXT |
| Caption | TEXT |
| ID Status | (Unique, non-unique, none) |
| Value Type | Any DBMS Data Type |
| Length | Integer |
| Format | TEXT |
| Initial Value | TEXT |
| MinCardinality | Integer |
| MaxCardinality | Integer |
| Container Pointer | Pointer |
| Base Profile | Pointer |

Class Group Profile

| Data Member | Data Type |
| --- | --- |
| ID | Integer |
| Name | TEXT |
| Caption | TEXT |
| Description | TEXT |
| ID Status | (Unique, non-unique, none) |
| MinCardinality | Integer |
| MaxCardinality | Integer |
| MinCount | Integer |
| MaxCount | Integer |
| Format | TEXT |
| Derived Attributes | List of pointers |
| Contents | List of pointers |
| Referencing Profiles | List of pointers |

Class Group Attribute

| Data Member | Data Type |
| --- | --- |
| ID | Integer |
| Name | TEXT |
| Caption | TEXT |
| Description | TEXT |
| ID Status | (Unique, non-unique, none) |
| MinCardinality | Integer |
| MaxCardinality | Integer |
| MinCount | Integer |
| MaxCount | Integer |
| Format | TEXT |
| Container Pointer | Pointer |
| Contents | Ordered list of pointers |
| Base Profile | Pointer |

Class Formula Profile

| Data Member | Data Type |
| --- | --- |
| ID | Integer |
| Name | TEXT |
| Caption | TEXT |
| Description | TEXT |
| Expression | TEXT |
| Formula Type | (Not stored, stored) |
| Value Type | Any DBMS Data Type |
| Length | Integer |
| Required Flag | (Yes, No) |
| Format | TEXT |
| Derived Attributes | List of pointers |
| Referencing Profiles | List of pointers |

Class Formula Attribute

| Data Member | Data Type |
| --- | --- |
| ID | Integer |
| Name | TEXT |
| Caption | TEXT |
| Description | TEXT |
| Expression | TEXT |
| Formula Type | (Not stored, stored) |
| Value Type | Any DBMS Data Type |
| Length | Integer |
| Required Flag | (Yes, No) |
| Format | TEXT |
| Container Pointer | Pointer |
| Base Profile | Pointer |

Class Object Link Attribute

| Data Member | Data Type |
| --- | --- |
| ID | Integer |
| Name | TEXT |
| Description | TEXT |
| Caption | TEXT |
| ID Status | (Unique, non-unique, none) |
| MinCardinality | Integer |
| MaxCardinality | Integer |
| Container Pointer | Pointer |
| Base Profile | Pointer |
| Pair Pointer | Pointer |

| Class Parent Attribute | |
|---|---|
| Data Member | Data Type |
| ID | Integer |
| Name | TEXT |
| Caption | TEXT |
| Description | TEXT |
| Container Pointer | Pointer |
| Pair Pointer | Pointer |
| Base Profile | Pointer |

| Class Subtype Attribute | |
|---|---|
| Data Member | Data Type |
| ID | Integer |
| Name | TEXT |
| Caption | TEXT |
| Description | TEXT |
| Required Flag | (Yes, No) |
| Container Pointer | Pointer |
| Base Profile | Pointer |
| Pair Pointer | Pointer |

| Class Subtype Group Attribute | |
|---|---|
| Data Member | Data Type |
| ID | Integer |
| Name | TEXT |
| Caption | TEXT |
| Description | TEXT |
| Required Flag | (Yes, No) |
| MinCount | Integer |
| MaxCount | Integer |
| Container Pointer | Pointer |
| Contents | Ordered list of pointers |

Creating the Semantic Object Data Model

The above-referenced tables describe the C++ classes that are used to create the building blocks for the semantic object data model. FIGS. 4–15 describe the operations that must be completed when a user creates an instance of each of the various building blocks as the user defines the semantic object data model described above. The user accomplishes this task by interacting with the user interface on display screens such as those shown in FIGS. 1, 2, and 3.

Figure 4:
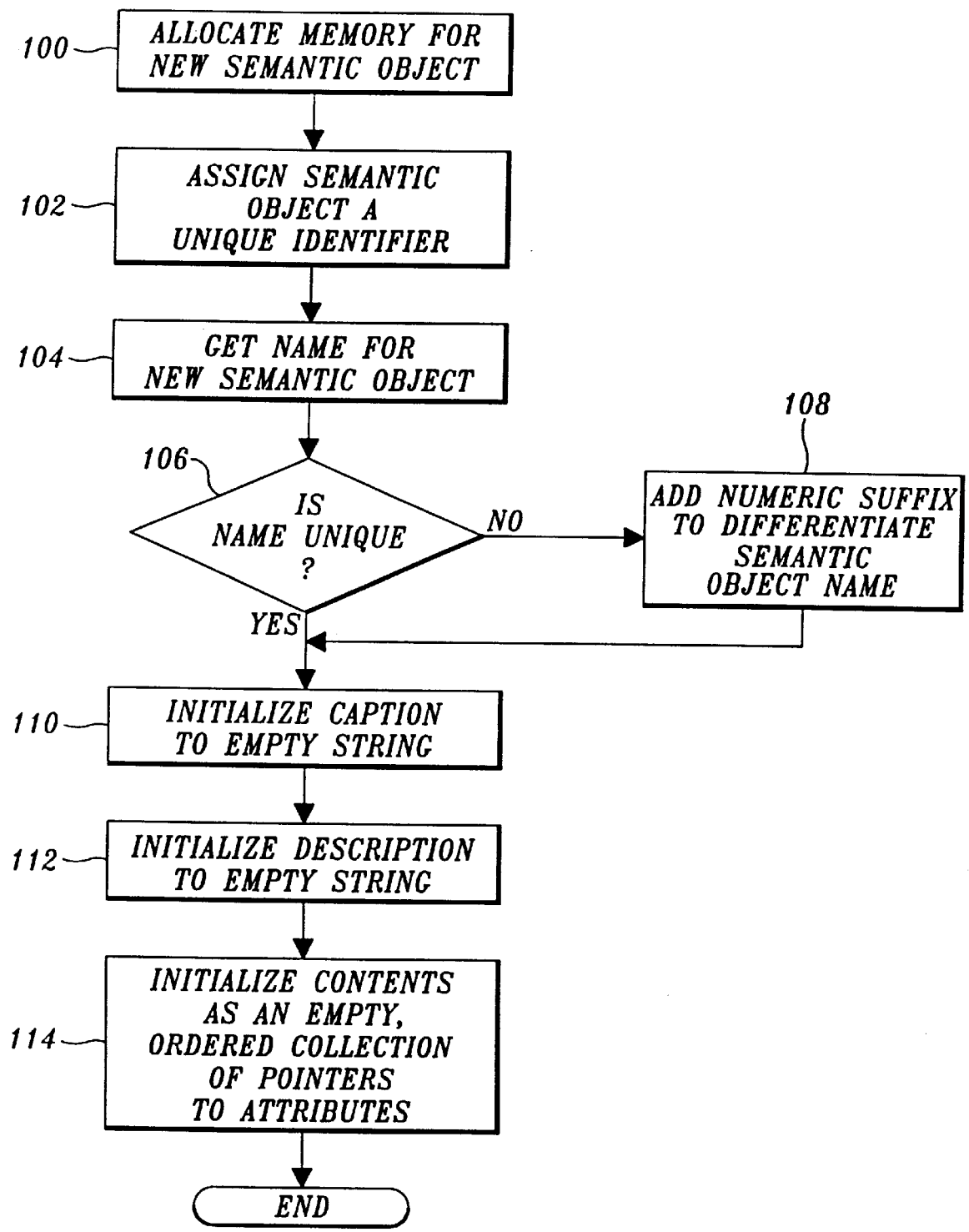
FIG. 4 is a flow chart showing the steps performed by the present invention to create a semantic object.

FIG. 4 shows the steps implemented in the present invention when a user creates a new semantic object. First, the computer allocates memory for a new semantic object block at step 100. Next the computer assigns the semantic object a unique identifier at step 102. In the present preferred embodiment, a counter is incremented each time a semantic object, profile or attribute is created in the semantic object data model. The value of the counter is assigned to each object, attribute or profile in order to uniquely identify the semantic object, profile, or attribute in the semantic object data model with a numeric value. At step 104, the user is prompted for a name of the semantic object created. The name is tested to determine whether it is unique among all the semantic objects created in the semantic object data model, at a step 106. If the name is not unique, a numeric suffix is added to differentiate the name of the semantic object at a step 108. For example, if two semantic objects are created with the name "person," the second one would be given a name "Persona_1" to differentiate it from the former. Once the name of the semantic object is determined to be unique or differentiated, the caption is initialized to be an empty string at a step 110. The description is then initialized to be an empty string at a step 112 and, finally, the contents data member of the semantic object is initialized as an empty, ordered collection of pointers to attributes that are contained within the semantic object at a step 114.

As indicated, all semantic objects within a particular semantic object data model are stored in an album. The album is simply a list of pointers to each semantic object. Each time a new semantic object is created, a corresponding pointer to the new semantic object must be added to the contents list of the album.

Figure 11:
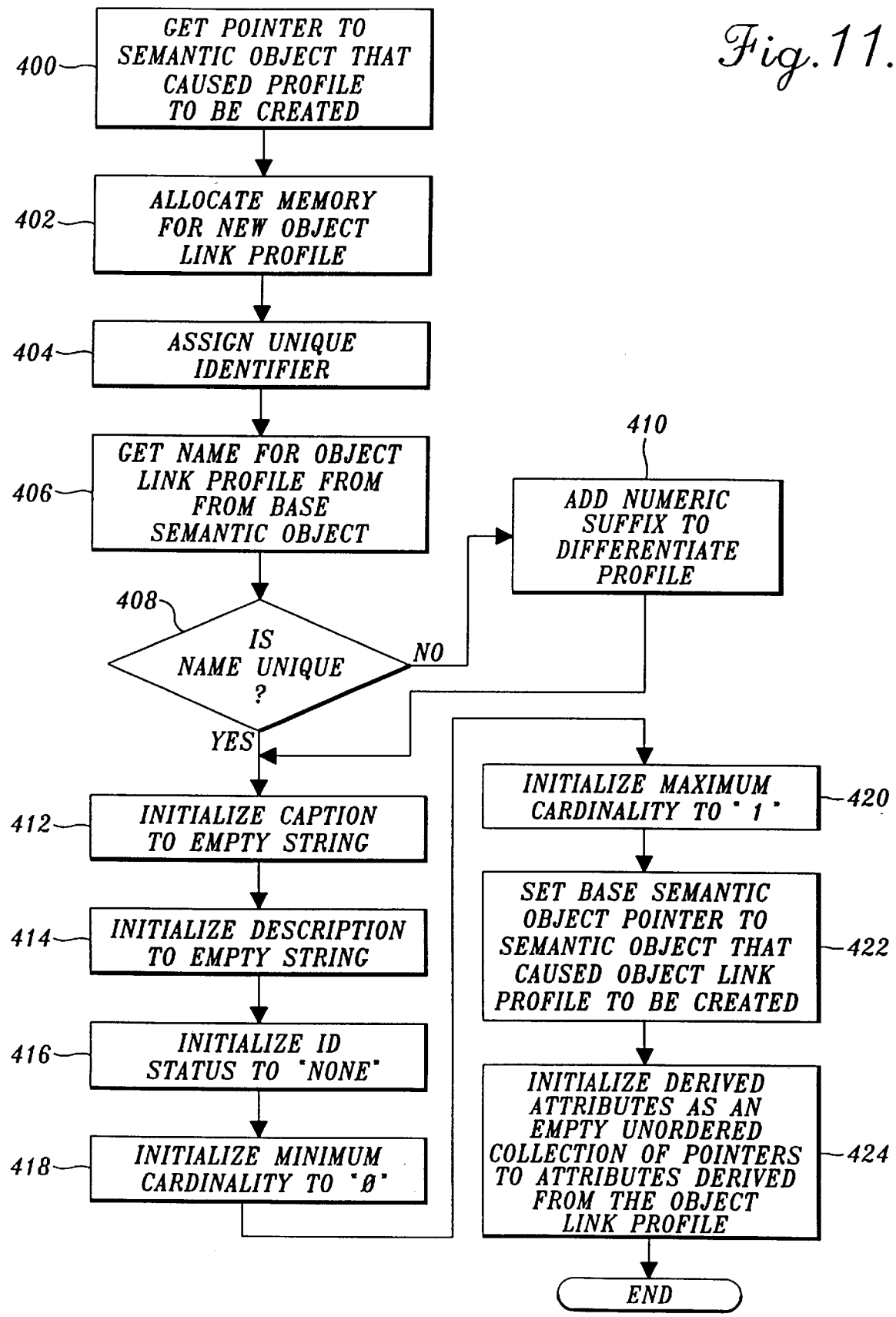
FIG. 11 is a flow chart showing the steps performed to create an object link profile.

Once the semantic object has been created, the system automatically creates a corresponding object link profile according to the steps set forth in FIG. 11. Object link profiles are used to relate one semantic object to another within the semantic object data model. For example, as soon as the user creates the student semantic object 20, shown in FIG. 1, the system creates a corresponding object link profile based upon the student semantic object profile. The object link profile is used by the system to create corresponding object link attributes that related the student semantic object to other semantic objects. To create the object link profile, the system first provides a pointer to the semantic object that causes the corresponding object link profile to be created at step 400. Memory for the new object link profile is then created at a step 402, and the profile is assigned a unique identifier at a step 404. The name of the base semantic object determined through the pointer received from a step 400, is copied to the name property of the object link profile at a step 406. At a step 408, the system determines whether the name is unique among all profiles in the semantic object data model. If the name is not unique, a numeric suffix is added to differentiate the newly created profile from the remaining profiles, at a step 410. Once the name of the object link profile has been differentiated, the caption is initialized to an empty string at a step 412. Next, the description is initialized to an empty string at a step 414. At a step 416, the ID status is initialized to "none." As described above, the ID status of a semantic object or an attribute indicates whether or not the attribute is used to uniquely identify an instance of the semantic object.

After initializing the ID status, the minimum cardinality for the object link profile is initialized to zero at a step 418. Again, the minimum cardinality refers to the minimum number of object instances an object link attribute derived from this profile must connect to in order for the data to be valid. The maximum cardinality for the object link profile is set to one at a step 420. At a step 422, the base semantic object pointer is set to the address of the semantic object that caused the object link profile to be created. Finally, in a step 424, the derived attribute list is initialized as an empty, unordered collection of pointers to object link attributes that are derived from the object link profile.

As indicated above, semantic objects are defined by the attributes they contain. An attribute defines the characteristics of the semantic object as well as relationships between semantic objects. The most common type of attribute is the simple value attribute that holds a single value in the database. All simple value attributes are based upon some corresponding simple value profile. The logic system of the present invention provides the user with a predefined list of typical simple value profiles that can be used to describe an object. Such simple value profiles include: area code, city, currency amount, description, event date, event time, identifier-numeric, identifier-text, local number, percent, person name, quantity, state, street, and ZIP code. However, if the user desires, he/she can create a simple value profile and use it in any number of semantic objects in the semantic object data model. For example, a user may wish to define a simple value "salary" to describe how much money a person in the database makes per year. While a user could utilize the identifier-numeric profile for this, a customized profile may better suit the user's needs, because it is more easily recognizable. Additionally, by having a specifically created attribute profile, a user can easily change the properties of any attribute created from the profile by simply changing the profile properties. Because each profile maintains a list of derived attributes, it is a simple matter to update any property of all attributes based upon the profile.

Figure 5:
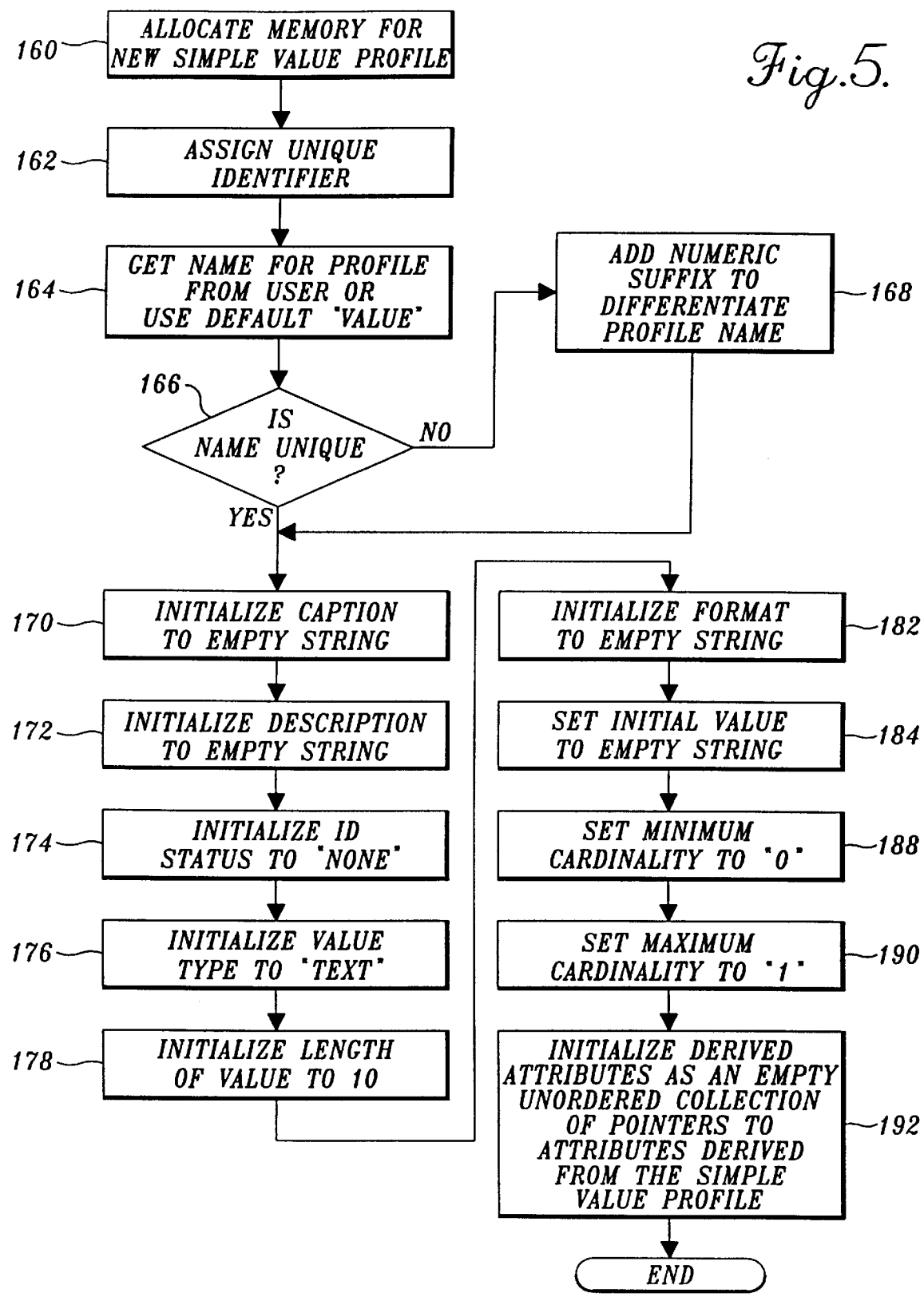
FIG. 5 is a flow chart showing the steps performed to create a simple value profile.

FIG. 5 shows the steps taken by the present invention to create a simple value profile. First, sufficient memory is allocated for the new simple value profile at a step 160. Then, the new profile is assigned a unique integer identifier at a step 162. The user is then prompted for a name for the profile at a step 164. If no name is provided, the system gives the new profile a default name of "value." At a step 166, it is determined whether the name of the profile is unique among all profiles within the semantic object data model. If not, a numeric suffix is added to differentiate the name of the new profile at a step 168. Once the name of the profile is different from all other profiles in the semantic object data model, the caption property of the simple value profile is initialized as an empty string at a step 170. The caption property provides an alternative field title to be used on a form or report produced by an application program accessing the database whose schema is defined by the semantic object data model.

The description property of the simple value profile is initialized as an empty string at a step 172. The ID status property is then initialized to "none" at a step 174. At a step 176, the value type is initialized to "text" at a step 176. By changing the value type of the profile, the user can select the type of data that the simple value profile represents. The user can select any of a predefined set of common DBMS data types, including text, currency, date, time, memo, tiny integer, short integer, long integer, true/false, counter, floating point, double floating point, OLE object, and binary. Once the value type has been value profile is initialized toy of the simple value profile is initialized to ten at a step 178. As will be appreciated, the length property is only useful with variable length value types.

The format property is initialized as an empty string in a step 182. The format property defines a field that holds data to be used by a database application program in order to determine how the data is to be displayed. The initial value property for the simple value profile is initially defined as an empty string at a step 184, and the minimum cardinality for the profile is set to zero at a step 188, while the maximum cardinality is set to one at a step 190. Finally, the derived attributes property list for the simple value profile is initialized as an empty, unordered collection of pointers to attributes that are derived from the newly created simple value profile at a step 192.

While modeling the data to be stored on the database, the user creates semantic objects and places attributes within the semantic objects. The user can add a simple value attribute to the semantic object by selecting, dragging, and dropping a simple value profile from the profile manager 50, shown in FIG. 1, into the semantic object. Once a simple value profile is dropped into a semantic object, the system creates a corresponding simple value attribute. These steps are set forth in FIG. 6. After the simple value attribute is created, the system immediately inserts it into the semantic using the steps shown in FIGS. 16 and 17 as described below.

Figure 6:
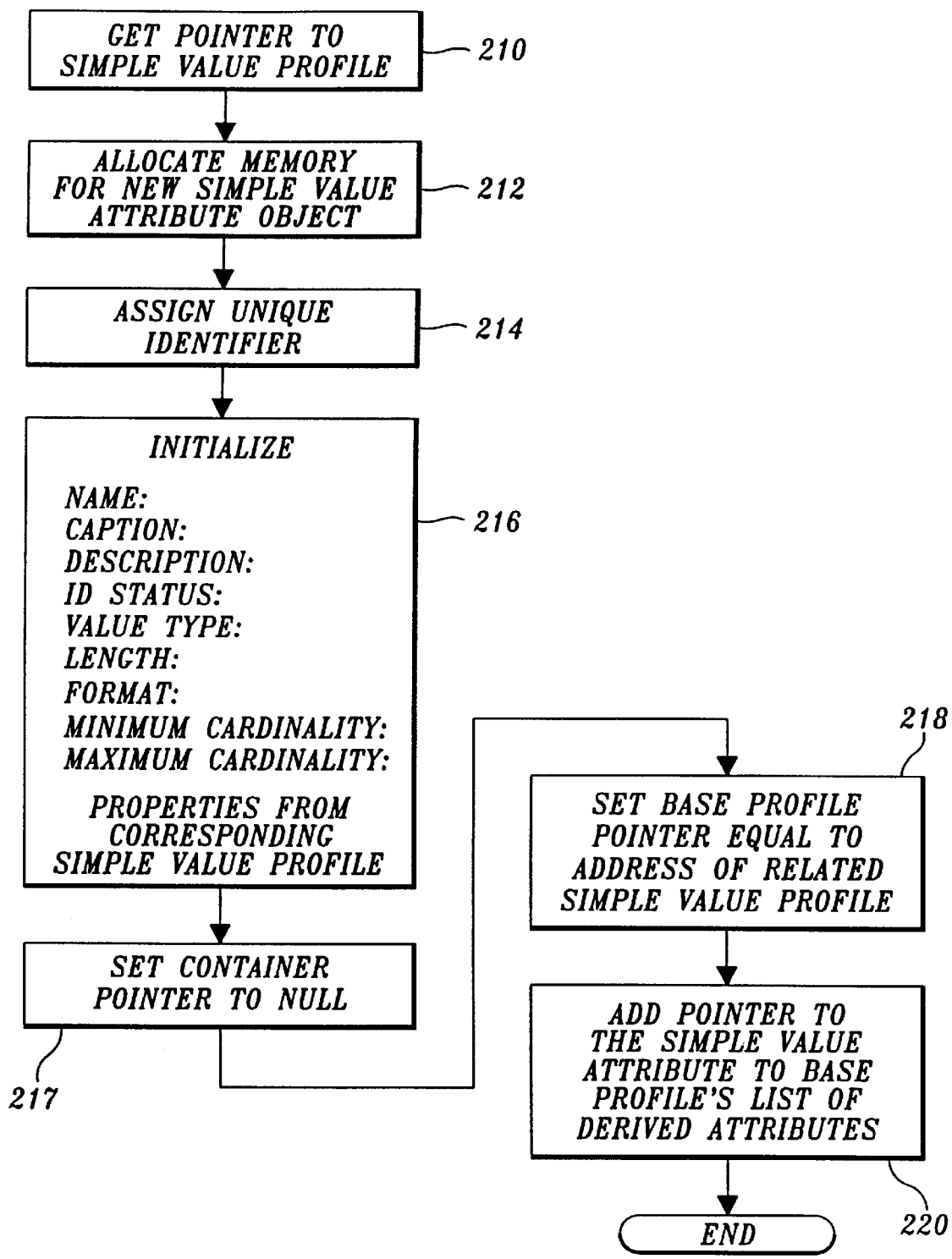
FIG. 6 is a flow chart showing the steps performed to create a simple value attribute.

Referring to FIG. 6, the system first gets a pointer to the corresponding simple value profile at a step 210. Next, sufficient memory is allocated for the new simple value attribute object at a step 212. The new simple value object is then given a unique integer identifier at a step 214. In a step 216, the name, caption, description, ID status, value type, length, format, minimum cardinality, and maximum cardinality properties are initialized from the corresponding property in the simple value profile used to create the simple value attribute. If at any time the user desires to change any one of the properties of the simple value attribute as they apply only to the semantic object in which the attribute is placed, the user may do so using the property sheet 60 shown in FIG. 3 and described above.

The container property is set equal to null at a step 217. When the simple value attribute is inserted into a semantic object, the contained pointer will be set equal to the address of the containing semantic object. If the simple value attribute is placed in a nested group, the container property will be set to point to the innermost group that contains the attribute during the routine that inserts the attribute. At a step 218, the base profile pointer is set equal to the address of the simple value profile from which the attribute was created. Finally, at a step 220, a pointer to the newly created simple value attribute is added to the list of the derived attributes maintained by the corresponding simple value profile. The derived attribute list maintained by a simple value profile is used by the system to effect changes to a property of all attributes based upon a profile if a user changes the property in the corresponding profile.

Some attributes used to describe a semantic object are normally thought of as groups. For example, the address attribute shown in FIGS. 1 and 2 is used to define where a person lives. Included in the address group are street, city, state, and ZIP code simple value attributes. A phone group attribute includes area code and local number simple value attributes. In addition to the predefined group attributes for address and phone provided by the system, a user may define their own group by first creating a group profile. The profile can then be used to generate corresponding group attributes in one or more semantic objects.

Figure 7:
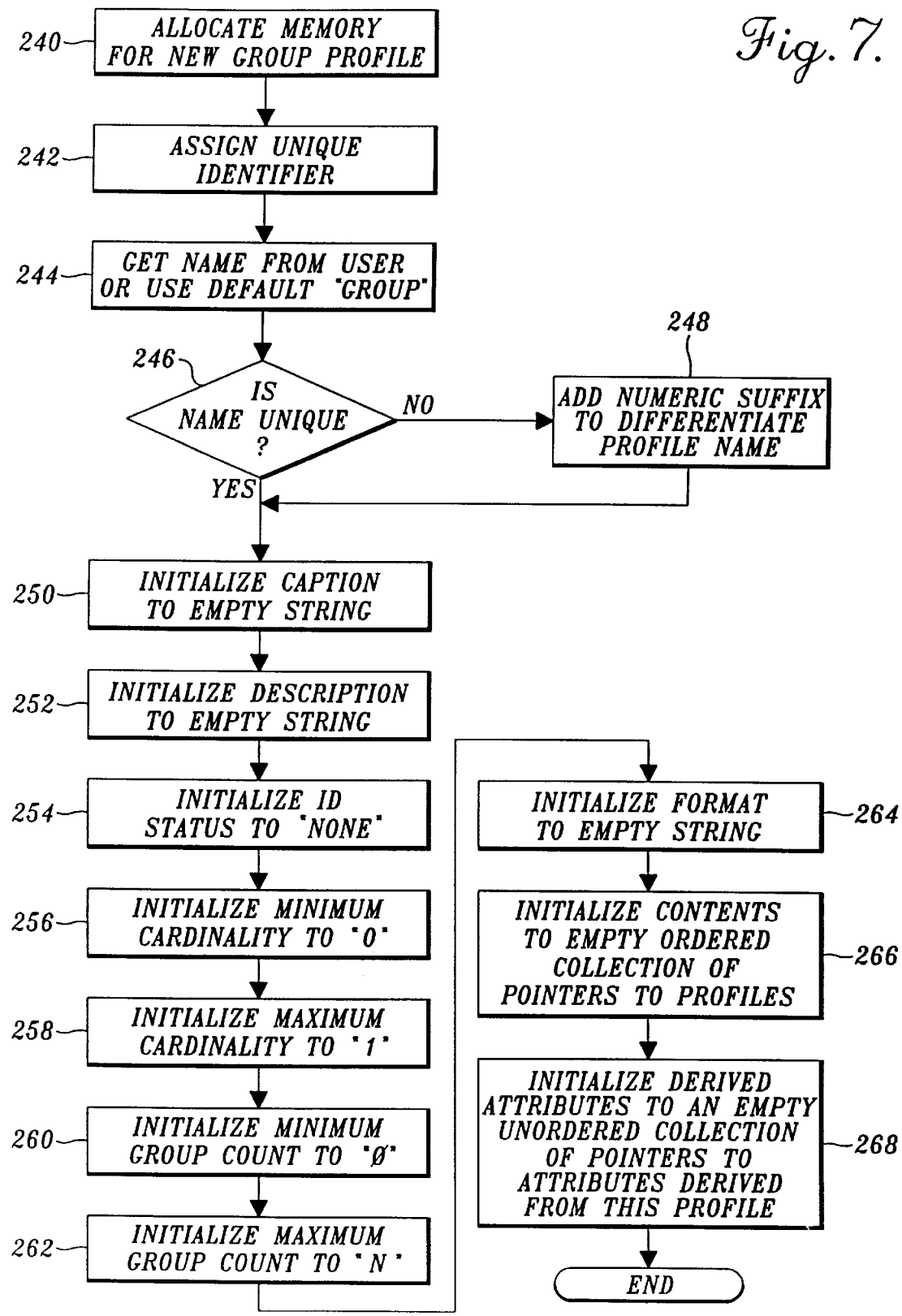
FIG. 7 is a flow chart showing the steps performed to create a group profile.

FIG. 7 shows the steps performed by the system to create a group profile. First, sufficient memory is allocated for the new group profile at a step 240. The group profile is then assigned a unique identifier at step 242. At a step 244, the user is prompted for a name for the group profile. If no name is provided, the system will use the default name "group." At a step 246, the system determines whether the group name is unique among all groups in the semantic object data model. If not, a numeric suffix is added to differentiate the group name from related names at a step 248. Next, the caption and description properties of the group profile are initialized to empty strings at steps 250 and 252. The ID status is then initialized to "none" at a step 254. The minimum cardinality is initialized to zero at a step 256 while the maximum cardinality is initialized to one at a step 258.

At a step 260 the minimum group count is initialized to zero and the maximum group count is initialized to "N" at a step 262. The minimum group count property defines the number of attributes within the group that must be present in order for the group to be valid. Similarly, the maximum group count property defines the maximum number of attributes that can be present in order for the group to be valid. For example, suppose a group profile is created called "Lunch Special." The group contains 10 simple value attributes each describing a particular side dish. A customer must select two items but can select no more than three items. Therefore the group has a minimum count of 2 and a maximum count of 3. An additional use for the minimum and maximum counts is to specify exclusivity, which is particularly useful in subtype groups described below. For example, the Persontype subtype group shown in FIGS. 1 and 2 contains two subtype attributes. By specifying the minimum count of the Persontype group to be 1 and the maximum count to be 1, the user indicates that a person must be either a professor or a student, but not both. If the subtype group is required, then some choice must be made (i.e., a person must be either a student or a professor), but if the group is not required, then a person might be neither a student nor a professor.

The format property for the group is initialized to an empty string in a step 264. At a step 266, the contents property of the group is initialized as an empty, ordered collection of pointers to the profiles that are contained within the group profile. Finally, at a step 268, the derived attributes list is initialized as an empty, unordered collection of pointers to group attributes that are derived from the newly created group profile.

Group profiles will usually have other profiles added to their contents list before being used in the semantic object data model. These additions are performed using the mechanisms defined in FIG. 18. Once a new group profile has been created, the user can create a corresponding group attribute in one or more semantic objects by selecting the group profile, dragging, and dropping it into the boundaries of a semantic object. Once a group profile is dropped within a semantic object, the system creates a corresponding group attribute according to the steps shown in FIG. 8.

Figure 8:
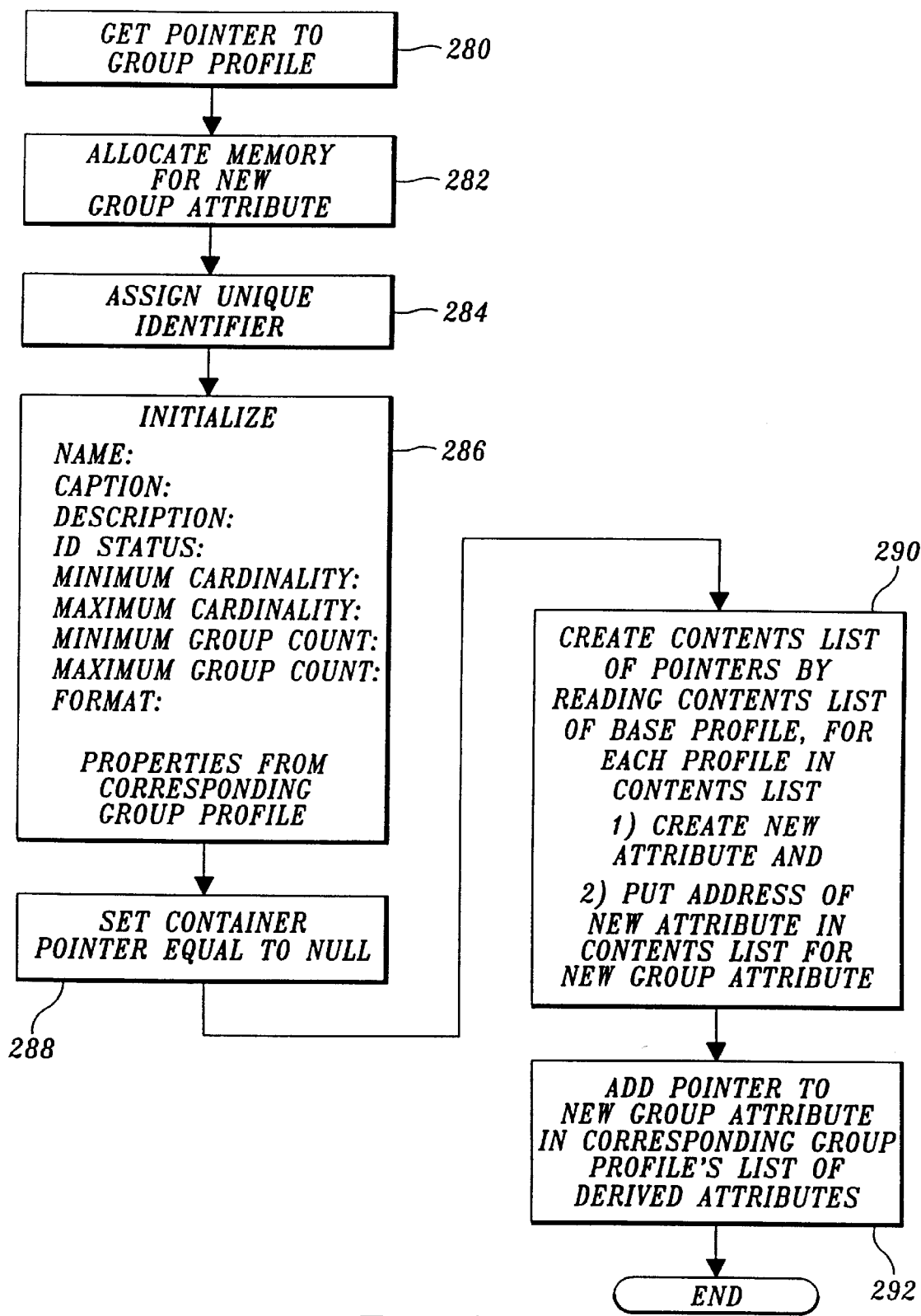
FIG. 8 is a flow chart showing the steps performed to create a group attribute.

In order to create a group attribute, it is first necessary to get a pointer to the corresponding group profile, as shown at a step 280 in FIG. 8. Next, sufficient memory is allocated for the new group attribute at a step 282. The group attribute is assigned a unique identifier at a step 284. At a step 286, the group's name, caption description, ID status, minimum cardinality, maximum cardinality, minimum group count, maximum group count, and format are initialized from the properties of the corresponding group profile. At a step 288, the container pointer is set equal to null. When the group attribute is inserted into a semantic object the container pointer is set equal to the address of the semantic object or the group attribute in which the new group attribute is logically included using the methods of FIGS. 16 and 17. If the group attribute is nested in another group attribute, the container pointer will be set to point to the innermost group. Next, the attributes that are defined by the contents list of the group profile are created. For each profile in the contents list, the system creates a new attribute and places a pointer to the new attribute in the contents list for the new group attribute using the methods of FIG. 17. Finally, at a step 292, a pointer to the new group attribute is placed in the corresponding group profile's list of derived attributes.

Another type of attribute used to model the data in the semantic object data model is the formula attribute. As will be appreciated, formulas calculate values or manipulate data types according to a predefined set of common arithmetic operators. The type of operation performed depends upon the types of the operands and expression of the formula. For example, the addition of two values of integer types produces a third value of integer type, while the addition of two expressions of string type produces a concatenated string-type expression.

Figure 9:
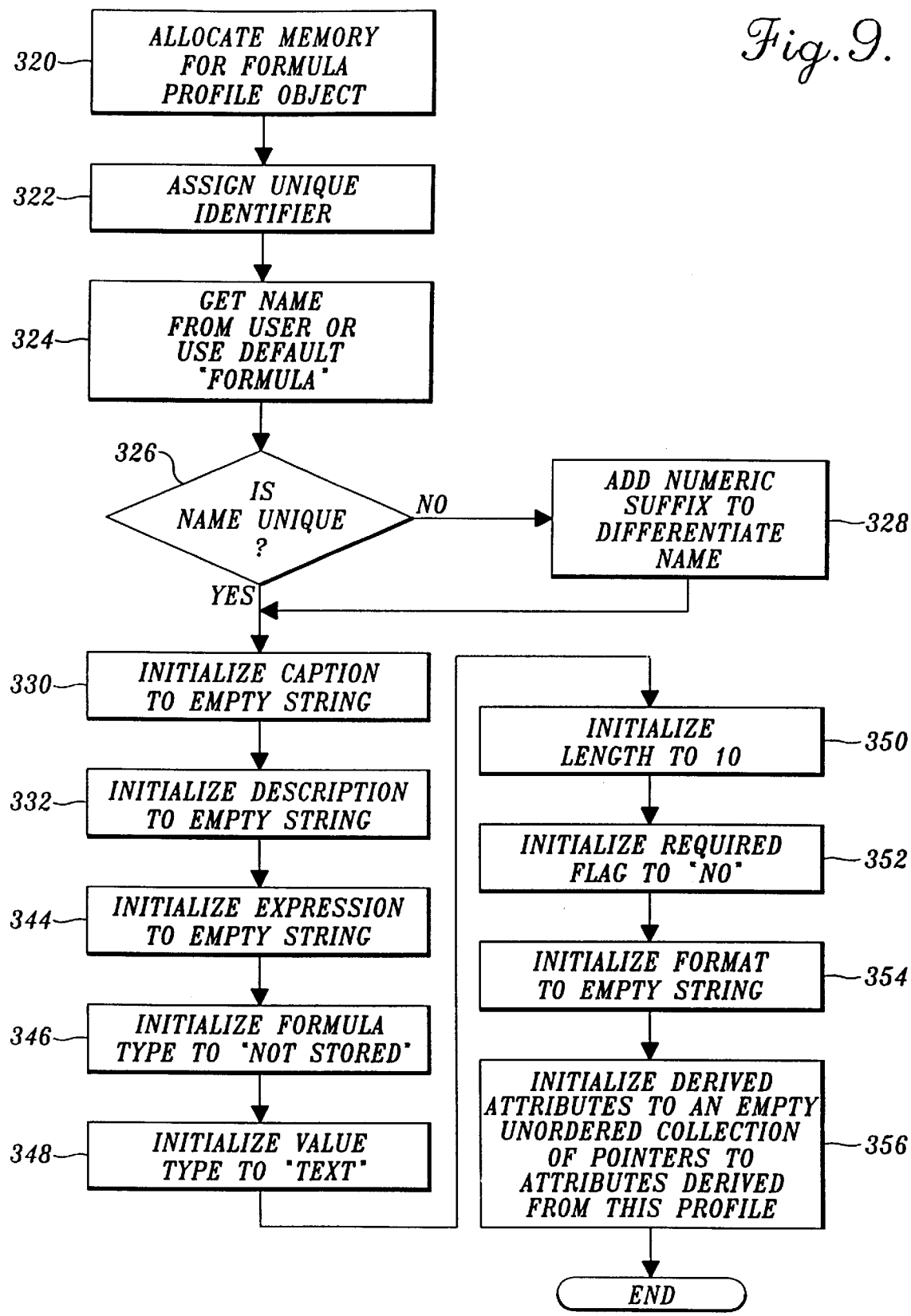
FIG. 9 is a flow chart showing the steps performed to create a formula profile.

FIG. 9 shows the steps taken by the present invention to create a new formula profile. First, a new block of memory is allocated for the new profile at a step 320. Next, the profile is assigned a unique integer identifier at a step 322. At a step 324, the user is prompted for a name for the formula. If no name is given, the system provides the default name "formula." At a step 326, the system determines whether the name is unique among all the profiles within the semantic object data model. If the name is not unique, a numeric suffix is added to the name to differentiate it from similar names. At a step 330, the caption of the formula is initialized to an empty string. At a step 334, the expression of the formula is initialized to an empty string. The expression is a string that is used to define the formula being calculated.

At a step 346, the formula property is initialized to "not stored." The formula-type property indicates to the system whether a value for the formula is to be stored in the relational database or is computed each time the database program is run. The value-type property of the formula is always initialized to type "text" at a step 348, while the initial length is initialized to ten at a step 350. The required flag is initialized to "no" at a step 352 and the format property that defines the way in which the output of the formula is displayed is set as an empty string at a step 354. Finally, the derived attributes property of the formula profile is initialized as an empty, unordered collection of pointers to formula attributes that are derived from the new formula profile at a step 356.

Figure 10:
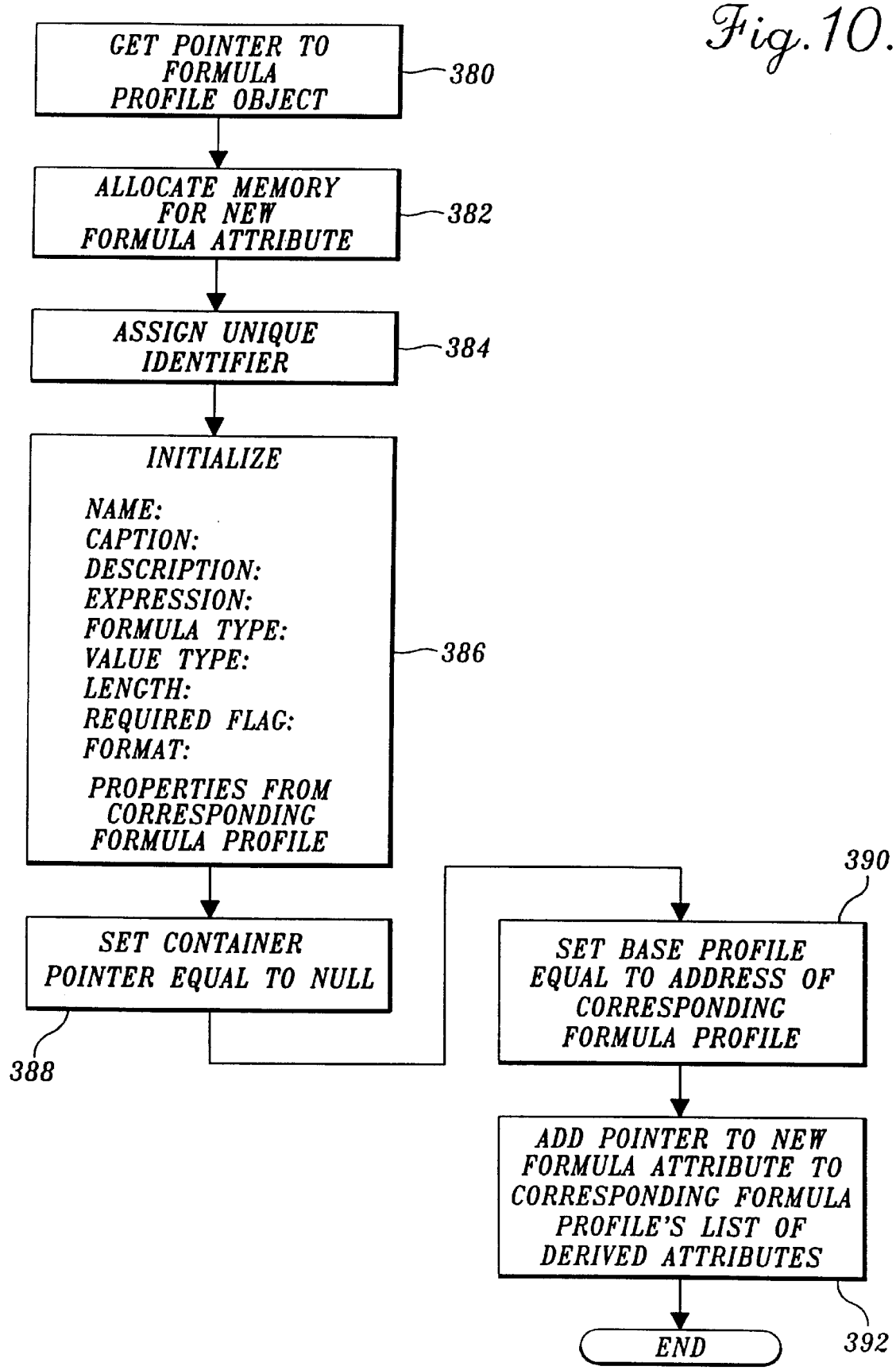
FIG. 10 is a flow chart showing the steps performed to create a formula attribute.

Once a user has created a formula profile, the profile can be inserted into one or more semantic objects to create a corresponding formula attribute. FIG. 10 defines the steps required to create a formula attribute. First, the system gets a pointer to the corresponding formula profile in a step 380. A new block of memory is allocated for the formula attribute at a step 382. The new formula attribute is assigned a unique integer identifier in a step 384. In a step 386, the name, caption, description, expression, formula type, value type, length, required flag, and format properties are initialized from the corresponding formula profile properties. The container pointer for the formula attribute is set equal to null. When the formula attribute is inserted into a semantic object, the container pointer will be set equal to the address of the semantic object or group attribute in which the formula attribute is logically included in a step 388 using the methods shown in FIGS. 16 and 17. Next, the base profile pointer is set equal to the address of the corresponding formula profile in a step 390. Finally, a pointer to the new formula attribute is added to the corresponding formula profile's list of derived attributes at a step 392.

As described above, once a user creates a semantic object, the present invention automatically creates a corresponding object link profile. The object link profile is used to create object link attributes in the semantic objects that specify relations between the various semantic objects. For example, in FIG. 1, a pair of object link attributes connect the professor semantic object and the student semantic object. The name of the object link from the professor to the student is "advisee" and its cardinality is 0.N, indicating that a professor may have zero advisees or may have more than one. Similarly, the student semantic object has an object link attribute called "advisor" that links the student semantic object to a professor semantic object. The advisor object link has a cardinality of 0.1, indicating that a student might have no advisors, but has at most one advisor.

Figure 12:
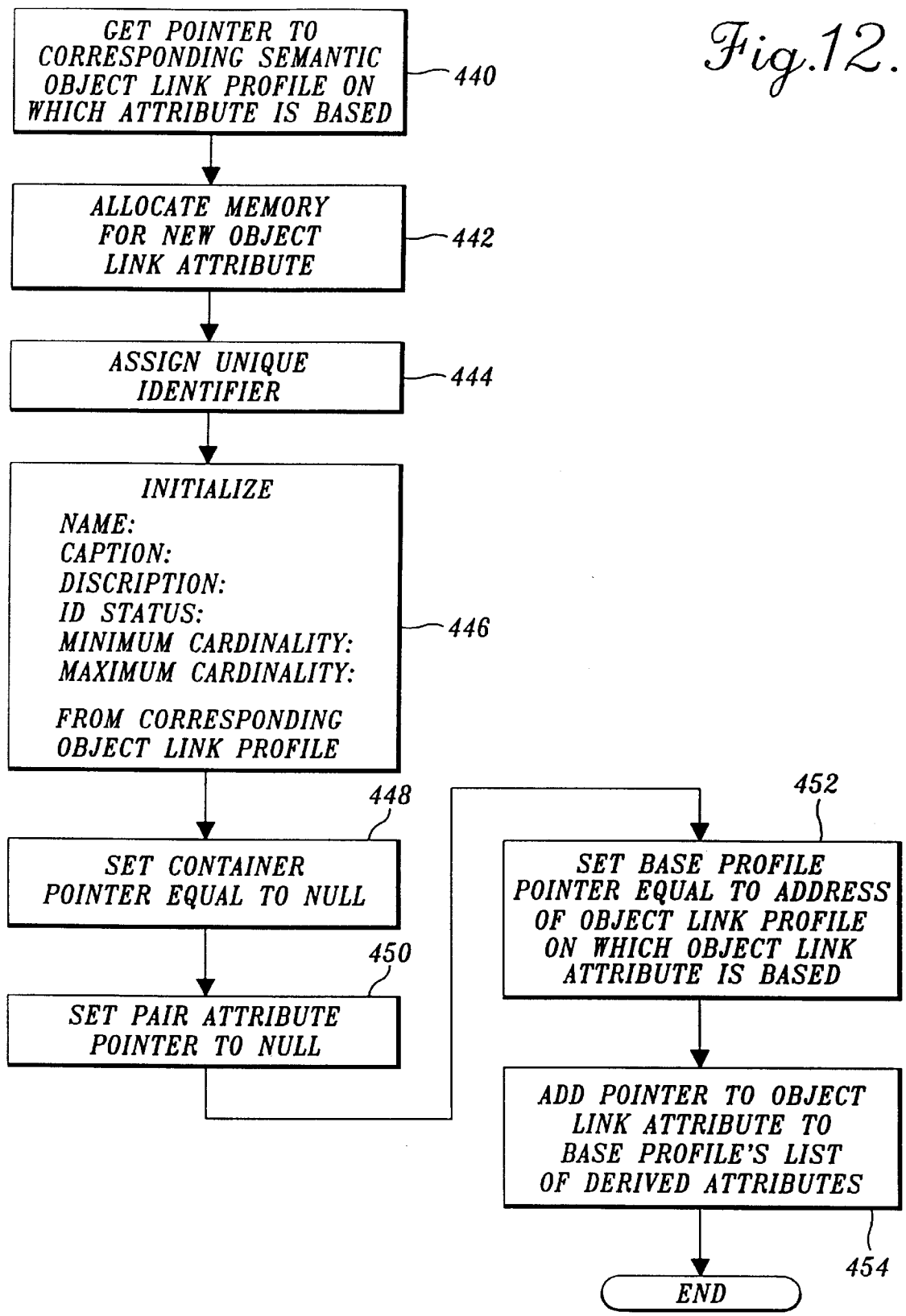
FIG. 12 is a flow chart showing the steps performed to create an object link attribute.

The present invention creates an object link attribute when a user selects an object link profile and drops it into a semantic object or selects the entire semantic object by clicking the mouse pointer in the box in the upper right hand side of the semantic object and drops an icon produced by the system into another semantic object. FIG. 12 shows the steps taken by the present invention to create an object link attribute. First, the system gets a pointer to the corresponding object link profile upon which the new attribute is based at a step 440. At a step 442, a new block of memory is allocated for the object link attribute. The new attribute is assigned a new unique integer identifier at a step 444. The name, caption, description, ID status, and minimum and maximum cardinality properties are initialized from the corresponding object link profile properties in a step 446. Next, the container pointer is set equal to null at a step 448. The container pointer will be updated to reflect the address of the semantic object or group in which the object link attribute is logically included using the methods shown in FIG. 16 and FIG. 17. Initially, the pair pointer that points to a corresponding object link attribute disposed within the referenced semantic object indicated by the object link attribute is initialized to null at a step 450. The base profile pointer is set to the address of the object link profile on which the object link attribute is based at a step 452. Finally, a pointer to the new object link attribute is added to the base profile's list of derived attributes at a step 454.

Another attribute similar to an object link attribute is the parent attribute. The parent attribute allows a user to specify that a semantic object is a subtype of another semantic object. For example, as shown in FIG. 1, the student and professor semantic objects both contain parent-type attributes called "person." The person attribute indicates that both the professor and the student semantic objects are persons (i.e., are subtypes of the person semantic object) in the data model. Because a parent-type attribute is so similar to the object link type attributes, no corresponding parent-type profiles are separately created. Instead, the object link profile is used.

Figure 13:
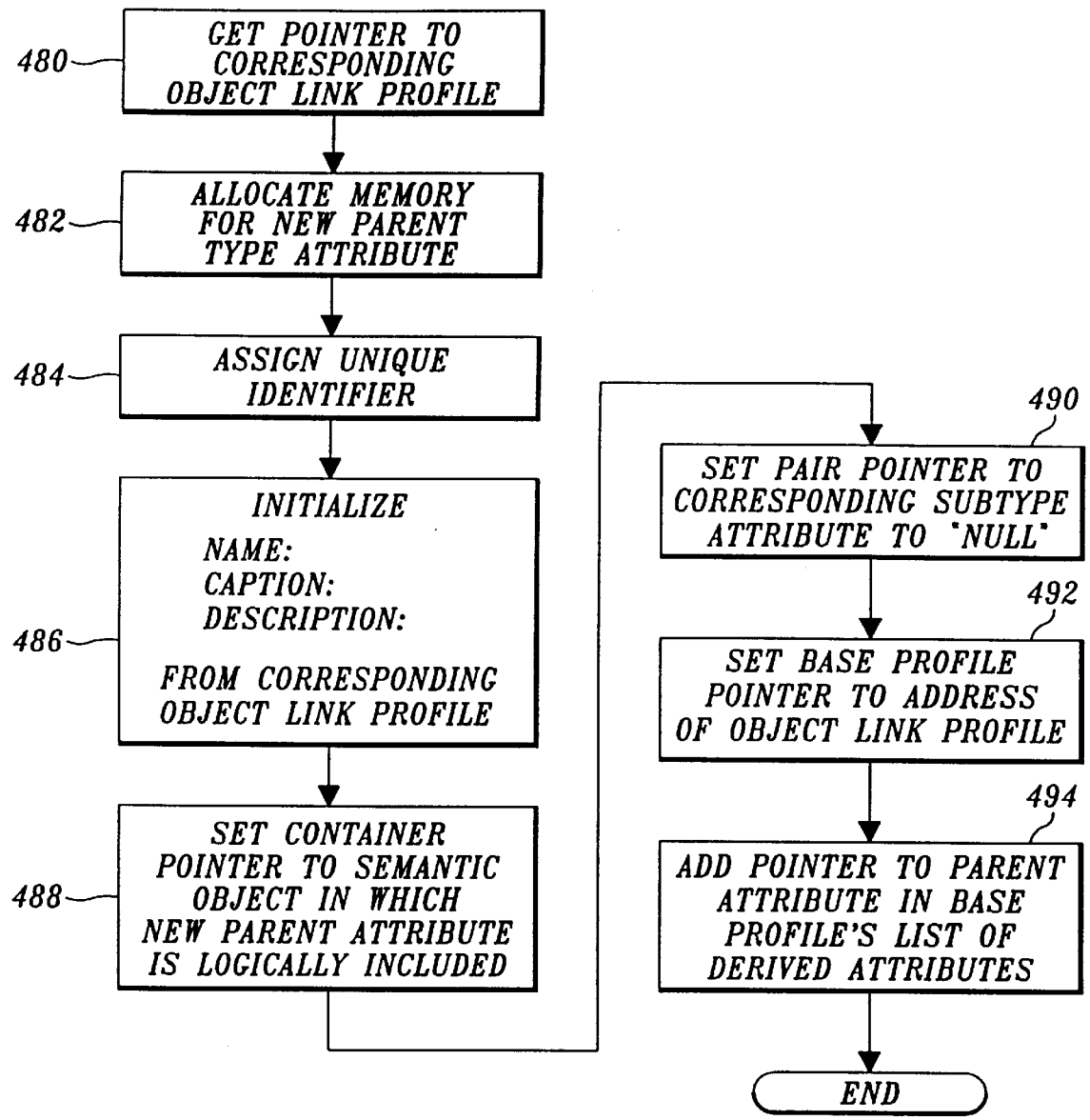
FIG. 13 is a flow chart showing the steps performed to create a parent-type attribute.

As shown in FIG. 13, to create a parent attribute, the system first gets a pointer to the corresponding object link profile that is associated with the parent-type semantic object at a step 480. A new memory block is allocated for the new parent-type attribute at a step 482, and the attribute is assigned a unique integer identifier at a step 484. At a step 486, the new parent-type attribute's name, caption, and description are initialized from the corresponding object link profile properties. The container pointer is set equal to null at a step 488. The pair pointer that points to the corresponding subtype attribute is initialized to null in a step 490. At a step 492, the base profile pointer is set equal to the address of the object link profile used to create the parent attribute. Finally, a pointer to the new parent attribute is added to the base profile's list of derived attributes in a step 494. The properties of the parent-type attribute will be updated when the attribute is placed in the subtype semantic object.

Figure 14:
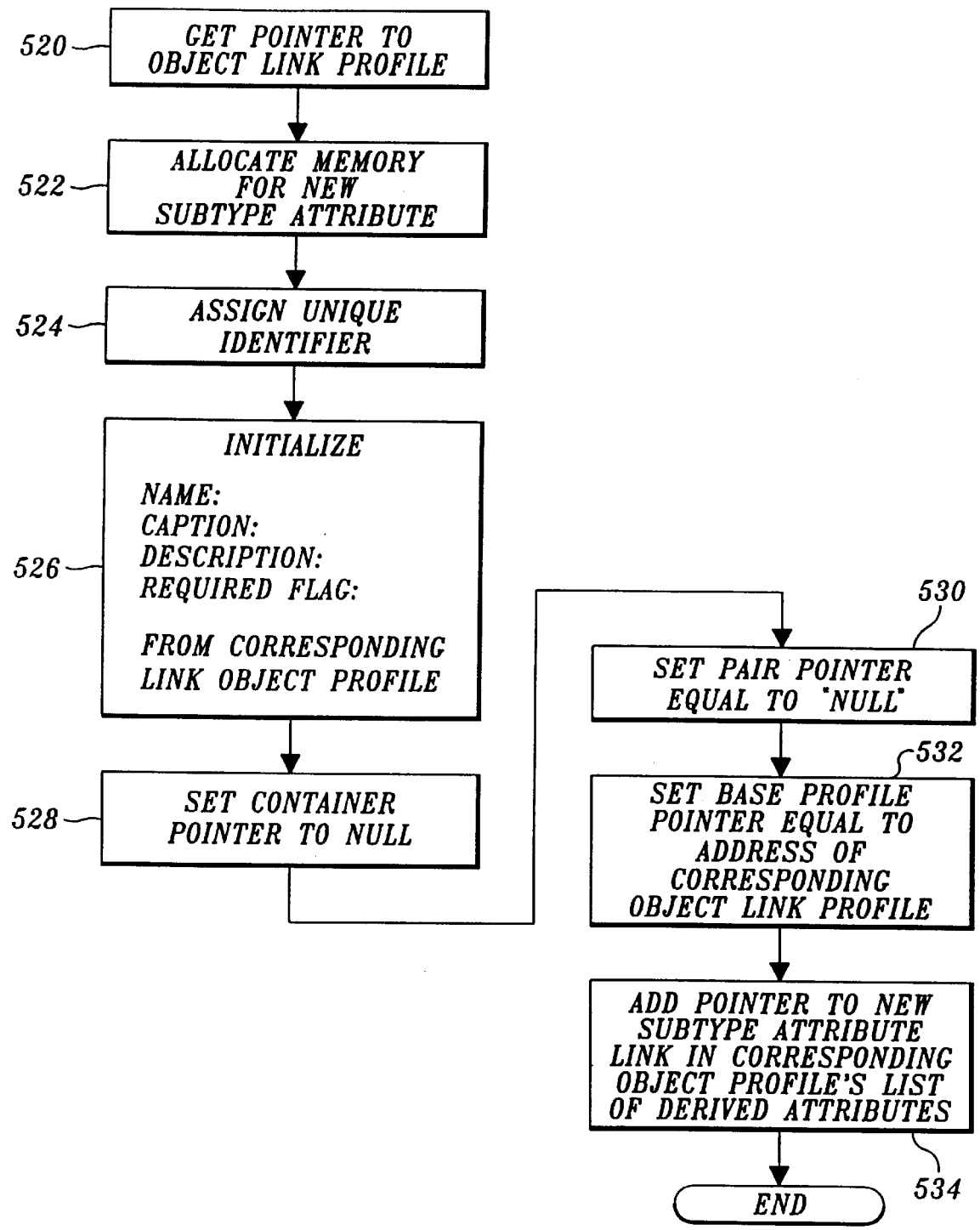
FIG. 14 is a flow chart showing the steps required to create a subtype attribute.

Once a parent-type attribute has been placed in a semantic object, a corresponding subtype attribute is automatically created by the system and placed in the corresponding parent semantic object. FIG. 14 shows the steps taken by the present invention to create such a corresponding subtype attribute. First, the system gets a pointer to the object link profile that is associated with the subtype semantic object at a step 520. A block of memory is allocated for a new subtype attribute at a step 522, and the new subtype attribute is given a unique integer identifier at a step 524. At a step 526, the name, caption, description, and required flag are initialized from the corresponding object link profile associated with the subtype semantic object. The container pointer is set equal to null at step 528 and will be updated to reflect the address of the semantic object or subtype group in which the new subtype attribute is logically contained when the subtype attribute is inserted into a semantic object. The pair pointer is initialized to null at a step 530, and the base profile pointer is set equal to the address of the corresponding object link profile from which the subtype attribute was created at a step 532. Finally, a pointer is added to the new subtype attribute in the corresponding object link profile's list of derived attributes at a step 534.

It is possible to include subtype attributes within a group in the semantic object data model. An example of a subtype group, shown in FIG. 2, is the Persontype group contained within the Person semantic object. This group indicates that a person must be either a professor or a student. Subtype groups are indicated with the subscript "ST" next to the brackets that identify the members of the group.

Figure 15:
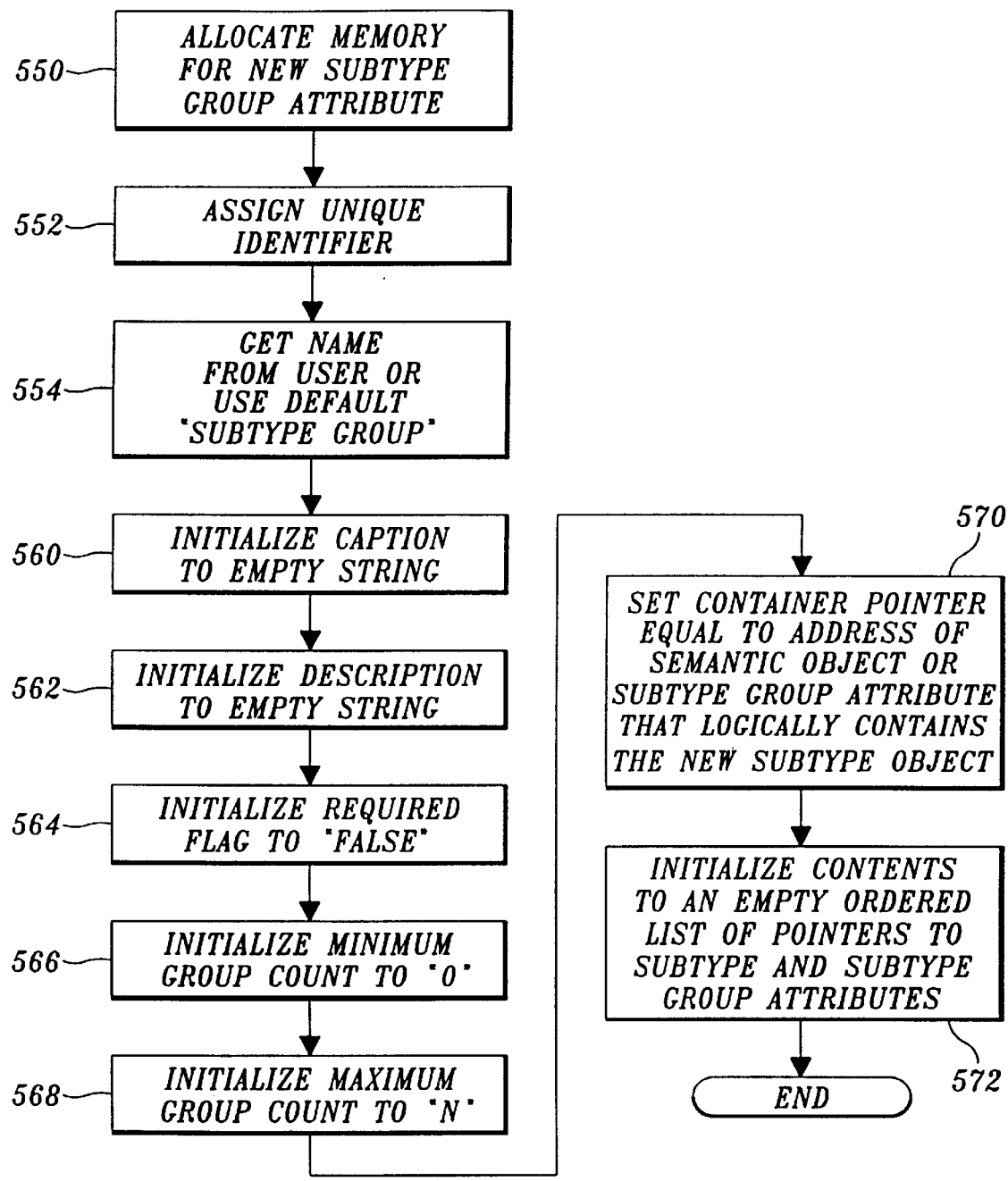
FIG. 15 is a flow chart showing the steps required to create a subtype group attribute.

FIG. 15 shows the steps taken by the present invention to create a subtype group. First, sufficient memory is allocated for the new subtype group attribute at a step 550. A unique identifier is assigned at a step 552, and the user is prompted for the name of the subtype group at a step 554. If no name is provided, the system uses the default name "subtype group."

In the preferred form of the present invention, there are three name spaces within a single semantic object. The first name space holds the names of subtypes and subtype groups. No subtype or subtype group can have the same name within a single semantic object. Similarly the second name space holds the names of all parent attributes in a single semantic object. No two parent attributes can have the same name within a semantic object. The third name space holds the names of all other attributes immediately within the semantic object. The three different name spaces allow a user to easily model the situation whereby a semantic object has an object link attribute and a parent or subtype attribute with the same name. Suppose, for example, a user creates a semantic object called "Employee". The semantic object has an object link attribute called "Manager" as well as a subtype attribute called "Manager". This is because an employee may have a manager, and a manager is an employee. Without allowing the user to have object link attributes with the same name as a subtype or parent, it would be cumbersome for the user to model examples like the one presented above.

The caption and description for the subtype group attribute are initialized to empty strings at steps 560 and 562. The required flag is initialized to "false" at a step 564. The minimum group count is initialized to zero at a step 566, while the maximum group count is initialized to "N" at a step 568. The container pointer is initialized to null at step 570. Once the subtype group is inserted into a semantic object, the container pointer is set equal to the address of the semantic object or subtype group attribute, which logically contains the new subtype group object using the method shown in FIG. 16 or FIG. 19. Finally, the contents list of the subtype group attribute is initialized as an empty, ordered list of pointers to subtype attributes and other subtype group attributes that are contained within the newly created subtype group attribute at a step 572.

FIGS. 4–15 describe the steps implemented by the present invention when a user creates semantic objects, profiles, or attributes in the course of developing a semantic object data model. However, it is also possible to manipulate objects within the graphical user interface to further refine the data model. As described above, one of the ways of manipulating the model is by selecting a profile, dragging, and dropping the profile into a semantic object to create a corresponding attribute.

Figure 16A:
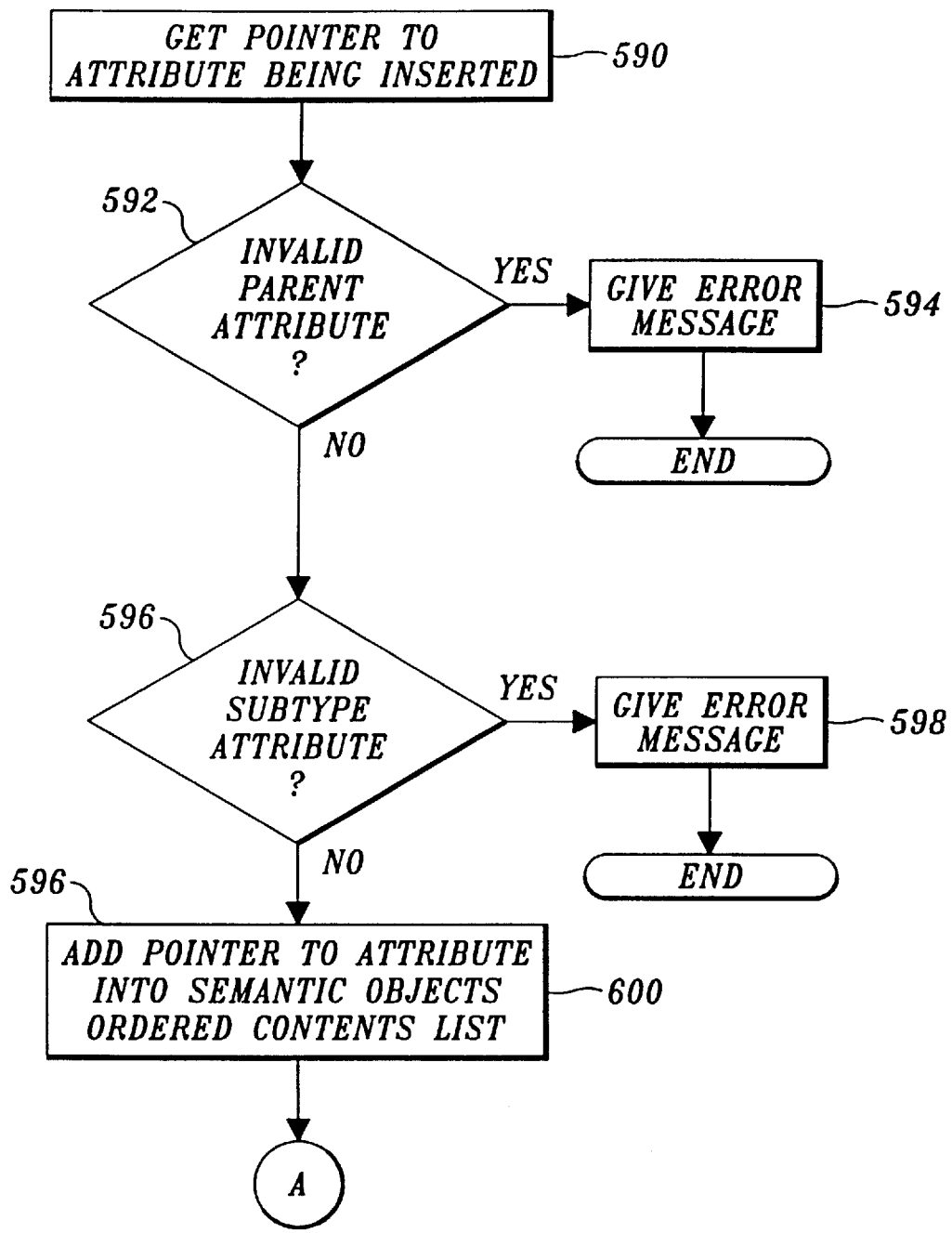
FIGS. 16A–16C are a series of flow charts showing the steps performed when an attribute is inserted into a semantic object.
Figure 16B:
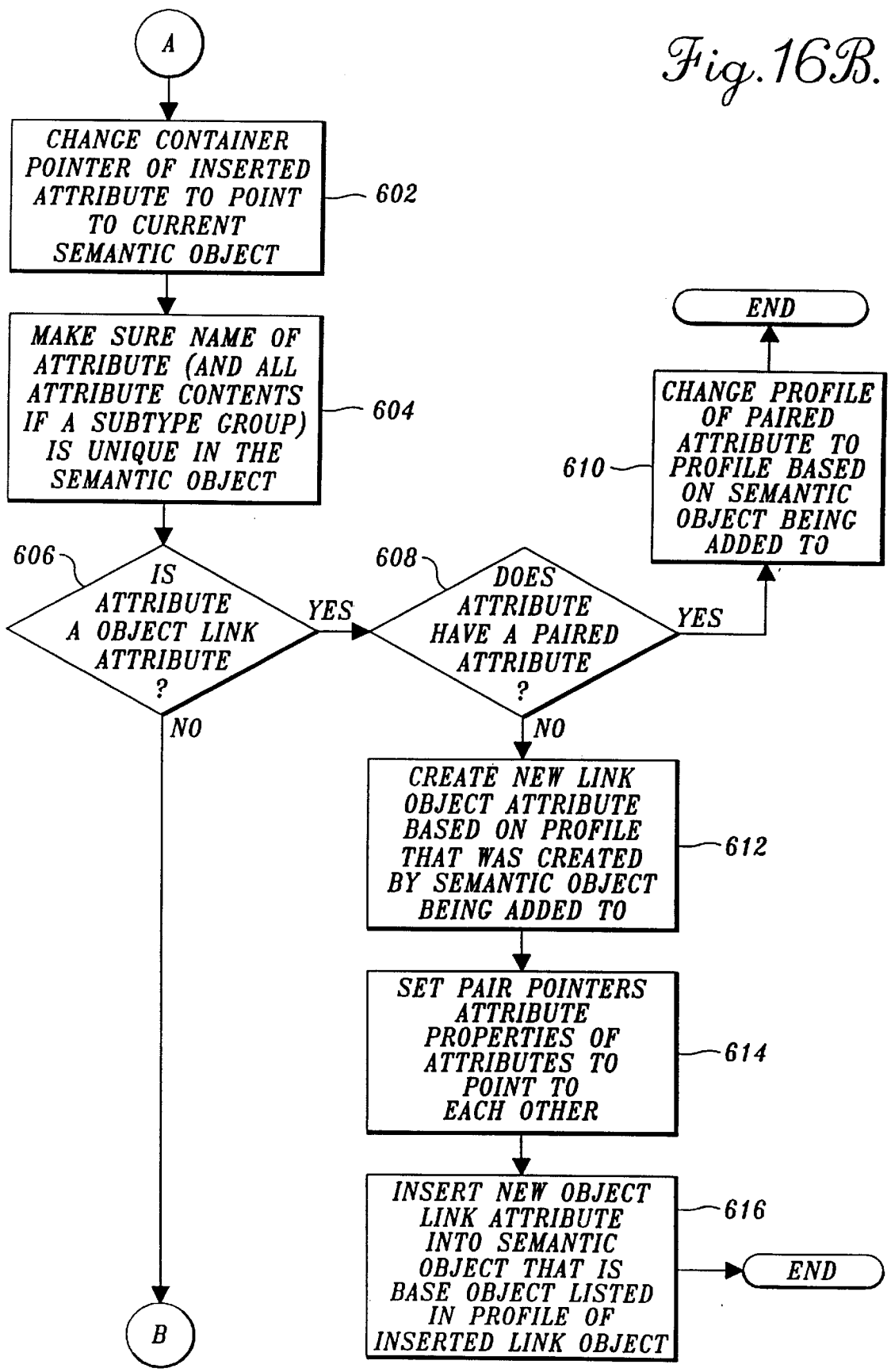
Figure 16C:
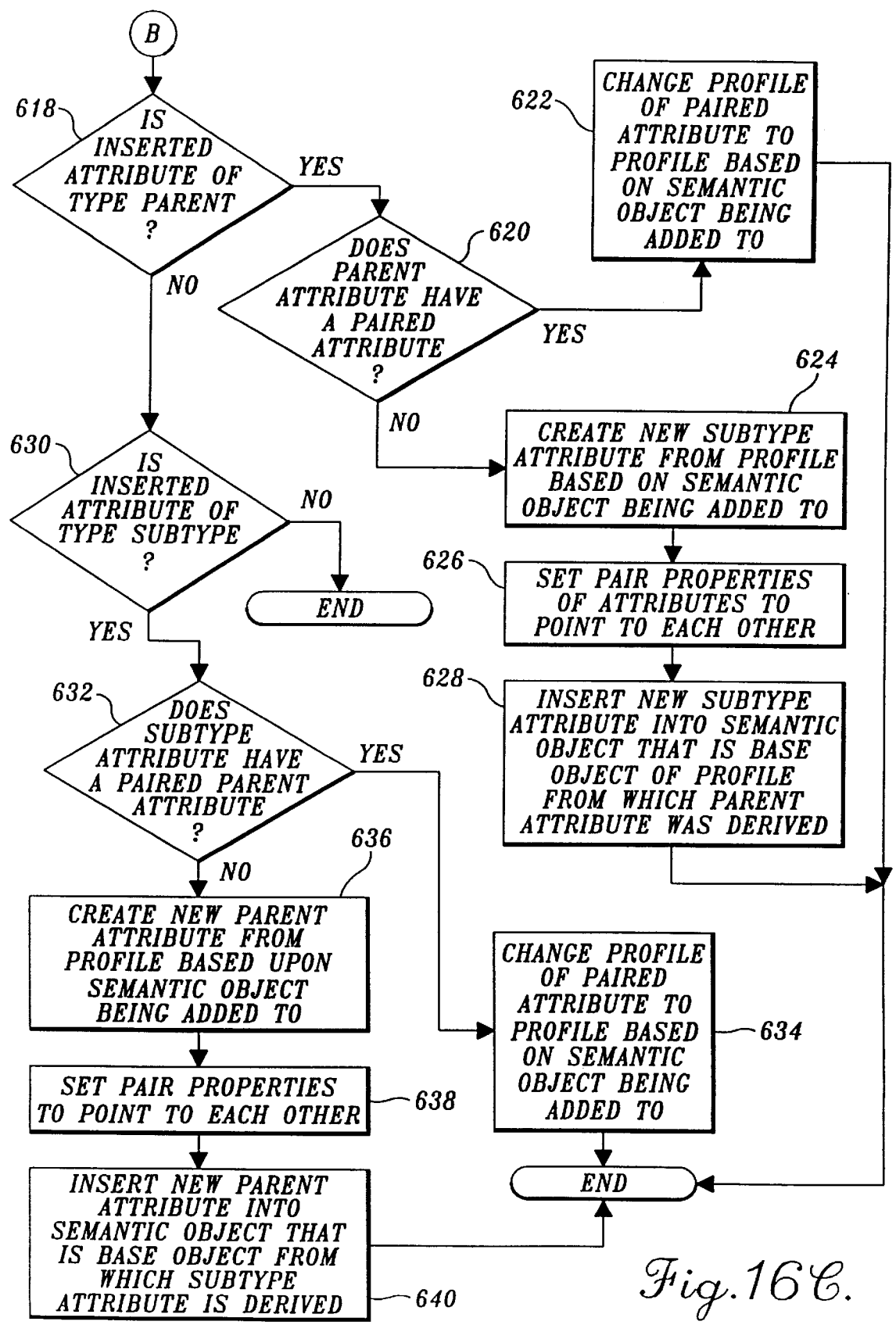

FIGS. 16A–16C describe the steps taken by the present invention to update the semantic object data model when a user has inserted a new attribute into a semantic object (i.e., the current semantic object). Referring again to FIG. 2, assuming the user is trying to create the attribute labeled "Social_Sec_No" in the person attribute 40. The user does this by selecting the "IdentifierNumeric" profile from the profile manager 50 and dropping the selected profile into the physical boundaries of the person semantic object. The user then changes the name of the newly created attribute to "Social_Sec_No" using the property sheet 60 shown in FIG. 3. The user can then change the ID status, minimum and maximum cardinalities to reflect the type of attribute, i.e., a social security number, added to the semantic object.

Beginning at a step 590, the system gets a pointer to the new attribute being inserted. At a step 592, the system determines whether the user is attempting to insert a parent attribute that is derived from a profile, which is based upon a semantic object that is a subtype of the current semantic object, or is based upon the same profile as a parent attribute that the semantic object already contains. In the present example, neither professor nor student may be a parent type of person, since the parent attribute that would specify that relationship would be based on an object link profile based on the person semantic object. Similarly, neither professor nor student may have a second parent attribute based on the person semantic object, since they each already have one. Because the professors and student semantic objects are already direct subtypes of the person semantic object, another such connection is redundant.

If the answer to step 592 is yes, an error message is produced as indicated in a step 594, and the user is not allowed to insert such a parent attribute into the current semantic object. At a step 596, the system determines whether the user is attempting to create a subtype attribute created from a profile that corresponds to a semantic object, which is a parent of the current semantic object, or is based upon the same profile as a subtype attribute that the current semantic object already contains. Using the model of FIGS. 1 and 2, step 596 prevents a subtype attribute based on the profile created from the person semantic object from being inserted into either the professor or student semantic objects. Similarly, no additional subtype attributes based on the profiles created from the professor or student semantic objects may be inserted into Person semantic objects. If the answer to step 596 is yes, an error indication is produced at a step 598, and the insertion is not allowed.

Assuming that the user is not attempting an illegal insertion of an attribute into a semantic object, a pointer to the newly added attribute is included in the current semantic object's contents list at a step 600. Next, the container pointer of the inserted attribute is updated to point to the current semantic object at a step 602.

The system then ensures that the name of the newly added attribute and all the attribute's contents, if a subtype group, is unique within the semantic object, at a step 604. If any name is not unique, a numeric suffix is added to the name to differentiate it.

At a step 606, the system determines if the newly added attribute is a object link-type attribute. If yes, the system determines whether the attribute has a corresponding paired object link attribute located in another semantic object at a step 608. If such a paired attribute exists, the base profile of the paired object link attribute is changed at a step 610 to be the profile created from the current semantic object in which the link attribute has been inserted. If no corresponding paired attribute exists, the system creates a new object link attribute based upon the profile of the current semantic object at a step 612. The pair pointers of the newly created object link attribute and the inserted object link attribute are set to point to each other at a step 614. Finally, at a step 616, the newly created object link attribute is inserted into the semantic object that is listed as the base object in the profile of the inserted object link obtained at step 590. For example, if an object link attribute called student is placed in the class semantic object shown in FIG. 1, then a corresponding object link is created and placed in the semantic object listed as the base semantic object of the profile from which the student object link was created, i.e., the student semantic object.

If the inserted attribute is not a object link attribute, the system determines whether the inserted attribute is a parent-type attribute at a step 618. If the inserted attribute is a parent, in a step 620, the system determines if the parent attribute has a paired subtype attribute located in another semantic object. If yes, the object link profile of the paired subtype attribute is changed to be the object link profile based on the current semantic object at a step 622. If no corresponding subtype attribute exists, a new subtype attribute is created from the object link profile, based upon the current semantic object, at a step 624. The pair pointers of the attributes are set to point to each other at a step 626. Finally, the new subtype attribute is inserted into the semantic object that is the base object of the profile from which the newly inserted parent attribute was derived at a step 628 in the same way as the insertion described with respect to step 590.

If the inserted attribute was not of the parent type, a test is performed at a step 630 to determine if the newly inserted attribute is a subtype attribute. If the attribute is a subtype, a test is performed at a step 632 to determine if there exists a corresponding parent-type attribute. If the answer is yes, the profile of the paired parent attribute is changed to be the profile based upon the semantic object that is being added to at a step 634. If no corresponding parent-type attribute exists, a new parent-type attribute is created based upon the profile associated with the semantic object being added to at a step 636. The pair pointers of both attributes are then set to point to each other at a step 638, and the newly created parent attribute is inserted into the semantic object that is the base object of the profile from which the subtype attribute was derived.

Figure 17A:
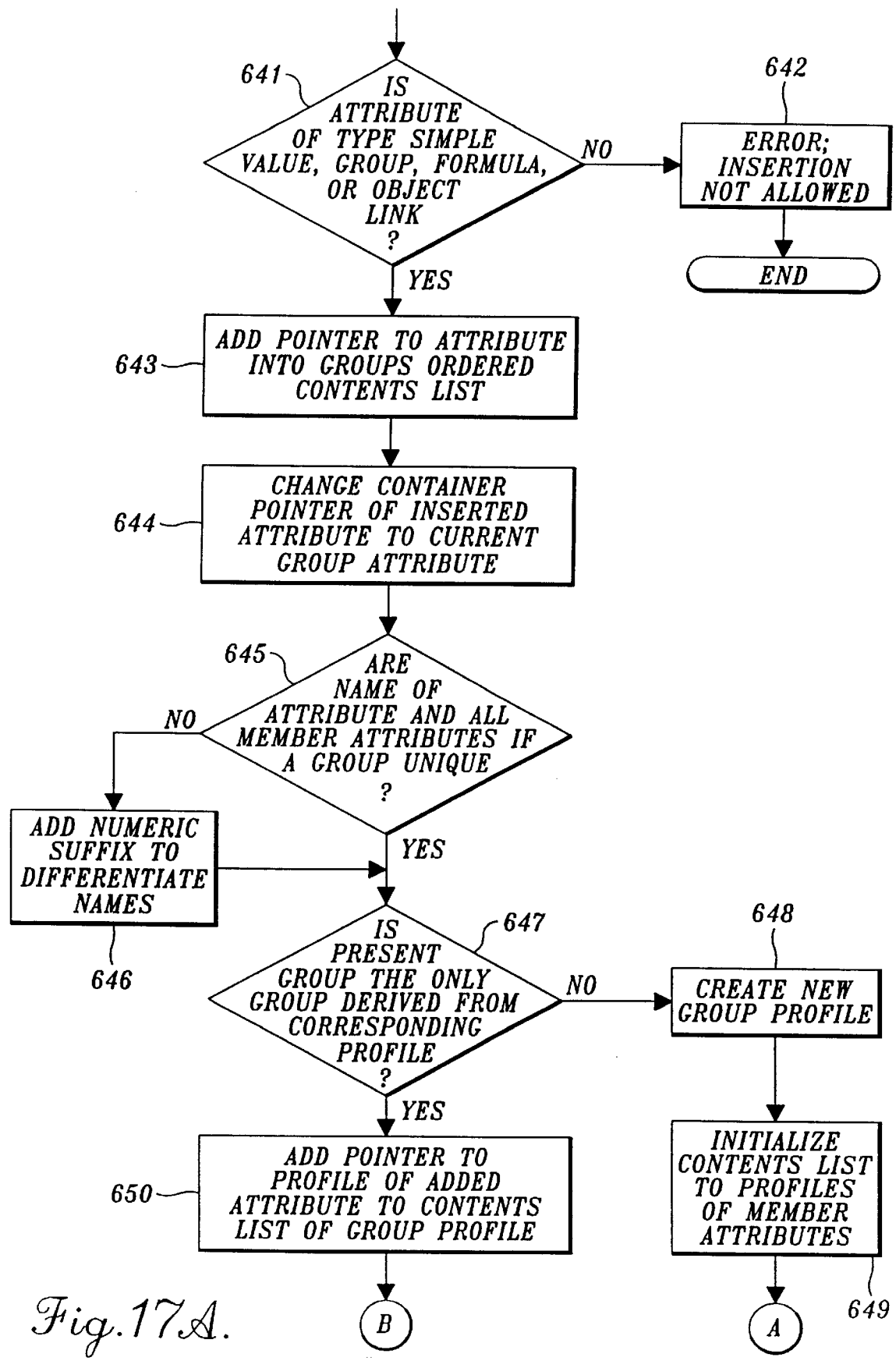
FIGS. 17A–17B are a series of flow charts showing the steps performed when an attribute is inserted into a group attribute.
Figure 17B:
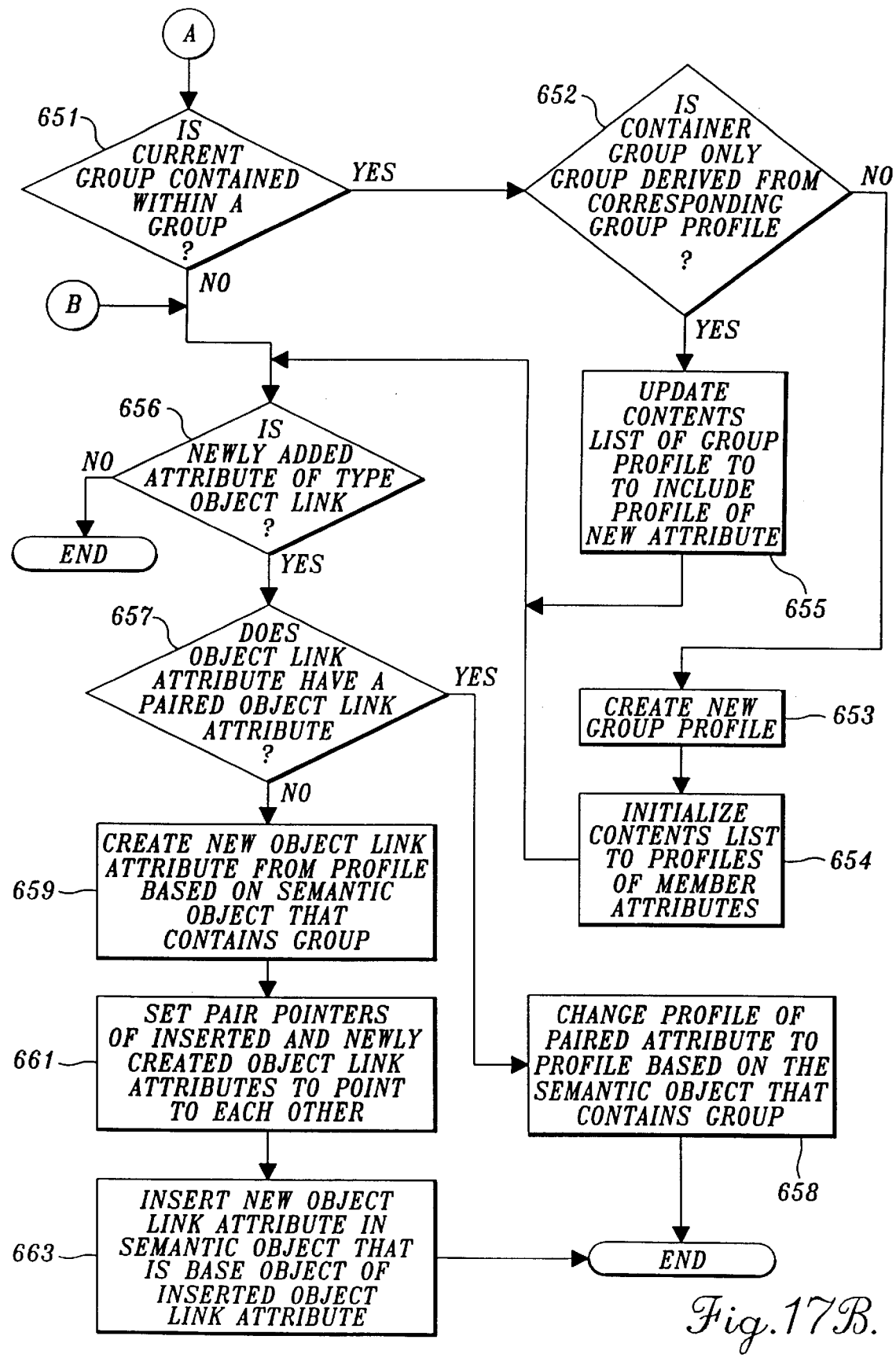

In the course of developing a semantic object data model, the user may wish to add an attribute to a group attribute. This change is accomplished by selecting an attribute within the semantic object data model and dropping it into the group attribute. FIGS. 17A–17B show the steps taken by the present invention to add an attribute to a group attribute. Beginning at a step 641, the system determines if the attribute being added to the group is a simple value, group, formula, or object link attribute. If the attribute is not one of these types, an error message is produced at a step 642, indicating the insertion is not allowed. Once it has been determined that the attribute can be added to the group attribute, a pointer to the new attribute is added to the group's ordered contents list at a step 643. At a step 644, the container pointer of the inserted attribute is changed to the group attribute that contains the new attribute.

A decision block 645 determines if the name of the attribute is unique among attributes in the group. If not, a numeric suffix is added to differentiate the name at a step 646. The logic then determines if the group attribute into which the new attribute has been inserted is the only group that is derived from the corresponding group profile at a step 647. If so, then a pointer to the profile of the added attribute is added to the contents list of the group profile at a step 650. If more than one group has been created from the corresponding group profile, a new group profile is created at a step 648. The contents list of the new group profile is initialized to include the profiles of all the member attributes, including the new member attribute, at a step 649.

At a step 651, a check is made of whether the current group is contained within another group, i.e., in a "container group." If so, in a step 652, the logic determines whether the container group is the only group derived from its corresponding profile. If yes, then the contents list of the corresponding group profile is updated to include the profile of the newly added attribute at a step 655. If the container group is not the only group created from its corresponding group profile, then a new group profile is created at a step 653. The contents list of the newly created group profile is initialized to include pointers to all the member attributes at a step 654. This process continues until all container groups have been changed, or until a container group does not create a new profile.

At a step 656, the newly added attribute is checked to determine if it is of type object link. If yes, then the system determines whether the object link has a paired object link attribute at a step 657. If a paired object link exists, then the profile of the paired attribute is changed to the profile based on the semantic object that contains the group, which includes the newly added object link attribute, at a step 658. If no corresponding paired object link attribute exists, then the system creates a new object link attribute that is derived from the profile based on the semantic object, which contains the group at a step 659. At a step 661, the pair pointers of the inserted and newly created object link attributes are set to point to each other. At a step 663, the newly created object link attribute is inserted into the semantic object that is the base object of the inserted object link attribute.

In some instances, a user may wish to change all groups in the semantic object data model by changing the profile of the group attributes. For example, a group attribute representing a phone number includes an area code and a phone number. However, if the user wishes to allow foreign telephone numbers, then a provision must be made for a country code attribute to be inserted into each phone number group. This modification is accomplished by adding a country code profile to the corresponding phone group profile. A country code attribute will then be automatically inserted into each attribute that was created from the corresponding phone group profile as listed in the derived attributes list.

Figure 18:
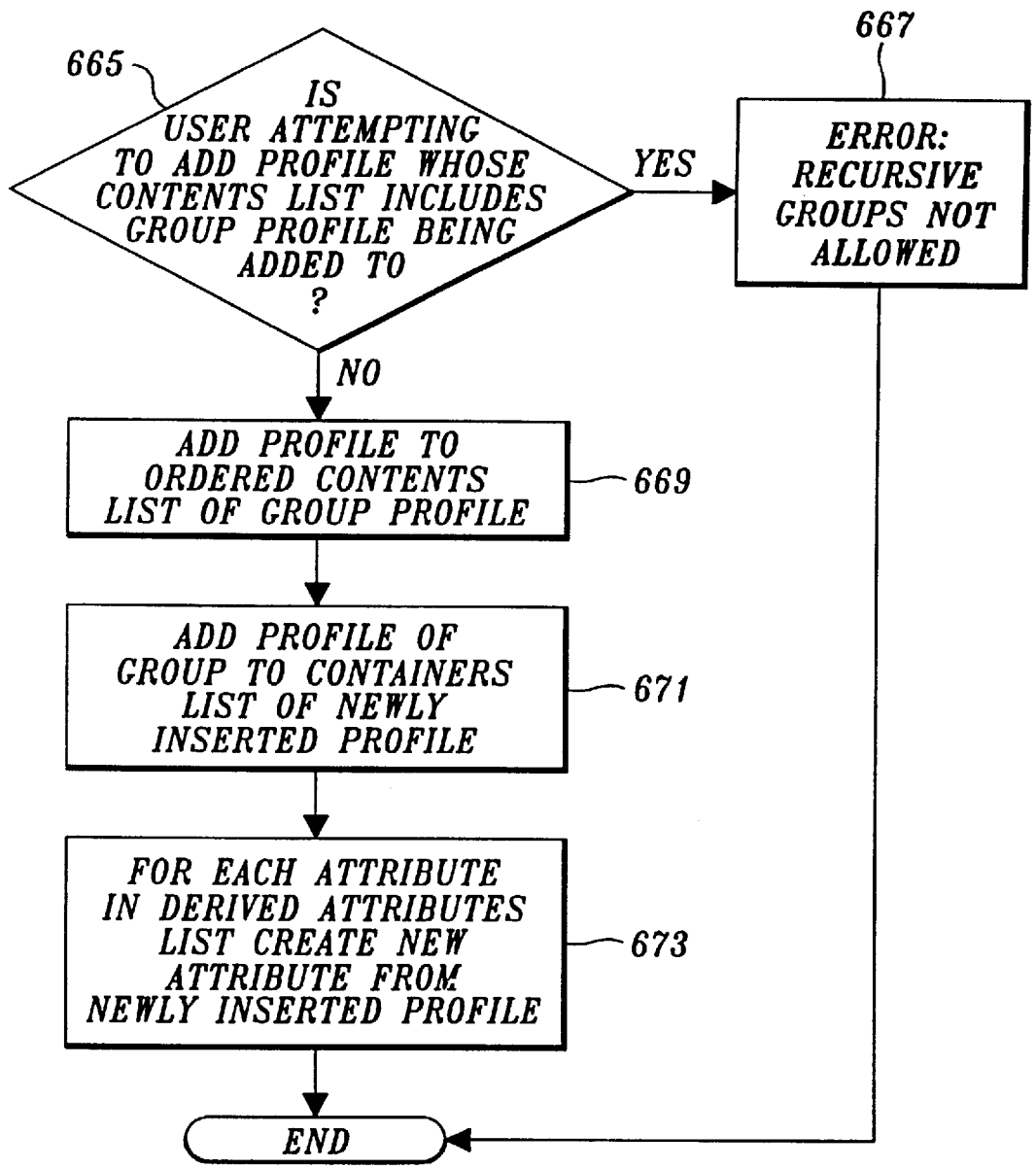
FIGS. 18 is a flow chart showing the steps performed when a profile is inserted into a group profile.

FIG. 18 describes the steps performed by the present invention when a user inserts a profile into a group profile. Beginning at a step 665, the system determines if the user is attempting to add a profile whose contents list already includes the group profile into which the new profile is being inserted. If the answer is yes, an error message is presented at a step 667, indicating that the insertion is not allowed, because it represents a recursive relationship. Assuming that the profile can be added to the group profile, a pointer to the newly added profile is appended to the contents list of the group profile at a step 669. As indicated above, each profile includes a containers list of the profiles in which it is included. At a step 671, a pointer to the group profile is added to the containers list of the newly inserted profile. Finally, the system looks at each attribute in the derived attributes list maintained by the group profile and creates a new attribute from the newly inserted attribute profile at a step 673 and inserts it into the derived attribute. Therefore, each attribute within the semantic object album is updated to reflect the profile newly added in the group profile.

Figure 19A:
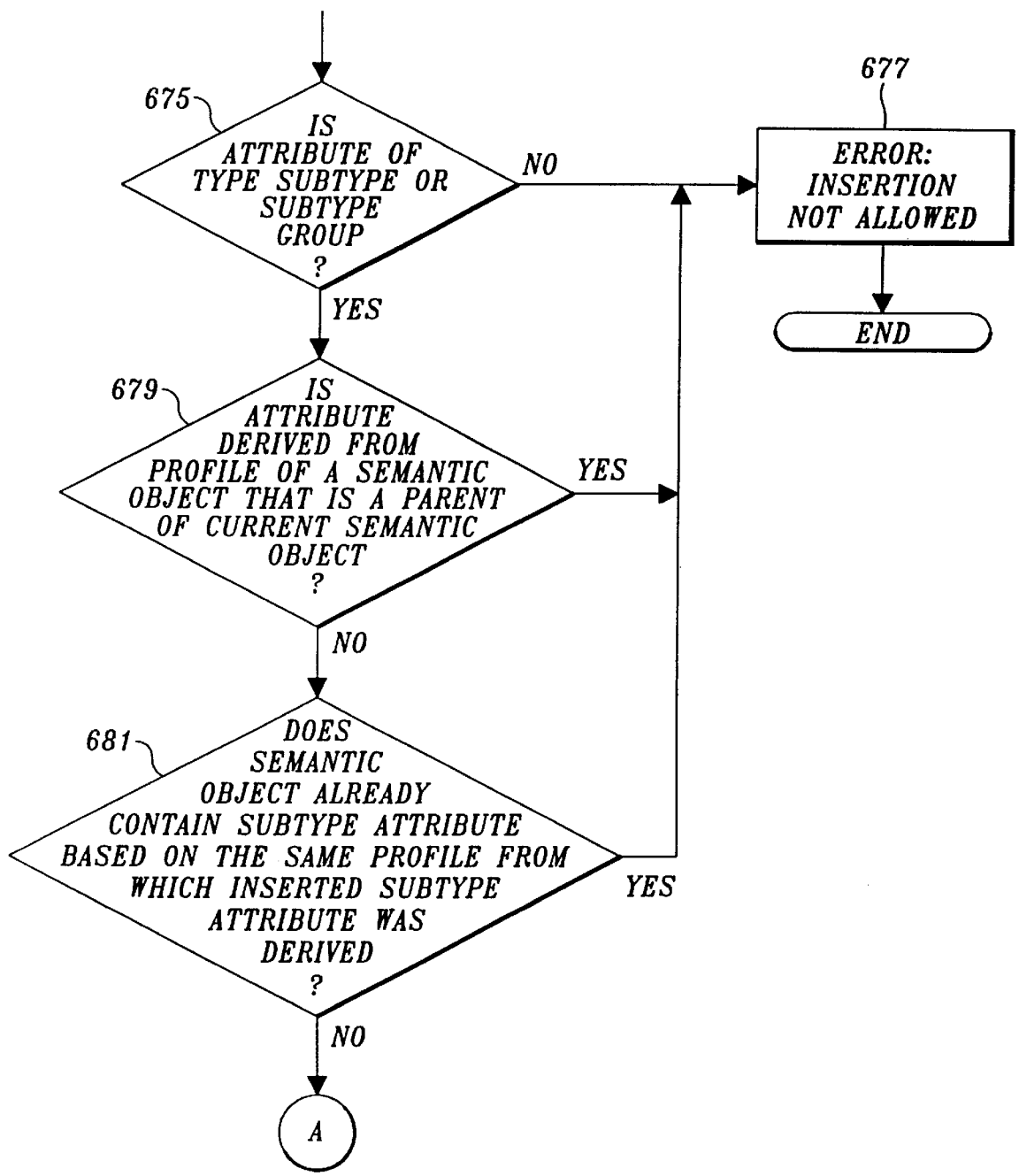
FIGS. 19A–19B are a series of flow charts showing the steps performed when an attribute is inserted into a subtype group attribute.
Figure 19B:
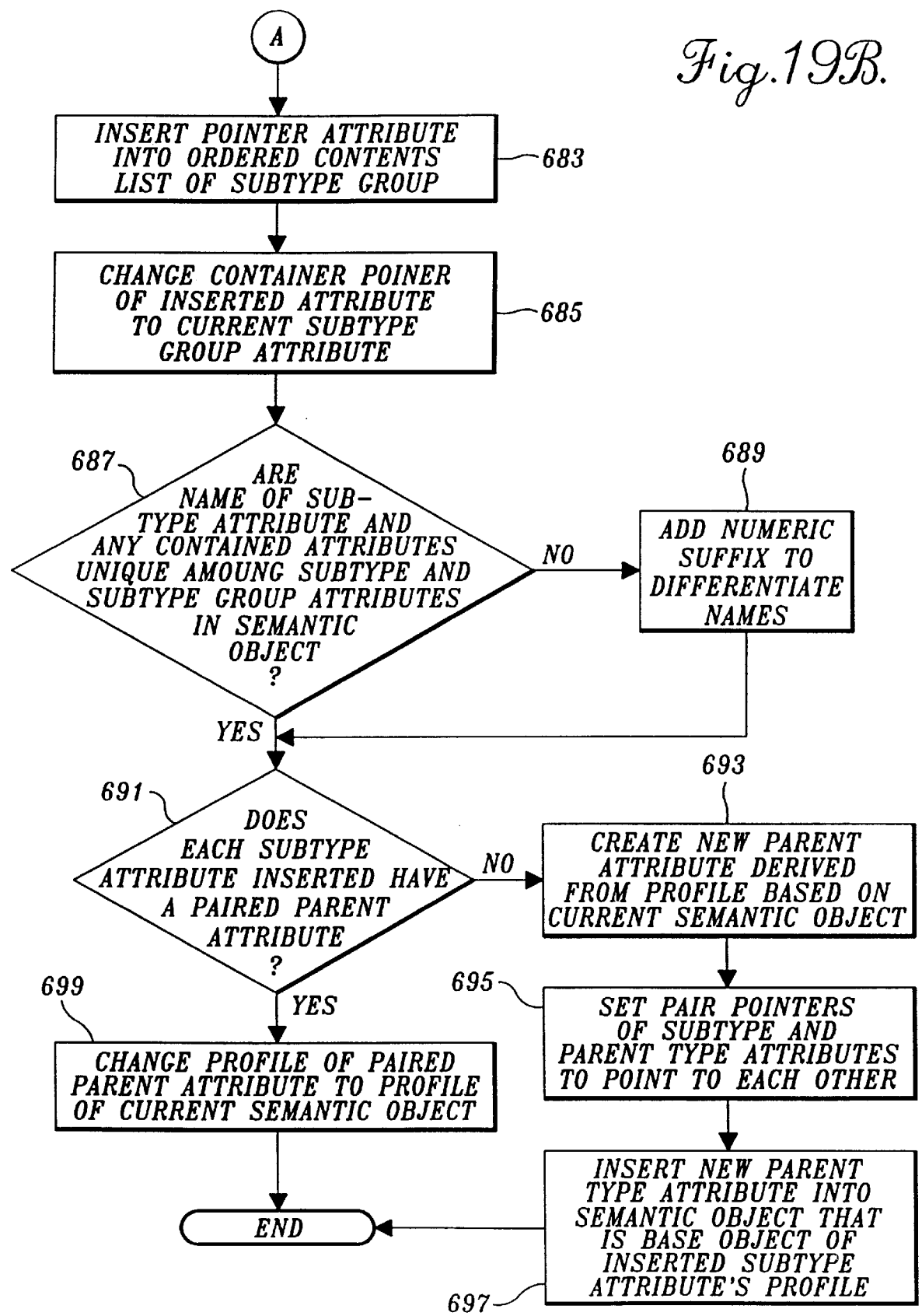

FIGS. 19A–19B describe the steps taken by the present invention when a subtype or subtype group attribute is inserted into another subtype group. Beginning at a step 675, a determination is made if the attribute being added is a subtype or a subtype group. If neither, the system produces an error warning at a step 677, indicating to the user that the insertion is not allowed.

The present invention only allows subtype groups to include subtypes or other subtype groups as member attributes. Assuming that the attempted insertion meets these requirements, the system determines whether the attribute being added is derived from a profile of a semantic object that is a parent of the current semantic object that contains the subtype group into which the new attribute is being inserted. If the answer is yes, then an error message is produced at step 677, indicating that the insertion is not allowed, because it represents a recursive relationship. At a step 681, the system determines whether the semantic object already contains a subtype attribute, based upon the same profile from which the new subtype attribute was derived. If so, an error message is again produced at step 677, indicating that the insertion behavior is not allowed. The present invention only allows a semantic object to include one subtype attribute created from any given profile.

Once it has been determined that the insertion performed by the user is allowed, a pointer to the new subtype attribute is inserted into the ordered contents list of the subtype group at a step 683. At a step 685, the container pointer of the newly inserted attribute is changed to the current subtype group attribute, and at a step 687, the system determines if the name of the inserted attribute (and the names of all member attributes if the inserted attribute is a group) are unique among all subtype and subtype groups contained within the semantic object at step 687. If a name is not unique, a numeric suffix is added to it as appropriate, at a step 689. At a step 691, the system checks whether each subtype attribute inserted has a paired parent attribute. If yes, then the profile of the paired attribute is changed to be the profile based on the current semantic object at a step 699. If the subtype attribute inserted does not have a paired parent attribute, then a new parent attribute is created from the profile based on the current semantic object at a step 693. Next, the pair pointers of the subtype and newly created parent-type attribute are set to point to each other. Finally, the newly created parent-type attribute is inserted into the semantic object that is the base object of the profile of the inserted subtype attribute at a step 697.

Formula Processing

The present invention allows a user to define a formula within a semantic object and to have that formula interpreted in a way that makes semantic sense to the user. This object is accomplished by enabling the user to express the formula in terms of the semantic objects or attributes contained within the semantic data model, but not necessarily with the same semantic object as the formula attribute. The system then searches the entire semantic object data model to determine the attribute that the user intends to be used in the formula.

As an example of the ambiguity that can be created within a formula attribute, suppose a user has created a semantic object that represents an order form. The order form includes numerous attributes that define the line items of the order, as well as an object link attribute, to the customer who placed the order and an object link attribute to the salesman who completed the order. Assume that the semantic object order contains a formula "Tax" which is defined as the quantity of items in the order multiplied by the item price and the tax rate. However, the semantic object order may not include an attribute called "tax rate." However, the customer and salesman semantic objects both include addresses which specify the street, city, state, and zip of where the salesman and customer live. If state is defined as its own semantic object, it may further include an attribute called "tax rate." Therefore, the formula attribute within the order semantic object needs to search the entire semantic object data model for the tax rate attribute. In this example, both the customer and the salesman semantic objects would be linked to the state semantic object, thus creating an ambiguity whether the path to the tax rate was through the customer or through the salesman semantic objects. If both distances were equally far from the formula attribute, then the system would prompt the user to indicate whether the system was to use the customer's or the salesman's tax rate.

Before the semantic object data model is transformed into a set of relational database tables, the present invention formula validates a formula attribute by performing an expanding ring search for the terms of the formula within the semantic object data model. If there are more than two ways to specify a term in the formula, the system applies a set of rules to ensure that the correct attribute is used.

Figure 20A:
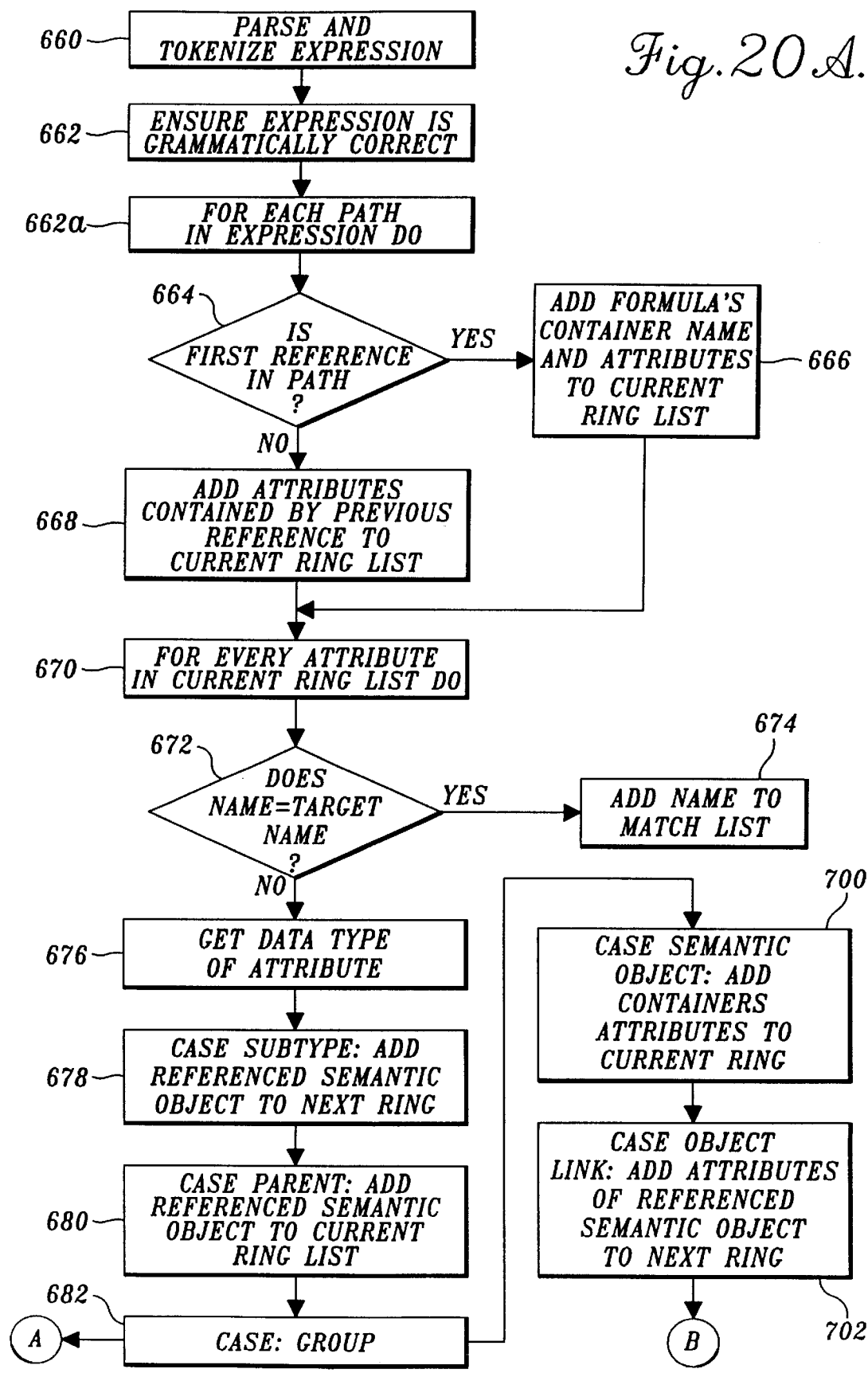
FIGS. 20A–20C are a series of flow charts showing the steps performed to evaluate a formula attribute.
Figure 20B:
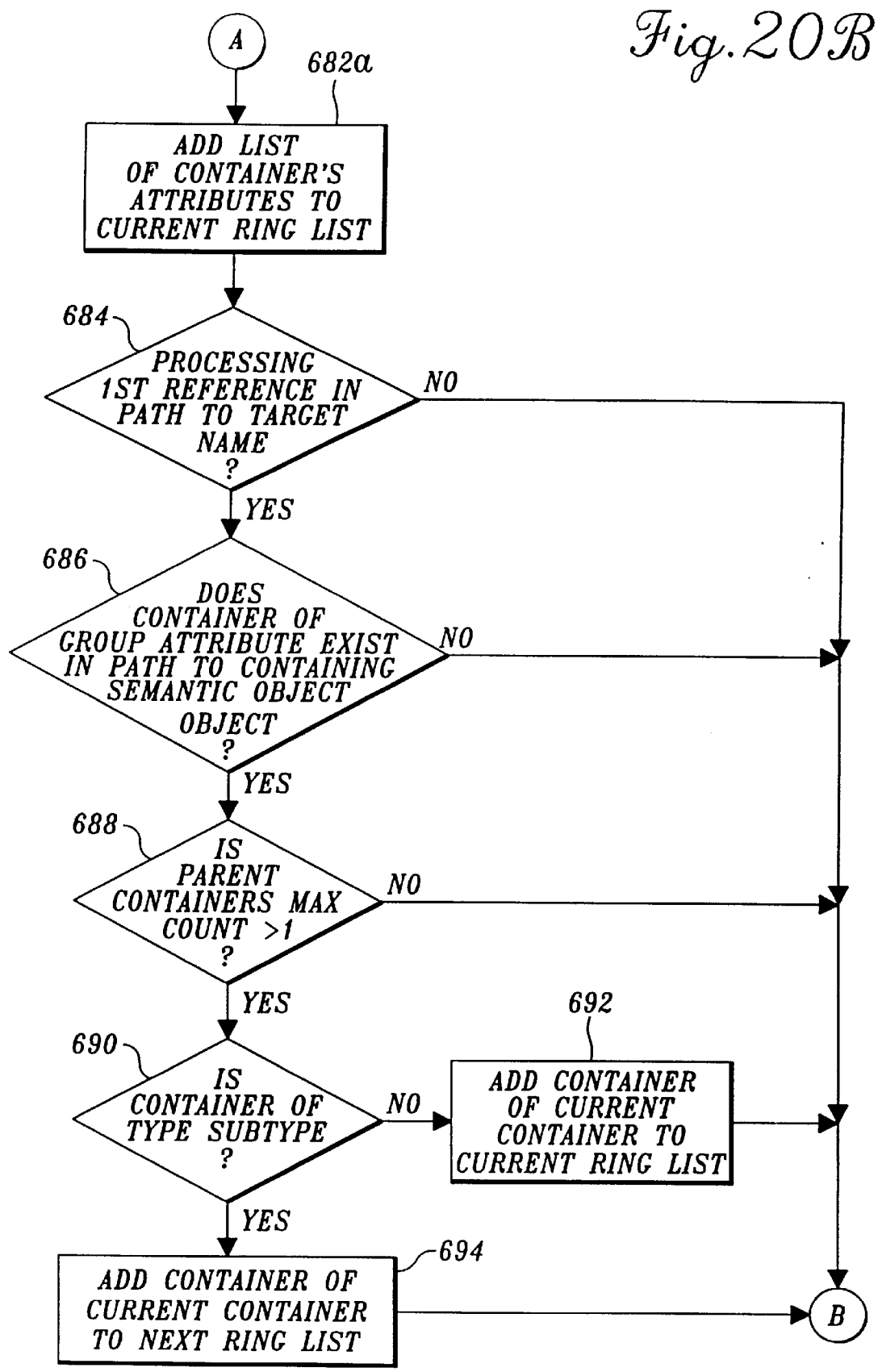
Figure 20C:
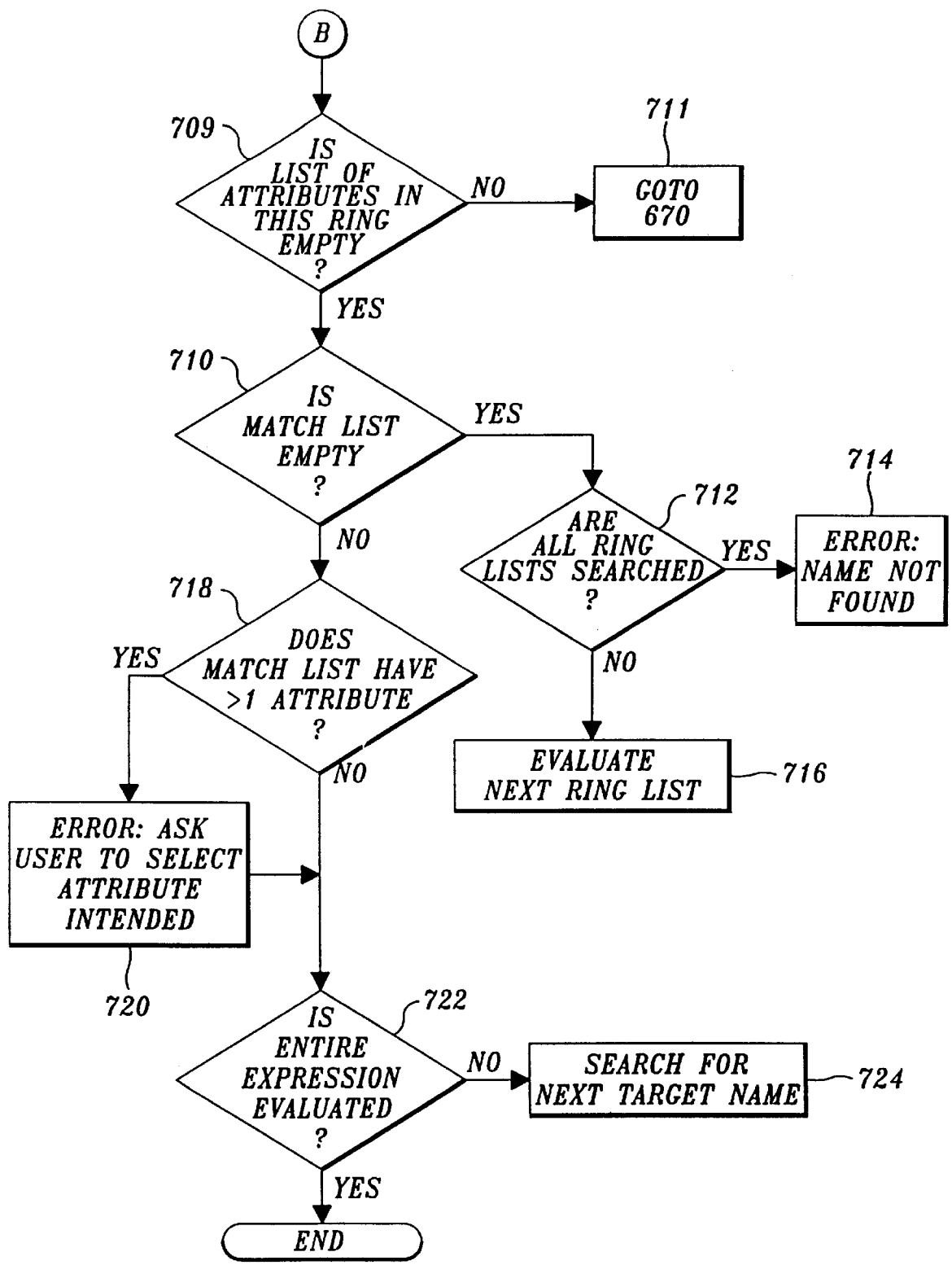

Interpretation of formula attributes is shown in FIGS. 20A–20C. To begin interpreting a formula attribute, the expression property is parsed and tokenized at a step 660, in FIG. 20A. Techniques for parsing and tokenizing string expressions are well known in the art of computer programming and therefore will not be discussed in further detail. After the expression string has been tokenized, a test is made in a step 662 to determine if the expression is grammatically correct, i.e., does it conform to predefined allowed mathematical and logical operations? In the present embodiment, provisions are made for adding, subtracting, dividing, and multiplying numbers as well as adding and subtracting dates and strings. The techniques for ensuring that a mathematical expression is grammatically correct are also well known to those of ordinary skill in the computer programming arts.

In the present example shown in FIGS. 1, 2, and 3, a student semantic object has a formula attribute for grade point average, labeled GPA, which is defined as the sum of (grades)/count(grade). In order to interpret this formula correctly, the formula processor must find the term "grade" in the semantic object data model. The term "grade" in the formula can be specified by the name of the attribute itself or specified by its path name. In the present example the full path name of the grade attribute is "student.classes.grade." The terms "student" and "classes" are referred to as path references while the term "grade" is the target name for which the system searches.

In order to evaluate a formula, the system begins looking at each reference in the path to the target name, i.e., in the present example "student" and "classes." At a step 664, the system determines if the formula processor is looking at the first reference in the path to the target name. If the answer is yes, the formula's container name and included attributes are added to a current ring list of objects being searched at a step 666. If the reference being searched is not the first reference in the path to the target name, then only those attributes contained by the previous reference are added to the current ring list at a step 668.

Beginning at a step 670, the system begins a series of steps that analyze every attribute in the current ring list. A decision block at a step 672 determines if the name of the attribute matches the target name. If the name matches, then the name is added to a list of matches at a step 674. If the name does not match, then the formula processor gets the data type of the attribute in the current ring list. If the attribute is a subtype, then the semantic object referenced by the subtype is added to a next ring of attributes to be searched at a step 678. Subtype objects are considered by the present invention to be logically farther away than objects that are located in the same semantic object as the formula attribute that is being analyzed. On the other hand, parent objects are considered by the present invention to be at the same logical distance as the objects in the semantic object that contains the formula attribute. Therefore, if the data type is a parent object, then the referenced semantic object and its attributes are added to the current ring at a step 680.

If the data type is a group object, then the formula processor proceeds to a step 682a (shown in FIG. 20B) where the list of the containers attributes is added to the current ring list. For group attributes, a decision is made at step 684 whether the system is processing the first reference in the path to the target name. If the answer is yes, then a decision is made at a step 686 whether the container of the group attribute exists in the path to the containing semantic object. If the answer is yes, a further decision is made at a step 688 to determine if the parent container's maximum count is greater than one. If the answer is yes, then a determination is made at a step 690 of whether the type of attribute being processed is of type subtype. If the answer is yes, then the container of the current container is added to the current ring list, at a step 692. If not, then the container of the current container is added to the next ring list, at a step 694. If any of the answers to the determinations in steps 684, 686, or 688 is no, then only the list of the container's attributes is added to the current ring list at a step 682a.

If the type of attribute being processed is a semantic object, then the list of all the container's attributes is added to the current ring at a step 700. Finally, if the data type is an object link, then the attributes of the referenced semantic object are added to the next ring list at a step 702.

Beginning at a step 709 (FIG. 20C) a determination is made if the current ring list of attributes being searched is empty. If so, the system searches the next ring list at step 670. Once an entire ring list has been searched, a check is made at a step 710 to determine if the match list is empty. If the answer is yes, then a decision is made at a step 712 whether all ring lists have been searched. If the answer is yes, an error message is shown to the user at a step 714, indicating that the target name has not been found. If not all ring lists have been searched, then the next ring list is evaluated at a step 716, in accordance with the method beginning at step 670 described above. If the matched list is not empty, a decision is made at step 718 whether there is more than one path to an attribute with the given name. If the answer is yes, then the user is asked at a step 720 to identify the attribute or path to the attribute that is intended. Assuming that the matched list contains only one attribute, a decision is made at a step 722 of whether the entire expression has been evaluated. If the answer is no, then a search begins for the next target name at a step 724. When all attribute references have been uniquely identified, their value types are examined to ensure validity in their context within the expression Album Validation As described above, before the user can transform the semantic object data model defined by the album into one or more relational tables, the album must be validated to make sure the user has not created any modeling errors. FIGS. 20D–20I describe the steps taken by the present invention to validate a semantic object data model defined in an album. As will be discussed in further detail, the present invention analyzes the album to make sure the user has not created any recursive relationships in the data model. For example, a formula attribute cannot contain an expression property which defines the formula in terms of itself. Similarly, a first semantic object cannot include an object link attribute which is used to uniquely identify the first semantic object if the object link attribute refers to a second semantic object which is uniquely determined by the first. Finally, the validation routine determines if a semantic object exists in the semantic object data model without any links to all other semantic objects. This condition is referred to as a partitioned semantic object data model.

In order to determine whether a recursive relationship exists in the data model or the data model is partitioned, the present invention builds three maps, a circular formula map, a circular ID map, and a partition map. A map is the logical equivalent of an array or matrix. A map differs from a normal array in that the indices can be of (nearly) any type. For instance, while a standard array's contents are referenced by indexing the array with an integer (array [2]), maps can use strings for indexing (map ["Hello World"]).

The present invention uses maps to track connectivity of certain items: formulas, semantic object IDs, and the data model as a whole. Each map has a slightly different purpose and maintains different lists of information at each index.

The circular formula map uses a formula attribute as the map's index and each cell in the map references a list of formula attributes used within the indexing formula's expression property.

The circular ID map uses a semantic object as the index and references a list of other semantic objects used to uniquely identify the indexing semantic object.

Lastly, the partitioned album map uses a semantic object as its index but (as opposed to the circular ID map discussed above) references a list of all other semantic objects directly referenced by object link attributes contained somewhere within the indexing semantic object. It should be noted that while for formulas and semantic object IDs circularity (also called self-reference) is an error, within this context it indicates a fully connected (i.e., nonpartitioned) album.

After all of the album's profiles have been examined (and are without error), the three maps are fully populated and are examined with regard to their connectivity. To test circularity, a recursive test is applied. This test is as follows:
1) For each nonvisited index in the map do:
2) Mark it as being visited.
3) For each item in the list referenced at this cell do:
4) Using the list item as this map's index;
5) If the map index has already been visited
6) if not testing for a partitioned album, return an error message, indicating a recursive relationship
7) If testing album partitioning, and not all cells have been visited after applying the recursive test to the first cell, then the album is partitioned. Return error.

FIG. 20D describes the steps taken by the present invention to validate an album. Beginning at a step 1100, the system begins by analyzing each profile within the album. At a step 1102, the profile's type is determined. At a step 1104 the system performs a series of steps depending upon the type of profile being analyzed.

Figure 20E:
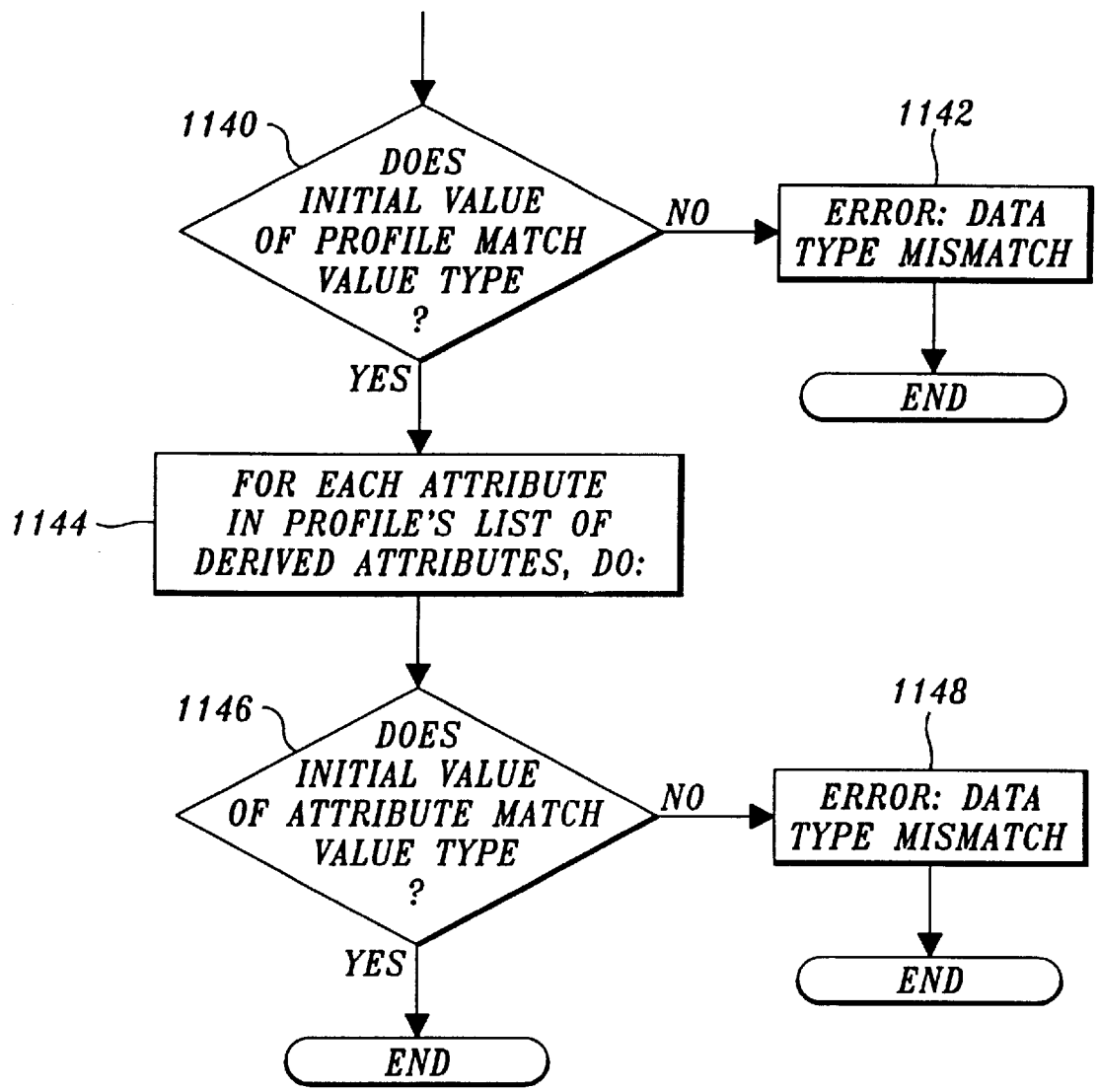
FIGS. 20D–20I are a series of flow charts showing the steps performed to validate a semantic object data model.

FIG. 20E shows the steps taken when a profile analyzed in the album validation routine is a simple value type. Beginning at a step 1140, the system determines if the initial value of the profile matches the value type property. If not, an error message is produced at a step 1142 indicating a data type mismatch and the validation routine ends. At a step 1144, the system analyzes each attribute in the profiles list of derived attributes. At a step 1146, it is determined whether the initial value of the attribute matches its value type. If the answer is no, then an error message is produced at a step 1148 indicating a data type mismatch and the validation routine ends.

Figure 20F:
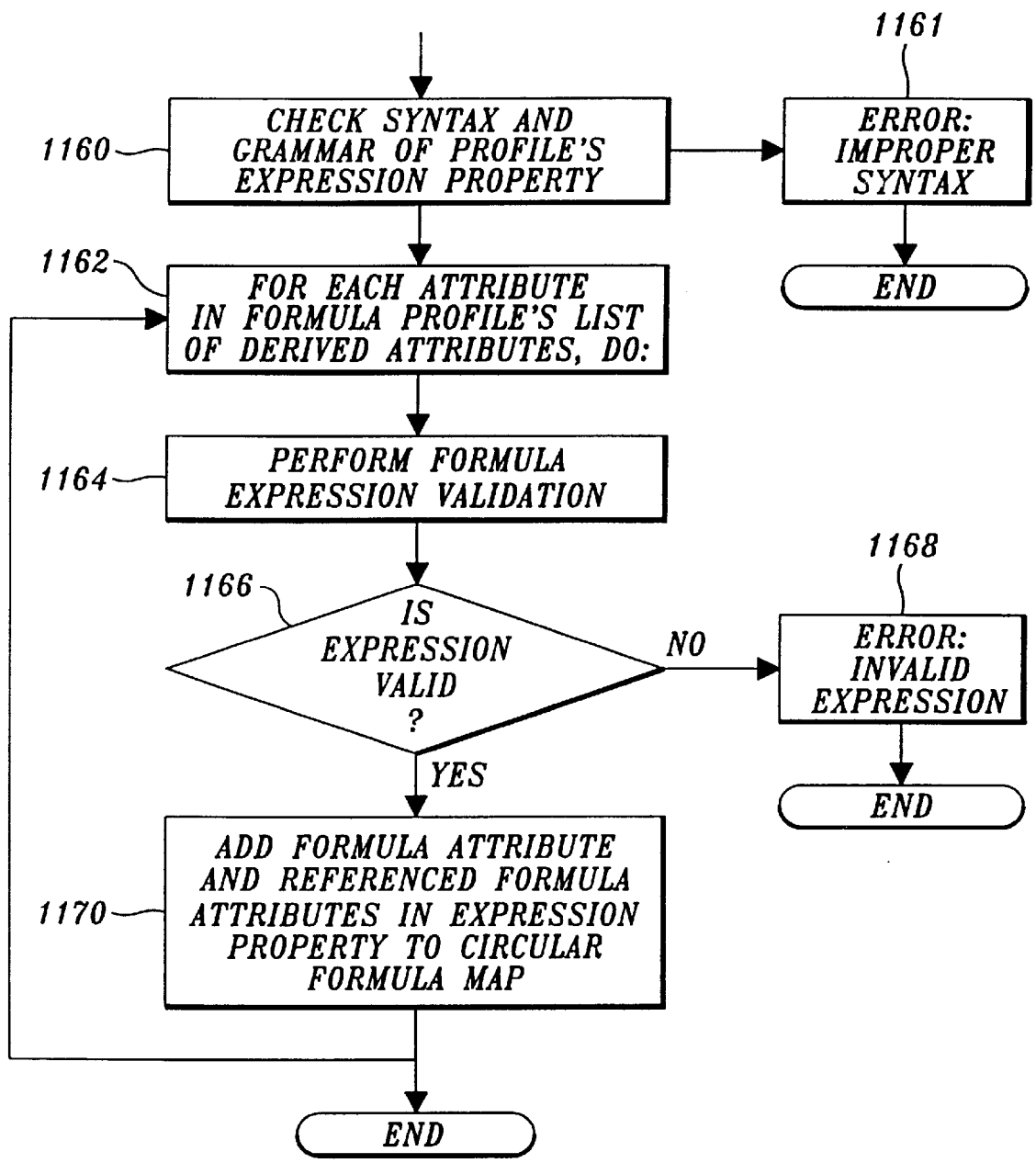

FIG. 20F shows the steps taken by the present invention when the profile analyzed in the validation routine is a formula type. Beginning at a step 1160, the system checks the syntax and grammar of the profile's expression property. If the syntax and grammar are incorrect, an appropriate error message is generated at a step 1161. Once the expression property of the profile has been checked, the system then analyzes each formula attribute contained in the formula profile's list of derived attributes at a step 1162. At a step 1164, the system performs a formula expression validation as set forth as step 662 in FIG. 20A. In step 1166 it is determined whether the expression is valid. If not, an error message indicating an invalid expression is produced at a step 1168 and the validation routine ends. If the expression is valid, the system adds the formula attribute and referenced formula attributes contained in the expression property to the circular formula map at a step 1170.

Figure 20G:
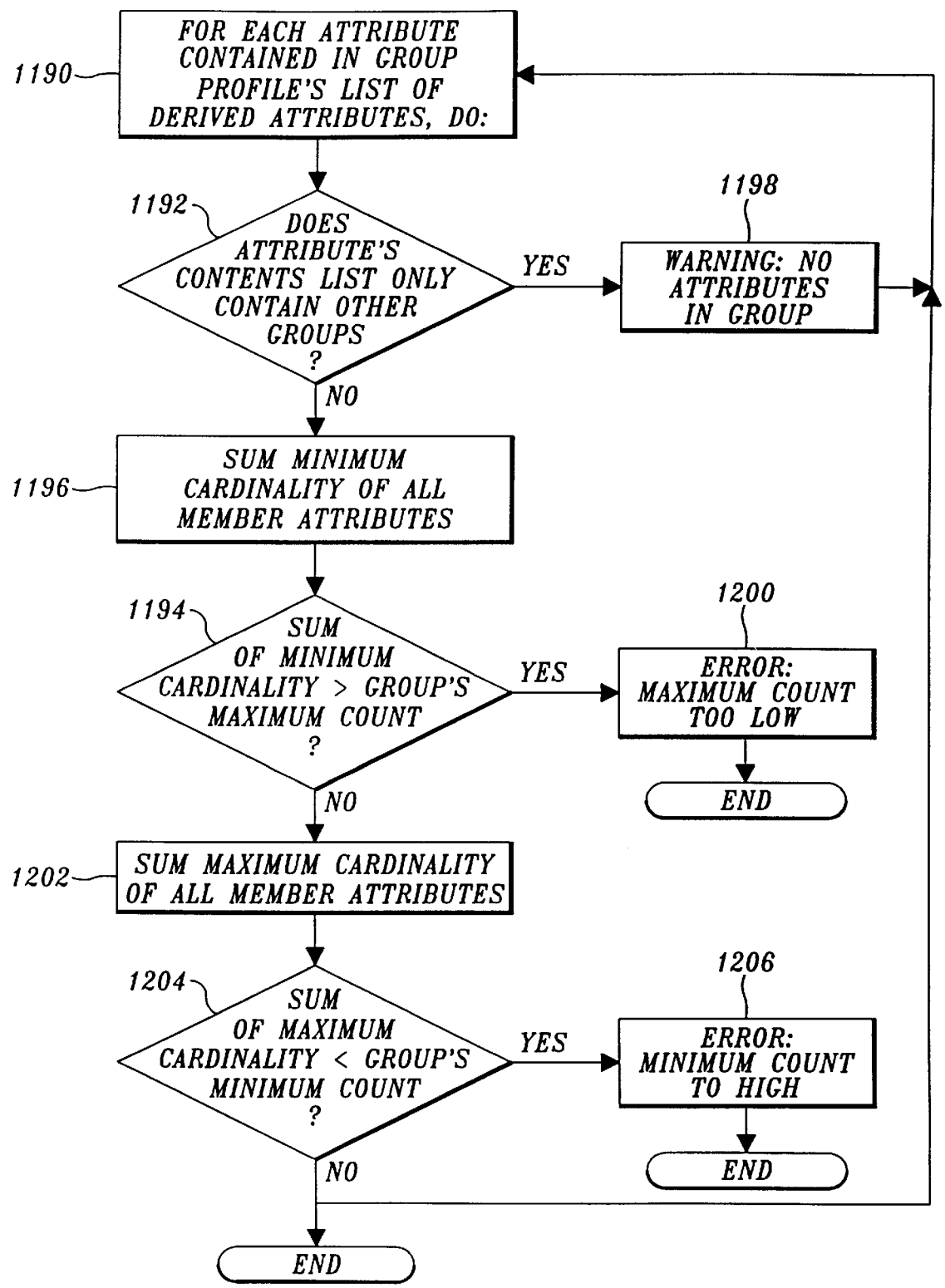

If the profile being analyzed in the validation routine is a group, the system performs the step shown in FIG. 20G. Beginning at a step 1190, the system begins a loop that analyzes each attribute contained in the group profile's list of derived attributes. First, the system determines at a step 1192 whether the group attribute's contents list only contains other groups. If so, a warning is produced at a step 1194 indicating there are no attributes in the group. As will be appreciated, step 1192 is performed recursively for any nested groups that a group may contain. Assuming that a group attribute contains at least one non-group attribute, the system sums the minimum cardinality of all member attributes at a step 1 196. At a step 1198, it is determined whether the sum of the minimum cardinalities is greater than the group's maximum count. If so, an error message is produced at a step 1200 indicating that the maximum count is too low. If the maximum count is set correctly, the system sums the maximum cardinality of all the member attributes at a step 1202. At a step 1204 it is determined whether the sum of the maximum cardinalities is less than the group's minimum count. If so, an error message is produced at step 1206 indicating that the minimum count is too high.

Figure 20H:
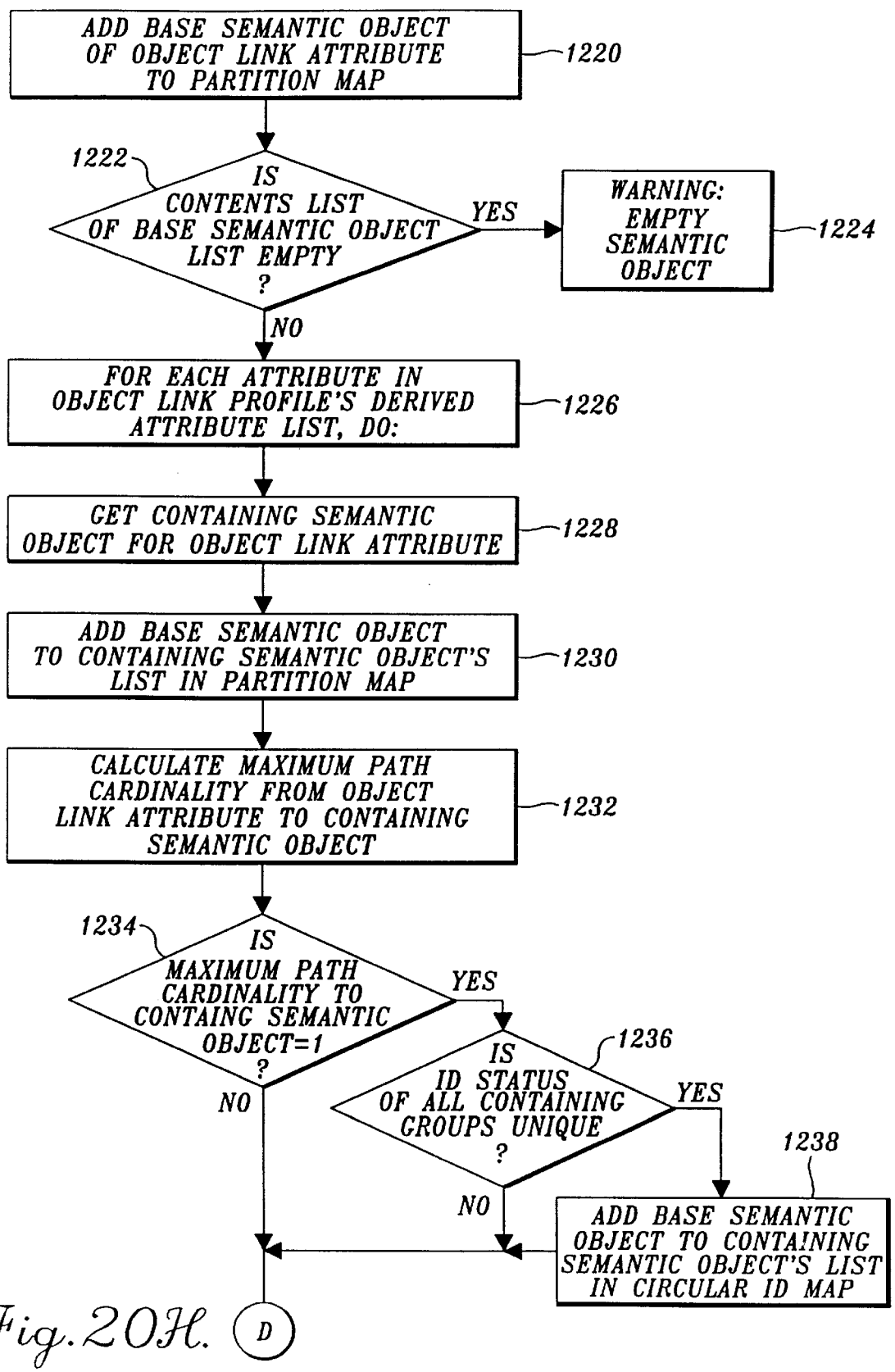
Figure 20J:
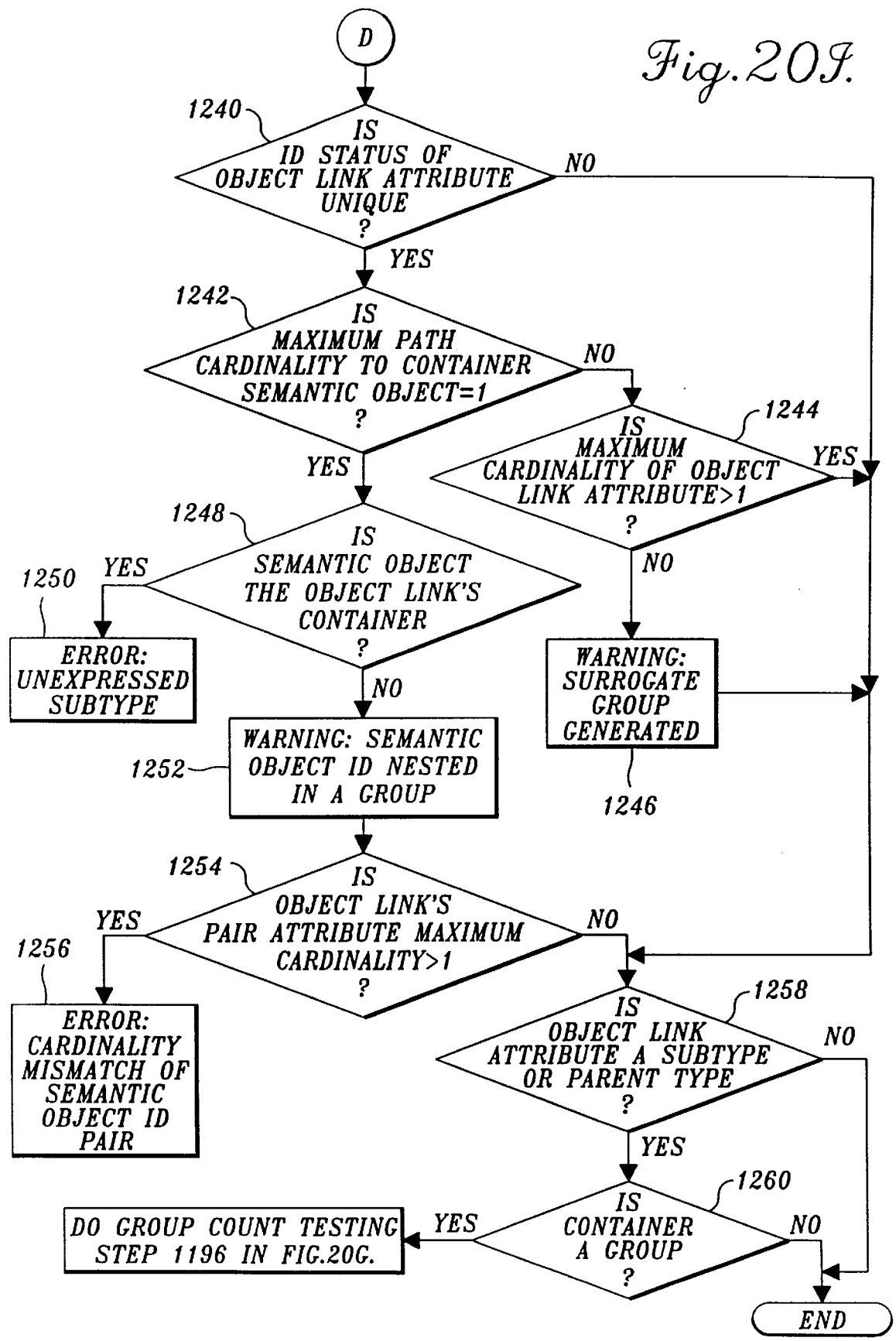

If the profile analyzed by the validation routine is an object link, the system performs the steps shown in FIGS. 20H–20I. Beginning at step 1220, the system adds the base semantic object of the object link attribute to the partition map. At a step 1222, it is determined whether the contents list of the base semantic object is empty. If so, the system produces a warning at a step 1224 indicating the referenced semantic object is empty.

At a step 1226, the system begins a series of steps that analyze each object link attribute contained in the profile's list of derived attributes. At a step 1228, the system determines the containing semantic object for the object link attribute being analyzed. At a step 1230, the base semantic object for the object link attribute is added to the containing semantic object's list in the partition map. At a step 1232, the system calculates the maximum path cardinality from the object link attribute to the containing semantic object. The system determines whether the maximum path cardinality to the containing semantic object is equal to one at a step 1234. If so, the system then determines whether the ID status of all containing groups that exist between the object link attribute and the containing semantic object are unique at a step 1236. If so, the system adds the base semantic object of the object link attribute to the containing semantic object's list in the circular ID map at a step 1238.

At a step 1240, the system determines whether the ID status of the object link attribute is unique. If the ID status is unique, the system determines whether the maximum path cardinality from the object link attribute to the containing semantic object is equal to one at a step 1242. If not, the system then determines whether the maximum cardinality of the object link attribute is equal to one at a step 1244. If the maximum cardinality is greater than one, a warning is provided to the user to step 1246 indicating that the user has in fact modeled a group and therefore a surrogate group will be created. At a step 1248, it is determined whether the semantic object is the object link's container. If so, an error message is produced at a step 1250 indicating that the user has modeled an unexpressed subtype. If the semantic object is not the object link's container a warning message is produced at step 1252 indicating that the semantic object ID is nested in a group. At a step 1254, it is determined whether the object link's paired attribute has a maximum cardinality that is greater than one. If so, an error message is produced at step 1256 indicating a cardinality mismatch of the semantic object ID pairs exists.

At a step 1258, the system determines whether the object link being analyzed is a subtype or parent type. If so, it is determined at a step 1260 whether the container of the subtype or parent type is a group. If so, the system performs the group count testing set forth in step 1196 in FIG. 20G.

Returning now to FIG. 20D, the system analyzes the three maps produced. in FIGS. 20E–20I described above. At a step 1106, the circular formula map is analyzed. At a step 1108 it is determined whether the circular formula map indicates a formula attribute includes a recursive formula expression property. If so, an error message is produced at a step 1110 indicating the formula attribute is recursively defined.

At a step 1112, the circular ID map is analyzed. At a step 1114 it is determined whether the circular ID map indicates a semantic object that is uniquely identified by itself. If so, an error message is produced at step 1116 indicating the semantic object includes a recursive identification.

At a step 1118, the partition map is analyzed. Step 1120 determines whether all semantic objects in the album are connected. If not, the system produces a warning message at step 1122 indicating the album is partitioned.

As can be seen, the validation routine operates to determine if the user has made any errors in creating the semantic object data model. In addition to determining whether the data types of the attributes are correctly created, the system looks for recursive relationships within the formula attributes and in the identifiers of the semantic object. Once the album has been validated, the user then can instruct the system to transform the semantic object into a set of commands or subroutine calls which create the database schema.

Transformation of Semantic Objects into Relational Tables

As described above, the present invention is a system that allows a user to create a semantic object data model that represents data to be stored in a database. The system then transforms the model into one or more of a set of commands that are interpreted by a conventional database program to create a plurality of relational database tables that correspond to the semantic object data model.

Figure 21:
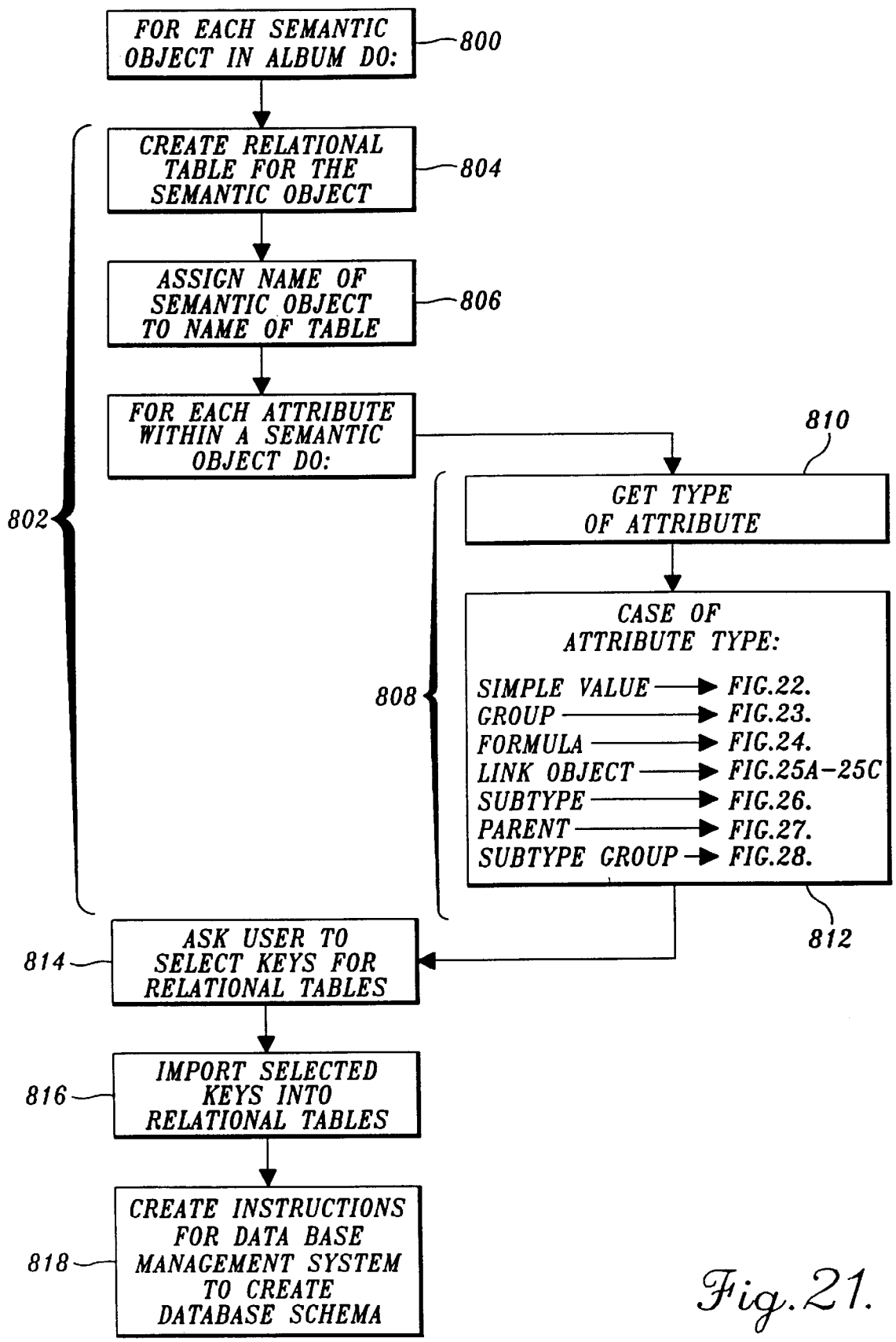
FIG. 21 is a flow chart showing the steps taken by the present invention to transform a semantic object into one or more relational tables.

FIG. 21 shows the steps performed by the present invention to transform a semantic object data model that comprises a plurality of semantic objects into a plurality of corresponding relational database tables that can be used by a commercial database program. Beginning with a step 800, each semantic object in the semantic object album is processed to create one or more relational tables for the semantic object. For each semantic object in the album, the system begins an outer loop 802 in which a relational table is created for the semantic object at a step 804. The table is given a name that is the same as the name of the semantic object at a step 806. Next, each attribute within the semantic object is analyzed in a loop 808.

The loop 808 comprises the steps of first determining the type attribute for each attribute within the semantic object, at a step 810. In a step 812, the attribute is processed according to its type. The particular steps performed by the present invention to transform an attribute are detailed in the referenced FIGURES noted below.

After each attribute within a semantic object has been analyzed, and all the semantic objects within an album have been analyzed, the user is asked to select keys for the relational tables created at a step 814. Once the user has selected the keys, any foreign keys that were ambiguous at the time the relational tables were created are made definite at a step 816.

The particular table definitions produced by the present invention can be tailored to a particular database protocol determined based upon the user's election of a specific commercial database program with which the present invention will be used. Given the following description of how the semantic object model is transformed into a number of relational tables, it is considered to be within the skill of a computer programmer to create a driver for any of the commercially available relational database programs that will produce the appropriate set of commands that cause that database to create corresponding relational database tables for the desired schema.

FIGS. 22–29 describe in detail the steps taken by the present invention to transform an attribute within a semantic object into one or more relational tables. As described above, the present invention does not create the relational tables in the relational database but instead causes a commercially available database program to create the tables. Each time a table, column, or key for a table is created by transforming the semantic object model, an appropriate command to a specific database application is created and stored in a data file that can be read by the database program, or an appropriate subroutine of the database program is called to create the relational database table. The user informs the system on which type of database program the user is going to implement the database being created. The system includes a series of lookup tables which allow the system to select the correct command or subroutine that is appropriate for the database system selected.

Figure 22:
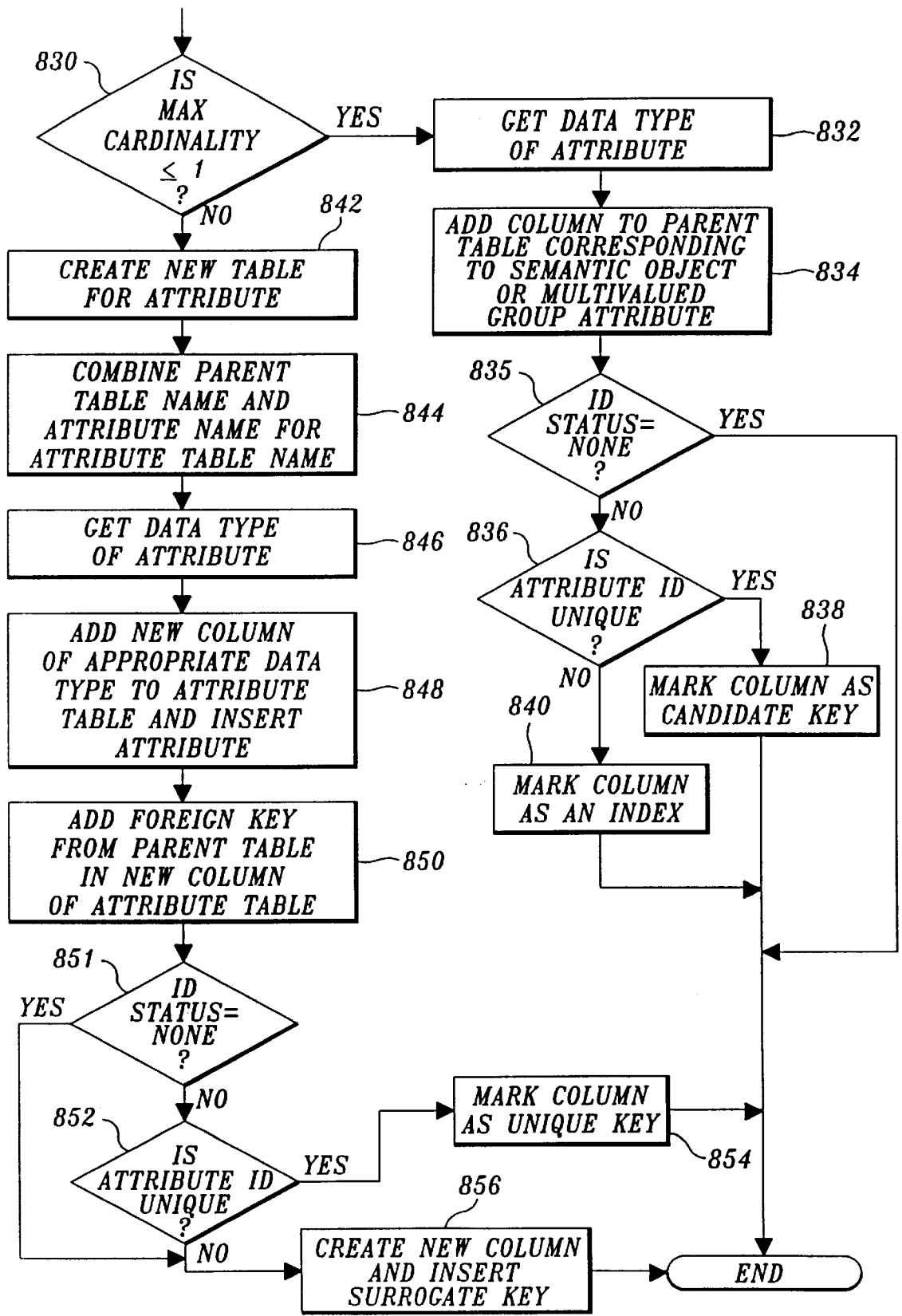
FIG. 22 is a flow chart showing the steps taken to transform a simple value attribute into a relational table.

FIG. 22 shows the steps taken by the present invention to transform a simple value attribute into data input to one or more relational tables. Beginning at a step 830, the system determines if the simple value attribute has a maximum cardinality that is less than or equal to one. If the answer is yes, then the system determines the data type of the attribute, as specified by the value type property, in a step 832. Once the data type has been determined, the system creates a column of the appropriate data type in the semantic object table or the multivalued group table created for the container of the simple value attribute (referred as the parent table) at a step 834. A test is made at a step 835 to see if the ID status of the attribute is none. If so, no columns in the table are marked. The system then looks at the ID status property of the simple value attribute and determines if it is unique in a step 836. If the ID status is unique, then the new column is marked as a unique key at a step 838. If the column is not unique, then the column is marked as an index at step 840.

If the maximum cardinality for the simple value attribute was greater than one, then a new table is created for the attribute at a step 842. The new table is given a name that is a concatenation of the parent table name and the attribute name at a step 844. The data type of the attribute specified by the value-type property is then determined at a step 846. A new column of the appropriate data type is added to the attribute table, and the attribute is inserted at a step 848. A foreign key from the parent table is added in a new column of the newly created simple value attribute table in a step 850. At a step 851, a determination is made whether the ID status of the attribute is none. If so, a surrogate key is inserted into the table at a step 856. At a step 852, the system determines whether the ID status property of the attribute is unique. If the answer is yes, then the column in which the attribute value was placed is marked as a unique key at a step 854. If the attribute ID is not unique, then a new column is added to the attribute table and a surrogate key is inserted at the step 856.

Figure 23:
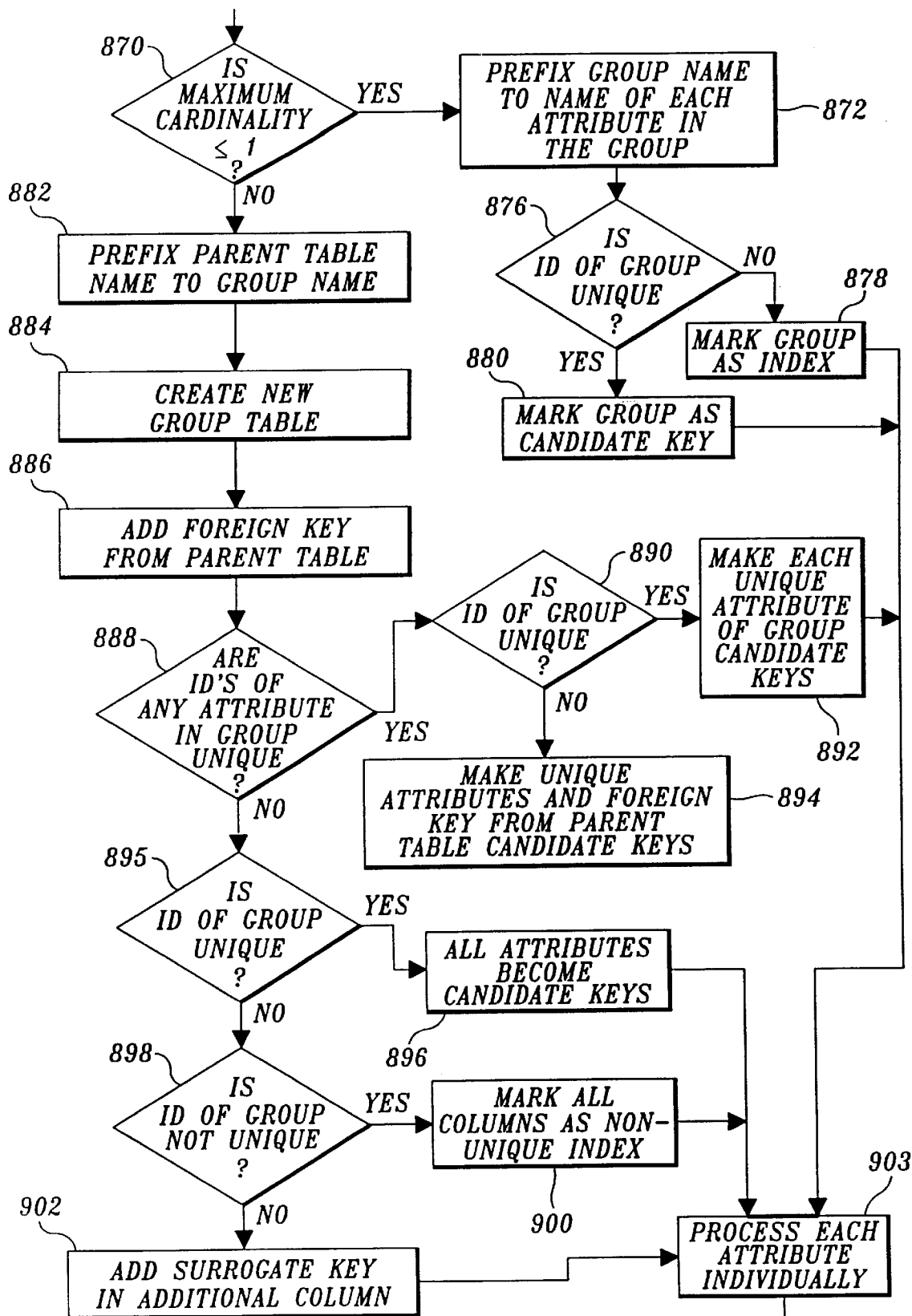
FIG. 23 is a flow chart showing the steps taken to transform a group attribute into one or more relational tables.

FIG. 23 shows the steps taken by the present invention to process a group attribute into one or more relational tables. The system first determines whether the maximum cardinality of the group is less than or equal to one in a step 870. If the answer is yes, then no separate table need be created to represent the group. However, in order to differentiate the members of the group from the remaining entries in the relational table, the name of the group is prefixed to the name of each attribute contained in the group at a step 872. The system then determines at a step 876 whether the ID status property of the group is unique. If the ID status is non-unique, then the group is marked as a non-unique index at a step 878 for the relational table created for the semantic object. However, if the group ID is unique, then the group is marked as a candidate key at a step 880.

If the maximum cardinality of the group is greater than one, then the table name created for the container of the group is prefixed to the group name at a step 882. Next, the system creates a new group table at a step 884 and a foreign key from the parent table is added to the new group table at a step 886. At a step 888, it is determined whether the ID status property of any of the attributes in the group is unique. If the answer is yes, then the system determines if the ID status property of the entire group is unique at a step 890. If the ID status of the group is unique, then each of the unique attributes contained in the group is made a candidate key at a step 894. If the ID status of the group is not unique, then each pair of the unique attribute and the foreign key from the parent table are made candidate keys at a step 892. If none of the ID status properties of the attributes in the group is unique, then the system determines if the ID status of the group is unique at step 895. If so, then all attributes in the group become candidate keys at a step 896. Finally, the system determines if the ID status property of the group is not unique at a step 898. If so, then all columns are marked as a non-unique index in a step 900. If the ID status of the group is not defined as unique or non-unique, then the system assumes that the ID status of the group is equal to "none" and a surrogate key is added in an additional column of the group table at step 902. Finally, at a step 903, each attribute within the group is processed according to the loop 808 shown in FIG. 21.

Figure 24:
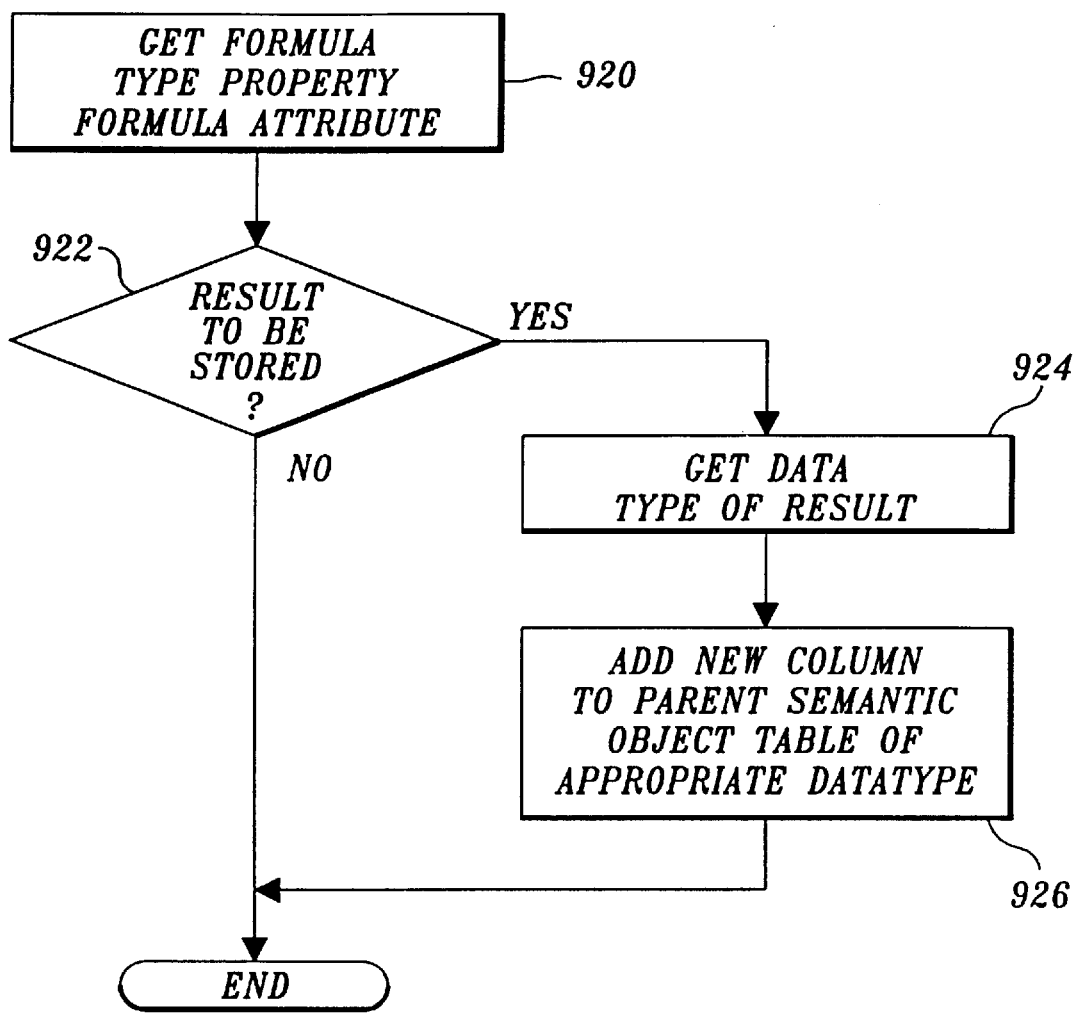
FIG. 24 is a flow chart showing the steps taken to transform a formula attribute into a relational table.

As shown in FIG. 24, the present invention transforms formula attributes to create relational tables by determining whether the result of a formula or expression is to be stored in the database. Beginning at a step 920, the system gets the formula-type property of the formula attribute. In a step 922, the system determines whether the formula type is "stored." If the answer is yes, then the system gets the data type of the result specified by the attribute's value-type property in a step 924. An additional column is added to the parent semantic object table of the appropriate data type in a step 926. If the formula-type property indicates that the result of the formula attribute is not to be stored, then no additional columns or tabled are created in the database schema.

The transformation of object links involves both looking at the maximum cardinalities of each attribute referenced by the object link as well as computing a value called the maximum path cardinality. The maximum path cardinality refers to the maximum cardinality of an object in a semantic object and any intervening containers.

Figure 25A:
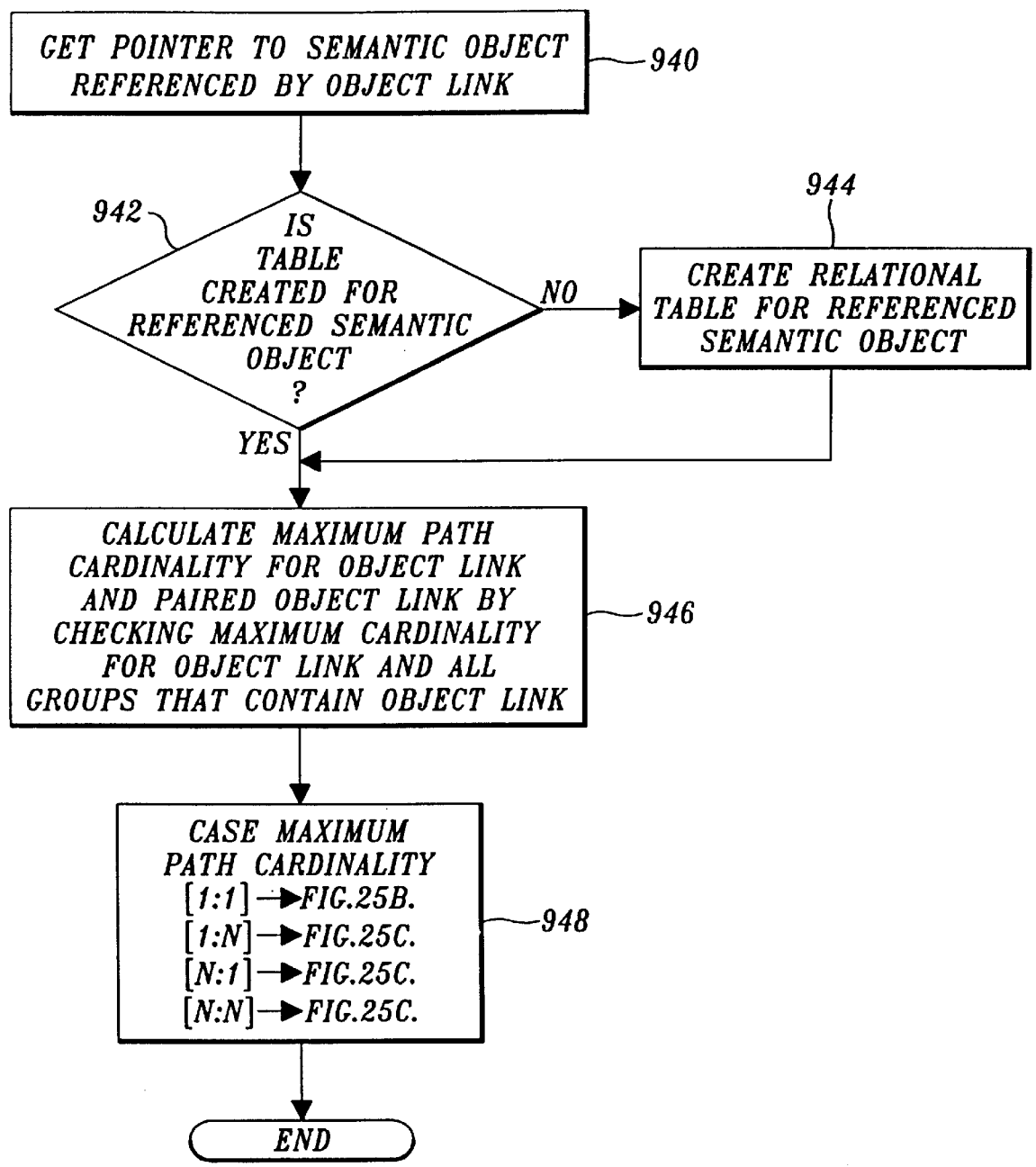
FIGS. 25A–25C are a series of flow charts showing the steps taken by the present invention to transform an object link attribute into one or more relational tables.
Figure 25B:
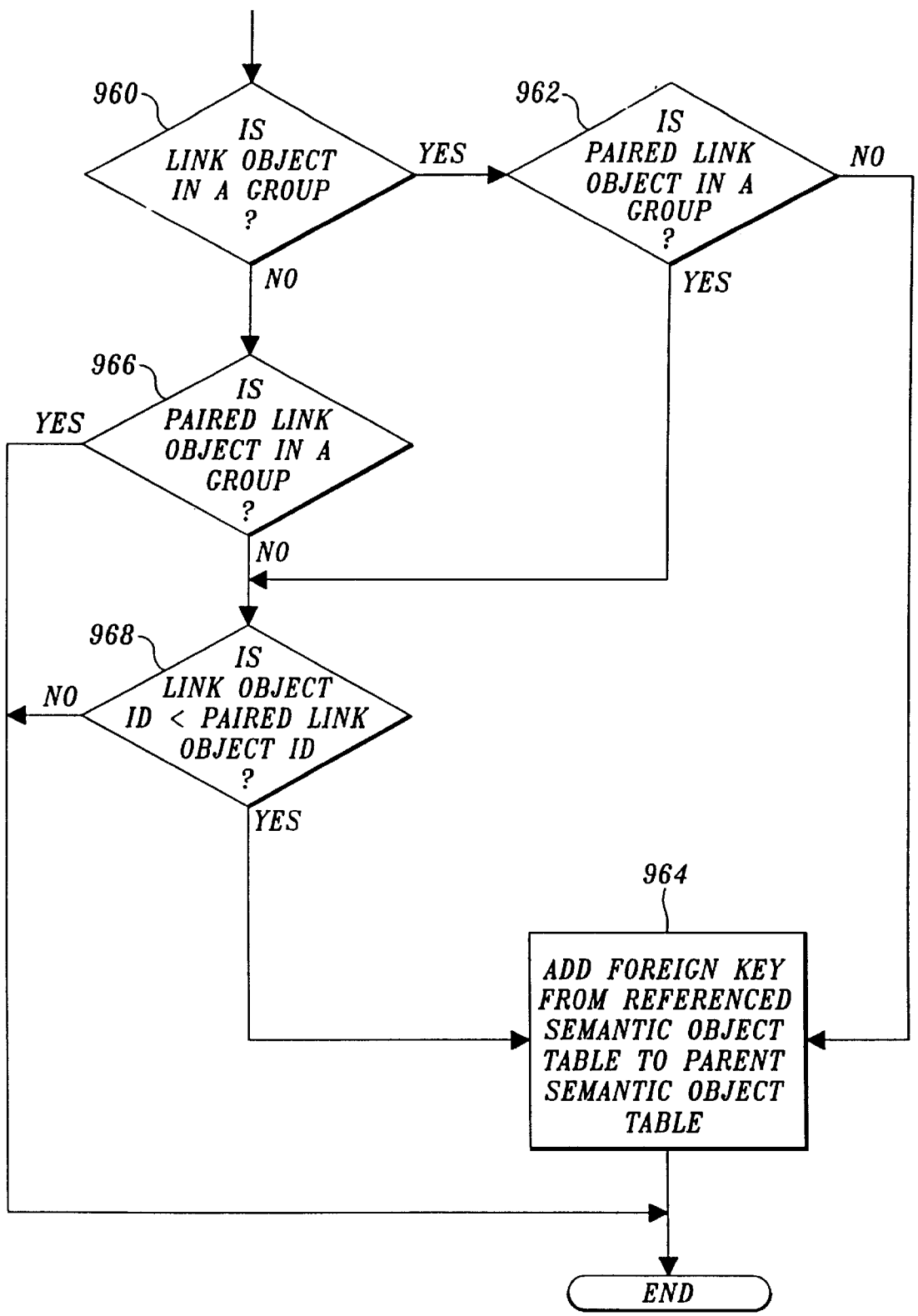
Figure 25C:
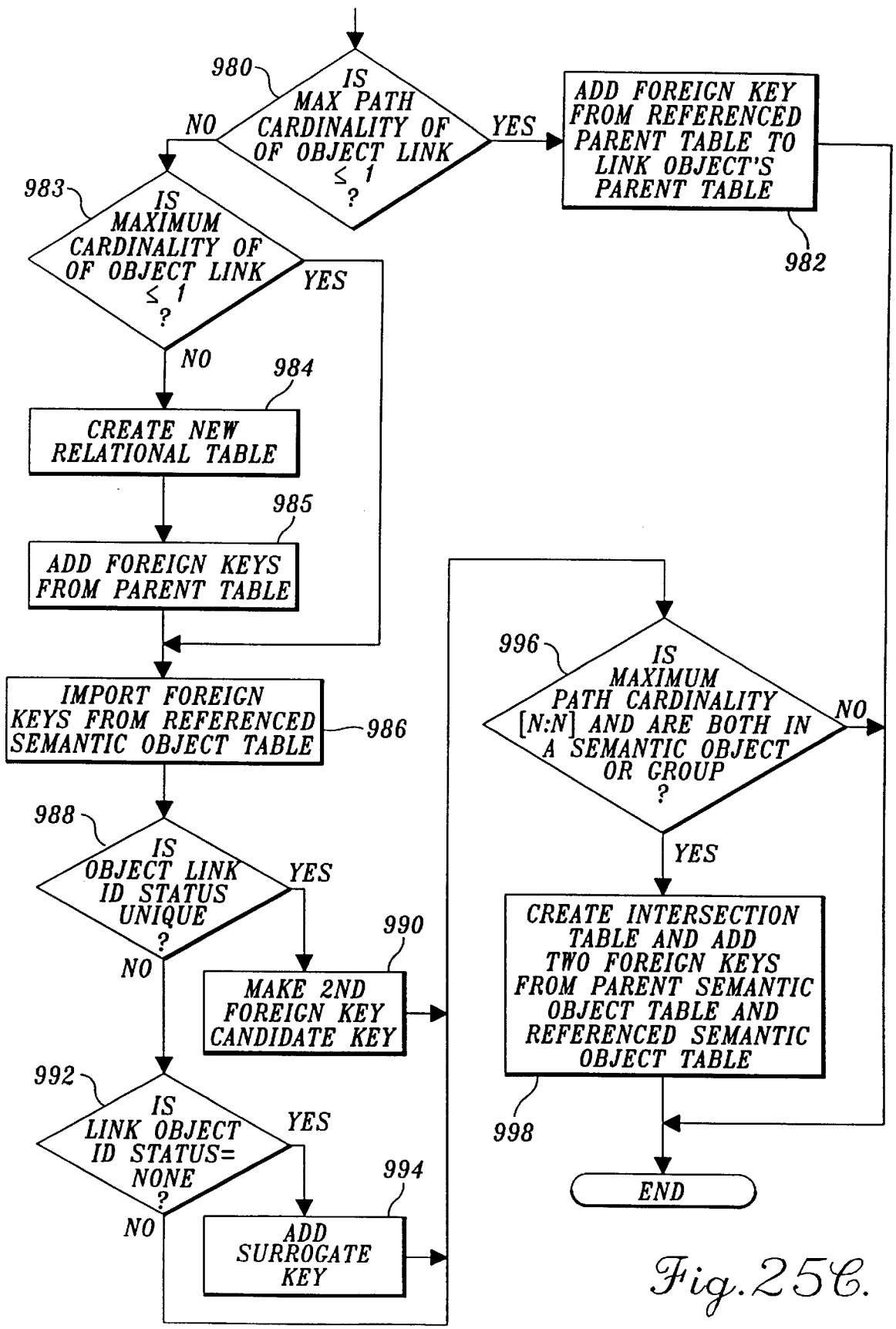

FIGS. 25A–25C set forth the steps taken by the present invention to transform a object link attribute into a series of relational tables. The system begins at a step 940 by getting a pointer to the semantic object referenced by the object link under consideration. At a step 942, the system determines whether a table has been created for the referenced semantic object. If the answer is no, then a relational table is created for the referenced semantic object at step 944 without processing its attributes. In a step 946, the maximum path cardinalities are calculated for the object link and the paired object link by taking the greatest maximum cardinality for that object link and all groups that contain the object link. The maximum path cardinality pair falls into one of four states represented by: [1:1], [1:N], [N:1], or [N:N]. In a step 948, the system takes various actions depending upon the maximum path cardinality pair determined in step 946.

FIG. 25B shows the steps taken by the present invention when the maximum path cardinality between a pair of object link attributes is 1:1. Beginning at a step 960, the system determines whether the object link attribute being processed is in a group. If the answer is yes, the system determines whether the paired object link attribute is also in a group, at a step 962. If the paired object link is not in a group, then a foreign key from the referenced semantic object table is added to the parent object table being defined, at a step 964. If the first object link is not in a group, the system determines whether the paired object link is in a group. If the answer is yes, then nothing is done. If the paired object link is not in a group, the system determines whether the integer ID identifier for the object link is less than the integer ID identifier of the paired object link attribute. If not, the system does not create any additional foreign keys or tables. However, if the identifier of the object link is less than the identifier of the paired object link based upon a decision step 968, a foreign key from the referenced semantic object table is added to the parent semantic object table at a step 964. As will be appreciated, the decision at the step 968 is arbitrary such that the system could easily place a foreign key from the parent semantic object table into the referenced semantic object table if desired.

FIG. 25C shows the steps taken by the present invention to transform object link attributes having a [1:N], [N:1] and

[N:N] maximum path cardinality pair. Beginning at a step 980 the system determines whether the maximum path cardinality of the object link attribute under consideration is less than or equal to one. If so, the system adds a foreign key from the referenced parent table to the object link's parent table at a step 982. A determination is made at a step 983 whether the maximum cardinality of the object link is less than or equal to one. If not, then the system creates a new relational table at a step 984. A foreign key is imported into the new relational table from both the parent table and the referenced semantic object table at a step 986. If the answer to step 983 was yes, the system must determine whether the object link is contained in a multivalued group at a step 983a. If not, the system then determines whether the relationship specified by the object link is many to many at step 996. A step 988 determines whether the ID status property of the object link is unique. If so, the foreign key added from the referenced semantic object table is made a candidate key at a step 990. If the ID status of the object link is not unique, the system determines whether the ID status is equal to "none" at a step 992. If the ID status is equal to none, a step 994 adds a surrogate key to a new column of the relational table created at step 984. In all cases, the system then checks whether the maximum path cardinality for the object link is [N:N] and (1) whether the containers of the object links are both a semantic object or (2) both a group, at a step 996. If either of these is true, an intersection table is created, and a foreign key from the parent semantic object table and a foreign key from the referenced semantic object table are added to the intersection table at a step 998. If at step 996 it is determined that the container of one object link is contained in a group and the other is contained in a semantic object or vice versa, no intersection table is created.

Figure 26:
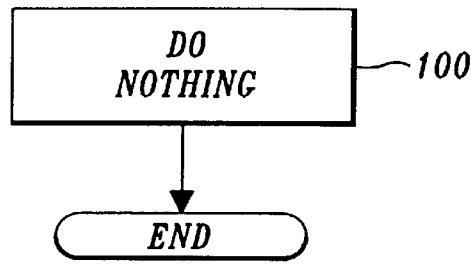
FIG. 26 is a flow chart showing the steps taken to transform a parent-type attribute into one or more relational tables.

As can be seen by FIG. 26, no relational tables or columns are required to process a subtype attribute. A subtype attribute is always paired with a corresponding parent-type attribute; therefore, the present invention lets the parent-type attributes define a relation between the tables created for the parent relational table and the subtype relational table.

Figure 27:
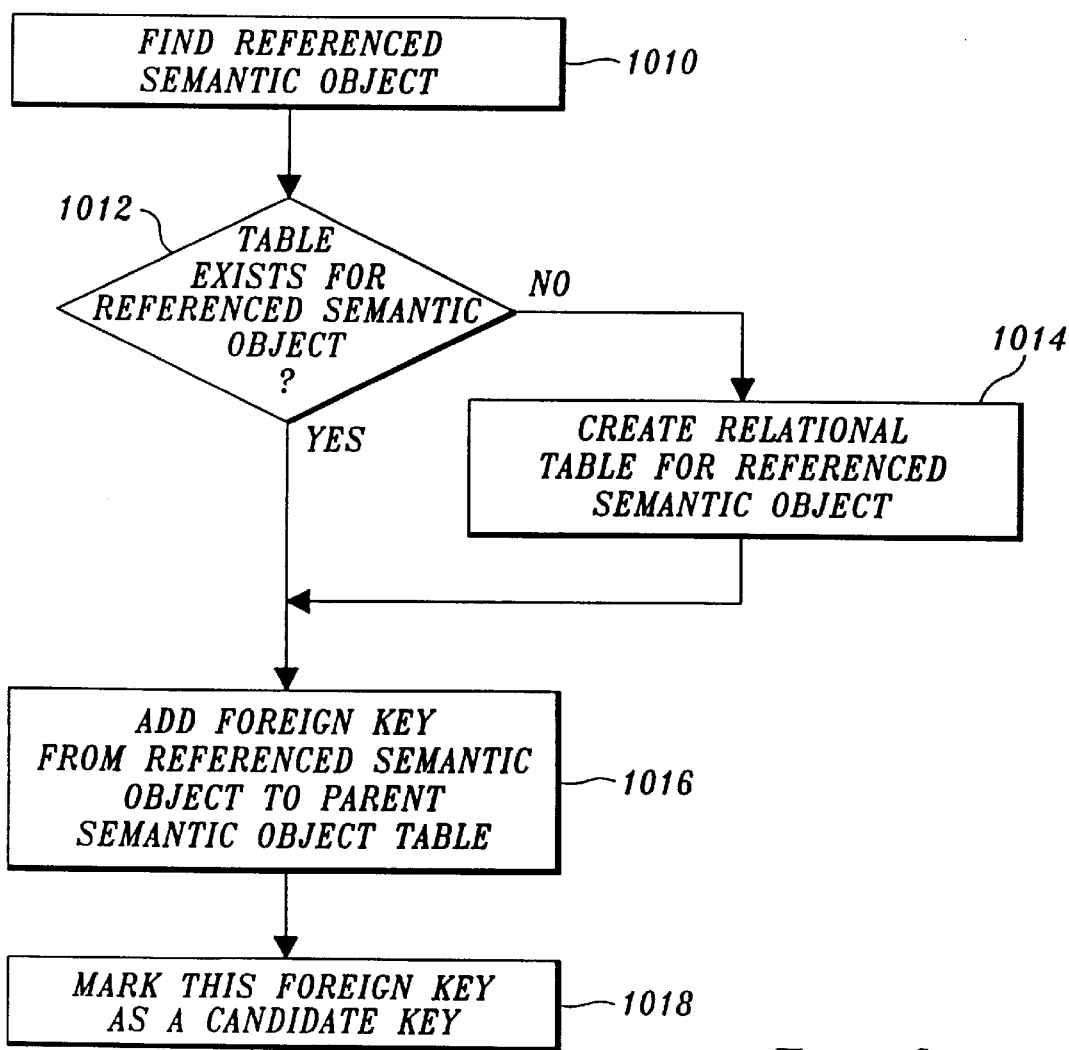
FIG. 27 is a flow chart showing the steps taken to transform a subtype group into one or more relational tables.

FIG. 27 shows the steps taken by the present invention to transform a parent-type attribute into one or more relational tables. Beginning at a step 1010, the system finds the semantic object referenced by the parent-type attribute. At a step 1012, the system determines whether a table exists for the referenced semantic object. If no table exists, then a table is created for the referenced semantic object at a step 1014. At a step 1016, a foreign key from the referenced semantic object table is placed in the parent semantic object table. Finally, at a step 1018, the foreign key is marked as a candidate key.

Figure 28:
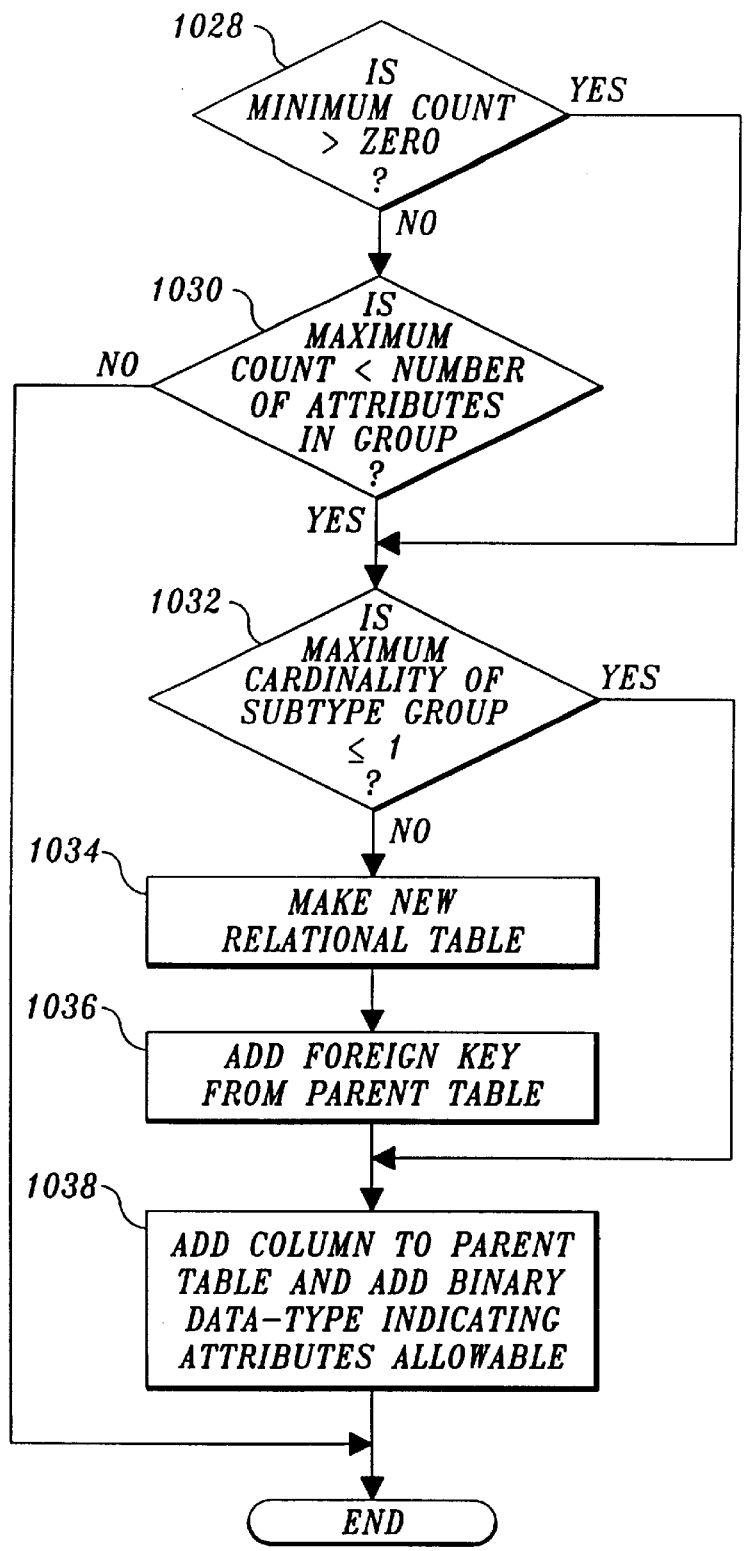
FIG. 28 is a flow chart showing the steps taken to transform a parent group into one or more relational tables.

FIG. 28 shows the steps taken by the present invention to transform a subtype group attribute. Beginning at a step 1028, the system determines if the minimum count of the subtype group is greater than zero. The system then determines at a step 1030 whether the maximum count for the group is less than the number of member attributes contained in the group. If the answers to steps 1028 and 1030 are no, nothing is done. However, if the answer is yes in at least one step, a step 1032 determines whether the maximum cardinality of the group is less than or equal to one. If the maximum cardinality of the group is greater than one, a new relational table is created at a step 1034, and a foreign key from the parent table is added to the new relational table at a step 1036. Finally, a column is added to the table and a binary data type is defined that is used to indicate the attributes within the group that are selected.

Figure 29:
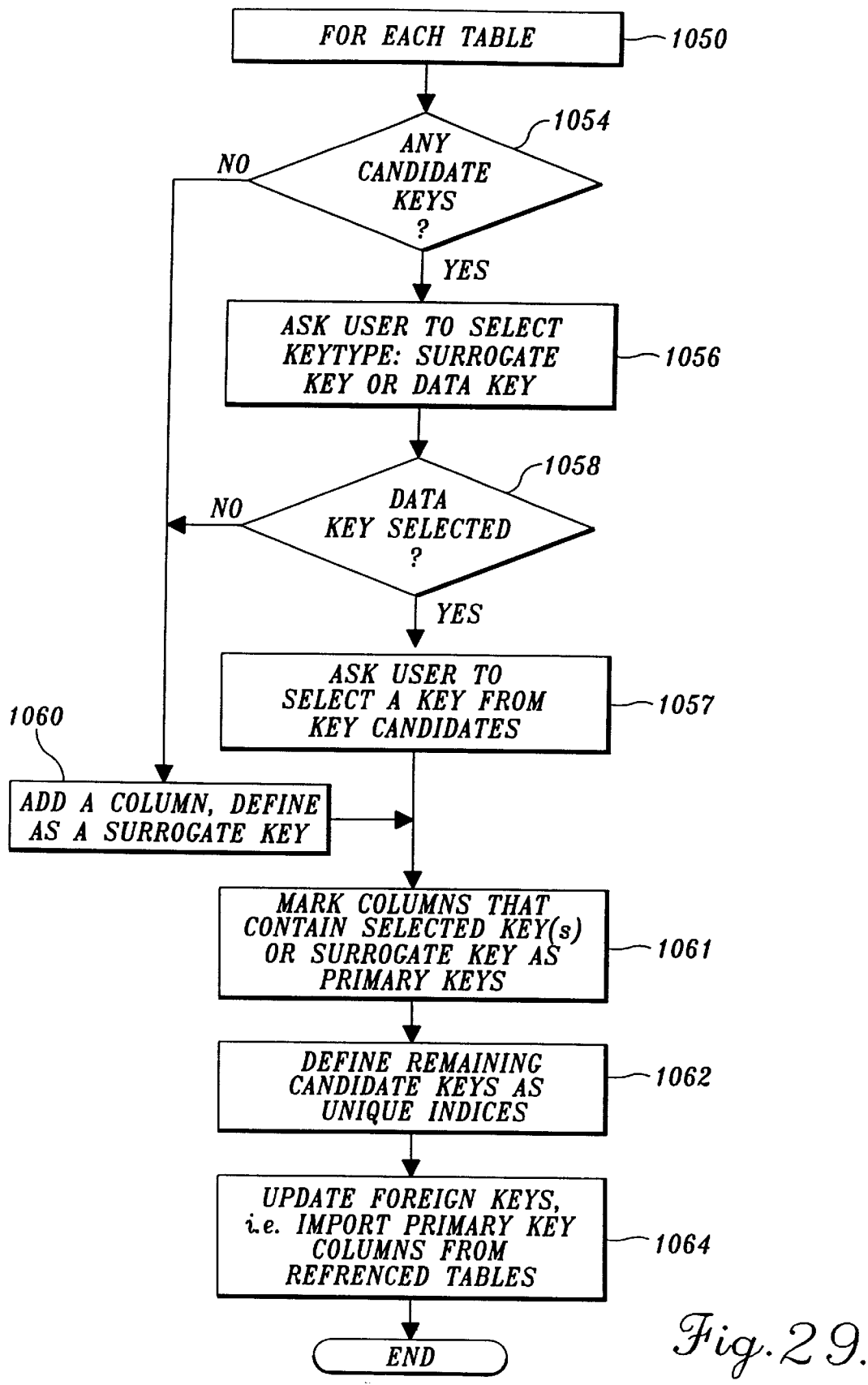
FIG. 29 is a flow chart showing the steps taken by the present invention to define the primary keys of a relational table and prompt a user to resolve any ambiguities in the keys of the tables created during the transformation of the semantic object data model.

FIG. 29 shows the steps taken by the present invention in order to define the primary keys for a table and update any keys that may have been ambiguous when the relational tables were created. The system begins at a step 1050, where for each table created, the primary keys for the table are defined according. At a step 1054, the system determines whether there are any candidate keys identified. If there are candidate keys, the user selects the primary key to be either a surrogate key or a data key in a step 1056. In a step 1058, the system determines whether the user has selected a data key. If a data key has been selected, the user is then prompted to select a key from the list of possible key candidates at a step 1057. If the user selects a surrogate key, a new column is added to the table and the surrogate key is inserted at a step 1060. In a step 1061, all columns in the relational table that have been selected as a key are marked as primary keys. Any remaining candidate keys not selected as primary keys are then defined as unique indices at a step 1062. Once all primary keys have been defined for all tables, any foreign keys that were dependent upon a candidate key being selected are updated at a step 1064 to reflect which of the candidate keys was selected as a primary key.

As described above, the present invention does not create the tables in the database program. The present invention either places function calls with the appropriate arguments to routines provided by the database program to create the relational tables or creates a text file with the appropriate commands that are read by the database program to create the tables.

For example, if the present invention is to create tables for the Access® database program produced by the Microsoft Corporation, the present invention calls predefined routines to create the tables. To create a relational table in Access® the following function calls are:

---

Start table ("Table Name")
    add field ("Colname", data type)
    •
    •
    •
    create primary key ("Colname, Colmane . . .")
    create index ("Colname, Colname . . .", unique)
End table
Open table
    create foreign key ("reference table name, "Colname,
        Colname . . .", table name)
Close table

---

This code creates a table, adds numerous columns of a particular data type, sets the primary key and creates an index. Additionally, the routine "create foreign key" defines a foreign key for the table, after the referenced tables are defined. As will be appreciated, given the table definitions defined in the figures described above, it is well within the skill of an ordinary programmer to determine what commands must be called or commands created to make a database program create the corresponding relational tables.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A programmed computer system for creating a relational database schema from a semantic object model, comprising:

a central processing unit;

a memory containing a sequence of program steps that when executed by the central processing unit:

creates, in response to a user input, one or more semantic objects each of which represents an item about which data is stored in one or more tables of a relational database;

creates, in response to a user input, one or more attributes and associating the attributes with one or more semantic objects, each of the attributes representing data stored in the relational database for the item represented by the semantic object with which the attribute is associated, the attributes including simple value attributes that represent a data entry in a single column of the relational database, group attributes having one or more member attributes that represent a logical collection of attributes and object link attributes that represent relationships between the semantic objects in the semantic object model, each of the attributes having one or more properties and wherein each attribute is associated with a corresponding simple value, group or object link profile that defines default values for the one or more properties of the associated attribute;

stores in the computer system an indication for each attribute whether the attribute is multivalued, thereby representing multiple data entries in a column of a relational database;

translates the semantic objects and their associated attributes into the one or more relational database tables, by operating the computer system to:

automatically generate a relational database table for each semantic object in the semantic object model;

automatically analyze each attribute associated with a semantic object to determine whether the semantic object is associated with a multivalued group attribute having a multivalued attribute as a member attribute and, if so to:

a) create a second relational database table for the multivalued group attribute and link the second relational database table to the relational database table created for the semantic object by a foreign key; and b) create a third relational database table for the multivalued attribute that is a member attribute of the multivalued group attribute and link the third relational database table to the second relational database table by another foreign key.

2. The computer system of claim 1, wherein the computer system translates the semantic objects and their associated attributes into one or more relational database tables by causing the central processing unit to:

automatically analyze each attribute associated with a semantic object to determine whether the semantic object is associated with a multivalued group attribute having an object link attribute as a member attribute and, if so, to:

a) determine whether the object link attribute is multivalued and, if not, to add a column to the second relational database table created for the multivalued group attribute, wherein said column holds a foreign key that links the second relational database table to a relational database table created for a semantic object referenced by the object link attribute; or b) determine whether the object link attribute is multivalued and, if so, to create an intersection table having columns that hold a foreign key to the second relational database table created for the multivalued group attribute and a foreign key to a relational database table created for a semantic object that is referenced by the multivalued object link attribute.

3. The computer system of claim 1, wherein the computer system stores for each profile a list of attributes that are associated with the profile, the central processing unit being programmed to:

determine whether a user has modified a property of a profile; and automatically update the corresponding property in each attribute that is associated with the profile to conform to the modified property.

4. The computer system of claim 3, wherein the central processing unit is further programmed to:

automatically generate an object link profile upon the creation of a semantic object in the semantic object model; and store in the memory of the computer system a reference from the object link profile to the semantic object that is associated with the object link profile.

5. The computer system of claim 4, wherein the one or more properties defined by the simple value profiles, group profiles and object link profiles include an ID status property that indicates whether an attribute associated with the profile uniquely identifies the item represented by the semantic object with which a corresponding attribute is associated.

6. The computer system of claim 4, wherein the one or more properties defined by the simple value profiles, group profiles and object link profiles include a minimum cardinality property that defines a minimum number of data entries that are stored in the relational database for the corresponding attribute and a maximum cardinality property that defines a maximum number of data entries that are stored in the relational database for a corresponding attribute, wherein the central processing unit is further programmed to translate the semantic objects and their associated attributes in the semantic object model into a relational database schema by:

analyzing each attribute associated with a semantic object to determine if it is a simple value attribute and, if so, reading the maximum cardinality property of the simple value attribute;

automatically creating an additional column in the relational database table created for the semantic object with which the simple value attribute is associated, the additional column storing a data entry for the simple value attribute if the maximum cardinality is less than or equal to one; and otherwise automatically creating a separate relational database table for the attribute, the separate relational database table having at least two columns to store multiple data entries for the simple value attribute and one or more foreign keys that link an entry in the separate relational data base table to an entry in the relational database table created for the semantic object with which the multivalued, simple value attribute is associated.

7. The computer system of claim 6, wherein the central processing unit translates the semantic objects and their included attributes in the semantic object model into a relational database schema by:

analyzing each attribute associated with a semantic object to determine if the attribute is a group attribute and, if so:

reading the maximum cardinality property of the group attribute to determine if the group attribute is not multivalued and, if so:

automatically creating an additional column in the relational database table created for the semantic object with which the group attribute is associated to store data entries for each simple value attribute that is included in the list of member attributes if the maximum cardinality of the group attribute is less than or equal to one.

8. The computer system of claim 7, wherein the one or more properties defined by the group profiles further include a minimum count property that indicates how many attributes of the member attributes must have data entries stored in the relational database table created for the group attribute and a maximum count property that indicates a maximum number of attributes of the member attributes that may have data entries stored in the relational database table created for the group attribute, wherein the central processing unit translates the semantic object data model by:

reading the minimum count and maximum count property of a group attribute;

determining if the minimum count property of the group attribute is greater than zero or if the maximum count property is less than a number of attributes in the list of member attributes and, if so:

automatically adding a column to the relational database table created for the group attribute, wherein the column holds a code that indicates the number of attributes in the list of member attributes that must have data entries stored in the relational database.

9. A programmed computer system for creating a relational database schema from a semantic object model, comprising:

a central processing unit;

a memory containing a sequence of program instructions that when executed by the central processing unit causes the central processing unit to:

create, in response to a user input, one or more semantic objects, each representing an item about which data is stored in a relational database;

retrieve from a memory of the computer system a plurality of predefined profiles, each profile defining default values of one or more properties of a corresponding attribute;

select, in response to user input, one of the plurality of predefined profiles and associating the selected profile with a semantic object in the semantic object model;

automatically create an attribute in the associated semantic object based on the selected profile, the attributes including simple value attributes that represent a data entry into a single column of the relational database, group attributes having one or more member attributes that represent a logical collection of attributes and object link attributes that represent relationships between the semantic objects in the semantic object model, wherein each attribute has one or more properties having defaults that are defined by the one or more properties of the selected profile; and translate the semantic objects and their associated attributes into a relational database schema.

10. The computer system of claim 9, wherein the central processing unit stores a list of attributes that are associated with each profile, the central processing unit being further programmed to:

determine whether a user has modified a default value of the one or more properties of a profile; and automatically update a corresponding property in each attribute that is associated with the profile to conform to a new value of the modified property.

11. The computer system of claim 9, wherein the plurality of profiles include simple value profiles that represent simple value attributes, group profiles that represent group attributes, and object link profiles that represent object link attributes, the central processing unit being further programmed to:

automatically generate an object link profile upon the creation of a semantic object in the semantic object model, and store in the memory of the computer system a reference from the object link profile to the semantic object that is associated with the object link profile.

12. The computer system of claim 9, wherein the one or more properties defined by the simple value profiles, group profiles and object link profiles include an ID status property that indicates whether an attribute associated with a profile uniquely identifies an instance of the item represented by the semantic object with which a corresponding attribute is associated.

13. The computer system of claim 9, wherein the one or more properties defined by the simple value profiles, group profiles and object link profiles include a minimum cardinality property that defines a minimum number of data entries that may be stored in the relational database for a corresponding attribute and a maximum cardinality property that defines a maximum number of data entries that may be stored in the relational database for a corresponding attribute, wherein the central processing unit translates the semantic objects and their associated attributes into a relational database schema by:

automatically creating a relational database table for each semantic object in the semantic object data model;

automatically analyzing each attribute included associated with a semantic object to determine if it is a simple value attribute and, if so:

reading the maximum cardinality property of the simple value attribute;

automatically creating an additional column in the relational database table created for the semantic object to store data for the simple value attribute if the maximum cardinality is less than or equal to one; and otherwise automatically creating a separate relational database table to store data for the simple value attribute, the separate relational database table having at least two columns to store multiple data entries and one or more foreign keys that link an entry in the separate relational database table to an entry in the relational database table created for the semantic object with which the simple value attribute is associated.

14. The computer system of claim 13, wherein the one or more properties defined by a group profile include a list of member attributes that are included in the group and wherein the central processing unit translates the semantic objects and their included attributes in the semantic object model into a relational database schema by:

analyzing each attribute associated with a semantic object model to determine if the attribute is a group attribute and, if so:

reading the maximum cardinality property of the group attribute;

automatically creating an additional column in the relational database table created for the semantic object with which the group attribute is associated to store entries for each simple value attribute that is included in the list of member attributes if the maximum cardinality property of the group attribute is less than or equal to one; or automatically creating a separate relational database table for the group attribute, said separate relational database table having columns for each simple value attribute in the list of member attributes and at least one column in the separate relational base table to store one or more foreign keys that link an entry in the separate relational database table to an entry in relational database table created for the semantic object with which the group attribute is associated.

15. The computer system of claim 14, wherein the one or more properties defined by the group profiles include a minimum count property that indicates how many attributes in the list of member attributes must have data stored in the relational database table created for the group attribute and a maximum count property that indicates a maximum number of attributes in the list of member attributes that may have data entries stored in the relational database table created for the group attribute, wherein the central processing unit is programmed to translate the semantic object data model by:

reading the minimum count property and the maximum count property of a group attribute;

determining if the minimum count of the group attribute is greater than zero or if the maximum count is less than a number of attributes in the list of member attributes and, if so:

automatically adding a column to the relational database table created for the group attribute, wherein the column holds a code that indicates the number of attributes in the list of member attributes that must have data entries stored in the relational database.

16. The computer system of claim 13, wherein the central processing unit is further programmed to translate the semantic object model by:

determining whether an attribute that is associated with a first semantic object is an object link attribute that relates the first semantic object to another semantic object in the semantic object model and, if so:

determining if a relational database table has been created for the other semantic object;

reading the maximum cardinality properties of the object link attributes associated with the first semantic object and the other semantic object;

adding a column to the relational database table created for the other semantic object to hold a foreign key that links the relational database table created for the other semantic object to the relational database table created for the first semantic object if the maximum cardinality properties of the object link attributes associated with the first semantic object and with the other semantic object are both less than or equal to one; or adding a column to the relational database table created for the first semantic object to hold a foreign key that links the relational database table created for the first semantic object to the relational database table created for the other semantic object if the maximum cardinality property of the object link attribute associated with the first semantic object is greater than one and the maximum cardinality property of the object link attribute associated with the other semantic object is less than or equal to one; or creating an intersection relational database table having two or more columns to hold foreign keys to the relational database tables created for the first semantic object and the other semantic object if the maximum cardinality properties of the object link attributes associated with the first semantic object and the other semantic object are both greater than one.

17. A programmed computer system for creating a relational database schema from a semantic object model, comprising:

a central processing unit;

a memory containing a sequence of program instructions that when executed cause the central processing unit to:

create, in response to a user input, one or more semantic objects each of which represents an item about which data is stored in a relational database;

create, in response to a user input, one or more attributes and associating the attributes with a semantic object, each of the attributes representing data stored in the relational database for the item represented by the semantic object, the attributes including simple value attributes that represent a single data entry in a column of the relational database, group attributes having one or more member attributes that represent a logical collection of attributes and object link attributes that represent relationships between the semantic objects in the semantic object model, wherein the computer system stores for each object link attribute an ID status property that defines whether one semantic object in the semantic object model is uniquely defined by another semantic object in the semantic object model;

automatically validate the semantic object model to determine if a modeling error has occurred by:

1) determining if a first semantic object in the object model includes an object link attribute having an ID status property that indicates the first semantic object is uniquely defined by a second semantic object in the object model; and 2) determining if the second semantic object includes an object link attribute having an ID status property that indicates the second semantic object is uniquely defined by the first semantic object; and if conditions 1 and 2 do not occur, translating the semantic objects and their associated attributes in the semantic object model into a relational database schema.

18. The computer system of claim 17, wherein the central processing unit validates the semantic object model by:

automatically analyzing each semantic object in the semantic object model to determine whether any semantic objects are not associated with any object link attributes.

19. The computer system of claim 17, wherein each attribute has one or more properties and each attribute is associated with a corresponding profile that defines default values for the one or more properties, the computer system storing for each profile a list of attributes that are associated with the profile, the central processing unit being further programmed to:

determine whether a user has modified a property of a profile; and automatically update the corresponding property in each attribute that is associated with the profile to conform to the modified property.

20. The computer system of claim 19, wherein the profiles include simple value profiles, group profiles, and object link profiles, the central processing unit being further programmed to:

automatically generate an object link profile upon the creation of a semantic object in the semantic object model, and store in the memory of the computer system a reference from the object link profile to the semantic object that is associated with the object link profile.

21. The computer system of claim 19, wherein the one or more properties defined by the simple value profiles, group profiles and object link profiles include an ID status property that indicates whether an attribute associated with the profile uniquely identifies the item represented by the semantic object with which a corresponding attribute is associated.

22. The computer system of claim 19, wherein the one or more properties defined by the simple value profiles, group profiles and object link profiles include a minimum cardinality property that defines a minimum number of data entries that are stored in the relational database for the corresponding attribute and a maximum cardinality property that defines a maximum number of data entries that are stored in the relational database for a corresponding attribute, wherein the central processing unit is programmed to translate the semantic objects and their associated attributes in the semantic object model into a relational database schema by:

analyzing each attribute associated with a semantic object to determine if the attribute is a simple value attribute and, if so:

reading the maximum cardinality property of the simple value attribute;

automatically creating an additional column in the relational database table created for the semantic object with which the simple value attribute is associated, to store a data entry for the simple value attribute if the maximum cardinality is less than or equal to one; and otherwise automatically creating a separate relational database table for the attribute, the separate relational database table having at least two columns to store multiple data entries for the simple value attribute and one or more foreign keys that link an entry in the separate relational data base table to an entry in the relational database table created for the semantic object with which the simple value attribute is associated.

23. The computer system of claim 22, wherein the central processing unit is programmed to translate the semantic objects and their included attributes in the semantic object model into a relational database schema by:

analyzing each attribute associated with a semantic object to determine if the attribute is a group attribute and, if so:

reading the maximum cardinality property of the group attribute to determine if the group attribute is multivalued;

automatically creating an additional column in the relational database table created for the semantic object with which the group attribute is associated to store data entries for each simple value attribute that is included in the list of member attributes if the maximum cardinality of the group attribute is less than or equal to one; or automatically creating another relational database table to store data entries for each simple value attribute that is included in the list of member attributes and a foreign key that links the other relational database table to the relational database table created for the semantic object with which the group attribute is associated if the maximum cardinality of the group attribute is greater than one.

24. The computer system of claim 22, wherein the one or more properties defined by the group profiles further include a minimum count property that indicates how many attributes of the member attributes must have data entries stored in the relational database table created for the group attribute and a maximum count property that indicates a maximum number of attributes of the member attributes that may have data entries stored in the relational database table created for the group attribute, wherein the central processing unit is further programmed to translate the semantic object data model by:

reading the minimum count property and maximum count property of a group attribute;

determining if the minimum count property of the group attribute is greater than zero or if the maximum count is less than a number of attributes in the list of member attributes and, if so:

automatically adding a column to the relational database table created for the group attribute, wherein the column holds a code that indicates the number of attributes in the list of member attributes that must have data entries stored in the relational database.

25. A programmed computer system for interpreting a formula attribute in a semantic object data model of a type that includes one or more semantic objects that represent items about which data is stored in a relational database, each semantic object including one or more simple value attributes that represent a data entry in a column of a relational database, group attributes having one or more member attributes that represent a logical collection of attributes, formula attributes that represent a computed value and object link attributes that represent relationships between the semantic objects in the semantic object model, wherein the computer system stores for each formula attribute an expression property that defines a mathematical calculation in terms of one or more attributes included in the semantic object data model, the computer system comprising:

a central processing unit;

a memory, including a sequence of program instructions that when executed by the central processing unit cause the central processing unit to:

search the semantic object data model for the attributes included in the expression property of a formula attribute;

determine if the attributes included in the expression property of the formula are included in more than one semantic object in the semantic object model and includes an attribute that is included in the expression property of the formula attribute;

for each semantic object that includes the attribute that is found in the expression property of the formula, determine a logical distance the semantic objects are away from the formula attribute; and select the attribute that is found in the semantic object that is the closest logical distance to the formula attribute as the attribute to be used in calculating the expression property.

26. The computer system of claim 25, wherein each attribute in the semantic object model is logically included in a container that may include one or more other attributes and wherein the central processing unit determines a logical distance the semantic objects are away from the formula attribute by:

performing an expanding ring search for all attributes included in the expression property of the formula by:
        creating a first list of attributes that are included in the formula attribute's container;
        analyzing each attribute in the list to determine if it matches the attribute in the expression property, wherein each element in the list is determined to be the same logical distance away from the formula attribute.

27. The computer system of claim 25, wherein the attributes include parent type and subtype attributes and wherein the central processing unit is programmed to perform an expanding ring search further by determining whether an attribute in the list is a parent type and, if so, adding all the attributes included in a semantic object referenced by the parent type attribute to the first list of attributes to be searched.

28. The computer system of claim 27, wherein the central processing unit is programmed to perform the expanding ring search by determining whether an attribute in the list is a subtype attribute and, if so, adding any attributes included in a semantic object referenced by the subtype attribute to a next list of attributes to be searched, wherein the next list is determined to be at a farther logical distance away than attributes in the first list.

29. The computer system of claim 25, wherein the central processing unit is programmed to perform the expanding ring search by determining whether an attribute in the first list is an object link attribute and, if so, adding any attributes included in a corresponding semantic object referenced by the object link attribute to a next list of attributes to be searched, wherein the next list is determined to be at a farther logical distance away than attributes in the first list.

\* \* \* \* \*